US012577027B2

(12) United States Patent (10) Patent No.: US 12,577,027 B2
Melrose et al. (45) Date of Patent: Mar. 17, 2026

(54) METHOD OF PROCESSING A PLASTIC CONTAINER TO INCREASE INTERNAL PRESSURE

(71) Applicant: CO2PAC Limited, Auckland (NZ)

(72) Inventors: David Melrose, Auckland (NZ); John Denner, York, PA (US); Paul Kelley, Wrightsville, PA (US); Gregory Trude, Seven Valleys, PA (US); Campbell Melrose-Allen, Auckland (NZ)

( * ) Notice: Subject to any disclaimer, the term of this patent is extended or adjusted under 35 U.S.C. 154(b) by 0 days.

(21) Appl. No.: 18/903,620

(22) Filed: Oct. 1, 2024

(65) Prior Publication Data

US 2025/0026556 A1 Jan. 23, 2025

Related U.S. Application Data

(63) Continuation-in-part of application No. 18/671,257, filed on May 22, 2024, now abandoned, which is a
(Continued)

(51) Int. Cl.
  B65B 3/02 (2006.01)
  B29C 49/06 (2006.01)
  (Continued)

(52) U.S. Cl.
  CPC .......... B65D 79/0081 (2020.05); B29C 49/06 (2013.01); B29C 49/12 (2013.01);
  (Continued)

(58) Field of Classification Search
  CPC ....... B67C 3/045; B67C 3/223; B67C 7/0006; B67C 2003/226; B67C 2003/227;
  (Continued)

(56) References Cited

U.S. PATENT DOCUMENTS

| 1,499,239 A | 6/1924 | Malmquist |
| D110,624 S | 7/1938 | Mekeel, Jr. |
(Continued)

FOREIGN PATENT DOCUMENTS

| DE | 1150015 B | 6/1963 |
| DE | 1302048 | 10/1969 |
(Continued)

OTHER PUBLICATIONS

European Search Report (suppl.) of EP 03748817, dated Jul. 9, 2007.
(Continued)

*Primary Examiner* — Stephen F. Gerrity
(74) *Attorney, Agent, or Firm* — Rothwell, Figg, Ernst & Manbeck, P.C.

(57) ABSTRACT
A method of processing a plastic container to increase internal pressure including blow-molding the container to comprise an invertible panel in the base and a standing ring, hot filling and sealing the container, feeding the container into an apparatus with a holding device and forcing a volume reduction and pressure increase into the container, and stacking the containers in bulk pallets on top of one another to increase top load and create a positive pressure within the distribution load of containers.

19 Claims, 49 Drawing Sheets

Related U.S. Application Data continuation of application No. 18/159,339, filed on Jan. 25, 2023, now Pat. No. 11,993,443, which is a continuation of application No. 16/594,524, filed on Oct. 7, 2019, now Pat. No. 11,565,867, which is a continuation of application No. 15/074,791, filed on Mar. 18, 2016, now Pat. No. 10,435,223, which is a continuation of application No. 13/415,831, filed on Mar. 8, 2012, now Pat. No. 9,731,884.

(51) Int. Cl.

| | |
|---|---|
| *B29C 49/12* | (2006.01) |
| *B29C 49/48* | (2006.01) |
| *B29C 49/54* | (2006.01) |
| *B65B 61/24* | (2006.01) |
| *B65D 1/02* | (2006.01) |
| *B65D 79/00* | (2006.01) |
| *B67C 3/04* | (2006.01) |
| *B67C 3/22* | (2006.01) |
| *B67C 7/00* | (2006.01) |
| *B29K 67/00* | (2006.01) |
| *B29L 31/00* | (2006.01) |

(52) U.S. Cl.
CPC ........ *B29C 49/4802* (2013.01); *B29C 49/541* (2013.01); *B65B 3/022* (2013.01); *B65B 61/24* (2013.01); *B65D 1/023* (2013.01); *B65D 1/0276* (2013.01); *B65D 1/0284* (2013.01); *B67C 3/045* (2013.01); *B67C 3/223* (2013.01); *B67C 7/0006* (2013.01); *B29C 2049/4807* (2013.01); *B29C 2049/4892* (2013.01); *B29K 2067/003* (2013.01); *B29L 2031/7158* (2013.01); *B65B 2220/24* (2013.01); *B65D 2501/0036* (2013.01); *B67C 2003/226* (2013.01); *B67C 2003/227* (2013.01)

(58) Field of Classification Search
CPC ......... B65B 3/022; B65B 55/12; B65B 55/14; B65B 61/24; B65B 63/08; B65B 2220/24; B65D 1/0276; B65D 1/0284; B65D 79/005; B65D 79/0081; B29C 49/12; B29C 49/541
USPC .......... 53/440, 452, 471, 558, 561; 215/373, 215/376, 381; 220/606, 608, 609
See application file for complete search history.

(56) References Cited

U.S. PATENT DOCUMENTS

| | | | |
|---|---|---|---|
| 2,124,959 | A | 7/1938 | Vogel |
| 2,378,324 | A | 6/1945 | Ray et al. |
| 2,880,902 | A | 4/1959 | Owsen |
| 2,960,248 | A | 11/1960 | Kuhlman |
| 2,971,671 | A | 2/1961 | Shakman |
| 2,982,440 | A | 5/1961 | Harrison |
| 3,043,461 | A | 7/1962 | Glassco |
| 3,081,002 | A | 3/1963 | Tauschinski et al. |
| 3,174,655 | A | 3/1965 | Hurschman |
| 3,301,293 | A | 1/1967 | Santelli |
| 3,397,724 | A | 8/1968 | Bolen et al. |
| 3,409,167 | A | 11/1968 | Blanchard |
| 3,426,939 | A | 2/1969 | Young |
| 3,468,443 | A | 9/1969 | Marcus |
| 3,483,908 | A | 12/1969 | Donovan |
| 3,485,355 | A | 12/1969 | Stewart |
| 3,693,828 | A | 9/1972 | Kneusel et al. |
| 3,704,140 | A | 11/1972 | Petit et al. |
| 3,727,783 | A | 4/1973 | Carmichael |
| 3,819,789 | A | 6/1974 | Parker |
| 3,883,033 | A | 5/1975 | Brown |

| | | | |
|---|---|---|---|
| 3,904,069 | A | 9/1975 | Toukmanian |
| 3,918,920 | A | 11/1975 | Barber |
| 3,935,955 | A | 2/1976 | Das |
| 3,941,237 | A | 3/1976 | Macgregor |
| 3,942,673 | A | 3/1976 | Lyu et al. |
| 3,949,033 | A | 4/1976 | Uhlig |
| 4,036,926 | A | 7/1977 | Chang |
| 4,037,752 | A | 7/1977 | Dulmaine et al. |
| 4,117,062 | A | 9/1978 | Uhlig |
| 4,120,419 | A | 10/1978 | Saunders |
| 4,125,632 | A | 11/1978 | Vosti et al. |
| 4,134,510 | A | 1/1979 | Chang |
| 4,170,622 | A | 10/1979 | Uhlig et al. |
| 4,174,782 | A | 11/1979 | Obsomer |
| 4,219,137 | A | 8/1980 | Hutchens |
| 4,231,483 | A | 11/1980 | Dechenne et al. |
| 4,247,012 | A | 1/1981 | Alberghini |
| 4,301,933 | A | 11/1981 | Yoshino et al. |
| 4,318,489 | A | 3/1982 | Snyder et al. |
| 4,318,882 | A | 3/1982 | Agrawal et al. |
| 4,321,483 | A | 3/1982 | Dugan |
| 4,338,765 | A | 7/1982 | Ohmori et al. |
| 4,355,728 | A | 10/1982 | Ota et al. |
| 4,377,191 | A | 3/1983 | Yamaguchi |
| 4,378,328 | A | 3/1983 | Przytulla |
| 4,381,061 | A | 4/1983 | Cerny et al. |
| D269,158 | S | 5/1983 | Gaunt et al. |
| 4,386,701 | A | 6/1983 | Galer |
| 4,412,866 | A | 11/1983 | Schoenrock et al. |
| 4,436,216 | A | 3/1984 | Chang |
| 4,444,308 | A | 4/1984 | Macewen |
| 4,450,878 | A | 5/1984 | Takada et al. |
| 4,465,199 | A | 8/1984 | Aoki |
| 4,497,855 | A | 2/1985 | Agrawal |
| 4,542,029 | A | 9/1985 | Caner et al. |
| 4,577,775 | A | 3/1986 | Kresin |
| 4,610,366 | A | 9/1986 | Estes et al. |
| 4,628,669 | A | 12/1986 | Herron et al. |
| 4,642,968 | A | 2/1987 | Mchenry et al. |
| 4,645,078 | A | 2/1987 | Reyner |
| 4,667,454 | A | 5/1987 | Mchenry et al. |
| 4,684,025 | A | 8/1987 | Copland et al. |
| 4,685,273 | A | 8/1987 | Caner et al. |
| D292,378 | S | 10/1987 | Brandt et al. |
| 4,749,092 | A | 6/1988 | Sugiura et al. |
| 4,773,458 | A | 9/1988 | Touzani |
| 4,785,949 | A | 11/1988 | Krishnakumar et al. |
| 4,785,950 | A | 11/1988 | Miller et al. |
| 4,807,424 | A | 2/1989 | Robinson et al. |
| 4,813,556 | A | 3/1989 | Lawrence |
| 4,831,050 | A | 5/1989 | Cassidy et al. |
| 4,836,398 | A | 6/1989 | Leftault, Jr. et al. |
| 4,840,289 | A | 6/1989 | Fait et al. |
| 4,850,493 | A | 7/1989 | Howard, Jr. |
| 4,850,494 | A | 7/1989 | Howard, Jr. |
| 4,865,206 | A | 9/1989 | Behm et al. |
| 4,865,211 | A | 9/1989 | Hollingsworth |
| 4,867,323 | A | 9/1989 | Powers |
| 4,880,129 | A | 11/1989 | Mchenry et al. |
| 4,887,730 | A | 12/1989 | Touzani |
| 4,892,205 | A | 1/1990 | Powers et al. |
| 4,896,205 | A | 1/1990 | Weber |
| 4,921,147 | A | 5/1990 | Poirier |
| 4,967,538 | A | 11/1990 | Leftault, Jr. et al. |
| 4,976,538 | A | 12/1990 | Ake |
| 4,978,015 | A | 12/1990 | Walker |
| 4,997,692 | A | 3/1991 | Yoshino |
| 5,004,109 | A | 4/1991 | Bartley |
| 5,005,716 | A | 4/1991 | Eberle |
| 5,014,868 | A | 5/1991 | Wittig et al. |
| 5,024,340 | A | 6/1991 | Alberghini et al. |
| 5,060,453 | A | 10/1991 | Alberghini et al. |
| 5,067,622 | A | 11/1991 | Garver et al. |
| 5,090,180 | A | 2/1992 | Sorensen |
| 5,092,474 | A | 3/1992 | Leigner |
| 5,133,468 | A | 7/1992 | Brunson et al. |
| 5,141,121 | A | 8/1992 | Brown et al. |
| 5,178,290 | A | 1/1993 | Ota et al. |
| 5,199,587 | A | 4/1993 | Ota et al. |

(56)                References Cited

U.S. PATENT DOCUMENTS

| | | | |
|---|---|---|---|
| 5,199,588 A | 4/1993 | Hayashi |
| 5,201,438 A | 4/1993 | Norwood et al. |
| 5,217,737 A | 6/1993 | Gygax et al. |
| 5,234,126 A | 8/1993 | Jonas et al. |
| 5,244,106 A | 9/1993 | Takacs |
| 5,251,424 A | 10/1993 | Zenger et al. |
| 5,255,889 A | 10/1993 | Collette et al. |
| 5,261,544 A | 11/1993 | Weaver, Jr. |
| 5,279,433 A | 1/1994 | Krishnakumar et al. |
| 5,281,387 A | 1/1994 | Collette et al. |
| 5,333,761 A | 8/1994 | Davis et al. |
| 5,341,946 A | 8/1994 | Vailliencourt et al. |
| 5,392,937 A | 2/1995 | Prevot |
| 5,411,699 A | 5/1995 | Collette et al. |
| 5,454,481 A | 10/1995 | Hsu |
| 5,472,105 A | 12/1995 | Krishnakumar et al. |
| 5,472,181 A | 12/1995 | Lowell |
| RE35,140 E | 1/1996 | Powers, Jr. |
| 5,484,052 A | 1/1996 | Pawloski et al. |
| 5,503,283 A | 4/1996 | Semersky |
| 5,593,063 A | 1/1997 | Claydon et al. |
| 5,598,941 A | 2/1997 | Semersky |
| 5,632,397 A | 5/1997 | Fandeux et al. |
| 5,642,826 A | 7/1997 | Melrose |
| 5,672,730 A | 9/1997 | Cottman |
| 5,690,244 A | 11/1997 | Darr |
| 5,704,504 A | 1/1998 | Bueno |
| 5,713,480 A | 2/1998 | Petre et al. |
| 5,730,314 A | 3/1998 | Wiemann et al. |
| 5,730,914 A | 3/1998 | Ruppmann, Sr. |
| 5,737,827 A | 4/1998 | Kuse et al. |
| 5,758,802 A | 6/1998 | Wallays |
| 5,762,221 A | 6/1998 | Tobias et al. |
| 5,780,130 A | 7/1998 | Hansen et al. |
| 5,785,197 A | 7/1998 | Slat |
| 5,819,507 A | 10/1998 | Kaneko et al. |
| 5,829,614 A | 11/1998 | Collette et al. |
| 5,858,300 A | 1/1999 | Shimizu et al. |
| 5,860,556 A | 1/1999 | Robbins, III |
| 5,887,739 A | 3/1999 | Prevot et al. |
| 5,888,598 A | 3/1999 | Brewster et al. |
| 5,897,090 A | 4/1999 | Smith et al. |
| 5,906,286 A | 5/1999 | Matsuno et al. |
| 5,908,128 A | 6/1999 | Krishnakumar et al. |
| D415,030 S | 10/1999 | Searle et al. |
| 5,976,653 A | 11/1999 | Collette et al. |
| RE36,639 E | 4/2000 | Okhai |
| 6,065,624 A | 5/2000 | Steinke |
| 6,077,554 A | 6/2000 | Wiemann et al. |
| 6,105,815 A | 8/2000 | Mazda et al. |
| 6,176,382 B1 | 1/2001 | Bazlur Rashid |
| 6,213,325 B1 | 4/2001 | Cheng et al. |
| 6,228,317 B1 | 5/2001 | Smith et al. |
| 6,230,912 B1 | 5/2001 | Rashid |
| 6,277,321 B1 | 8/2001 | Vailliencourt et al. |
| 6,290,094 B1 | 9/2001 | Arnold et al. |
| 6,298,638 B1 | 10/2001 | Bettle |
| 6,375,025 B1 | 4/2002 | Mooney |
| 6,390,316 B1 | 5/2002 | Mooney |
| 6,413,466 B1 | 7/2002 | Boyd et al. |
| 6,439,413 B1 | 8/2002 | Prevot et al. |
| 6,467,639 B2 | 10/2002 | Mooney |
| 6,485,669 B1 | 11/2002 | Boyd et al. |
| 6,502,369 B1 | 1/2003 | Andison et al. |
| 6,514,451 B1 | 2/2003 | Boyd et al. |
| 6,585,124 B2 | 7/2003 | Boyd et al. |
| 6,595,380 B2 | 7/2003 | Silvers |
| 6,612,451 B2 | 9/2003 | Tobias et al. |
| 6,662,960 B2 | 12/2003 | Hong et al. |
| 6,749,780 B2 | 6/2004 | Tobias |
| 6,763,968 B1 | 7/2004 | Boyd et al. |
| 6,769,561 B2 | 8/2004 | Futral et al. |
| 6,779,673 B2 | 8/2004 | Melrose |
| 6,923,334 B2 | 8/2005 | Melrose et al. |
| 6,942,116 B2 | 9/2005 | Lisch et al. |
| 6,983,858 B2 | 1/2006 | Slat et al. |
| 7,051,889 B2 | 5/2006 | Boukobza |
| 7,077,279 B2 | 7/2006 | Melrose |
| 7,137,520 B1 | 11/2006 | Melrose |
| 7,150,372 B2 | 12/2006 | Lisch et al. |
| 7,159,374 B2 | 1/2007 | Abercrombie, III et al. |
| 7,520,400 B2 | 4/2009 | Young et al. |
| 7,717,282 B2 | 5/2010 | Melrose |
| 7,900,425 B2 | 3/2011 | Bysick et al. |
| 8,028,498 B2 | 10/2011 | Melrose |
| 8,075,833 B2 | 12/2011 | Kelley |
| 8,127,955 B2 | 3/2012 | Denner et al. |
| 8,152,010 B2 | 4/2012 | Melrose |
| 8,381,940 B2 | 2/2013 | Melrose et al. |
| 8,584,879 B2 | 11/2013 | Melrose et al. |
| 9,624,018 B2 | 4/2017 | Melrose |
| 10,246,238 B2 | 4/2019 | Melrose et al. |
| 10,435,223 B2 | 10/2019 | Melrose et al. |
| 10,611,544 B2 | 4/2020 | Melrose et al. |
| 10,836,552 B2 | 11/2020 | Melrose et al. |
| 11,377,287 B2 | 7/2022 | Melrose et al. |
| 11,565,867 B2 | 1/2023 | Melrose et al. |
| 11,731,823 B2 | 8/2023 | Melrose et al. |
| 11,993,443 B2 * | 5/2024 | Melrose et al. ...... B67C 7/0006 |
| 2001/0035391 A1 | 11/2001 | Young et al. |
| 2001/0054597 A1 | 12/2001 | Ozawa et al. |
| 2002/0074336 A1 | 6/2002 | Silvers |
| 2002/0096486 A1 | 7/2002 | Bourque et al. |
| 2002/0153343 A1 | 10/2002 | Tobias et al. |
| 2002/0158038 A1 | 10/2002 | Heisel et al. |
| 2003/0015491 A1 | 1/2003 | Melrose |
| 2003/0173327 A1 | 9/2003 | Melrose |
| 2003/0186006 A1 | 10/2003 | Schmidt et al. |
| 2003/0196926 A1 | 10/2003 | Tobias et al. |
| 2003/0217947 A1 | 11/2003 | Ishikawa et al. |
| 2003/0221987 A1 | 12/2003 | Trude |
| 2004/0016716 A1 | 1/2004 | Melrose |
| 2004/0028910 A1 | 2/2004 | Yamamoto et al. |
| 2004/0074864 A1 | 4/2004 | Melrose et al. |
| 2004/0149677 A1 | 8/2004 | Slat et al. |
| 2004/0173565 A1 | 9/2004 | Semersky |
| 2004/0173656 A1 | 9/2004 | Seong |
| 2004/0211746 A1 | 10/2004 | Trude |
| 2004/0232103 A1 | 11/2004 | Lisch et al. |
| 2006/0006133 A1 | 1/2006 | Lisch et al. |
| 2006/0118508 A1 | 6/2006 | Kraft et al. |
| 2006/0138074 A1 | 6/2006 | Melrose |
| 2006/0231985 A1 | 10/2006 | Kelley |
| 2006/0243698 A1 | 11/2006 | Melrose |
| 2006/0255005 A1 | 11/2006 | Melrose et al. |
| 2006/0261031 A1 | 11/2006 | Melrose |
| 2007/0017892 A1 | 1/2007 | Melrose |
| 2007/0045312 A1 | 3/2007 | Abercrombie, III et al. |
| 2007/0051073 A1 | 3/2007 | Kelley et al. |
| 2007/0084821 A1 | 4/2007 | Bysick et al. |
| 2007/0125743 A1 | 6/2007 | Pritchett et al. |
| 2007/0181403 A1 | 8/2007 | Sheets et al. |
| 2007/0199915 A1 | 8/2007 | Denner et al. |
| 2007/0199916 A1 | 8/2007 | Denner et al. |
| 2007/0215571 A1 | 9/2007 | Trude |
| 2007/0235905 A1 | 10/2007 | Trude et al. |
| 2008/0035601 A1 | 2/2008 | Derrien |
| 2008/0047964 A1 | 2/2008 | Denner et al. |
| 2008/0179271 A1 | 7/2008 | Bangi |
| 2009/0028976 A1 | 1/2009 | Dannebey et al. |
| 2009/0263534 A1 | 10/2009 | Lesueur |
| 2010/0170200 A1 | 7/2010 | Kelley et al. |
| 2010/0176526 A1 * | 7/2010 | Jover et al. ............ B29C 49/16 |
| | | 425/149 |
| 2014/0166676 A1 | 6/2014 | Melrose |
| 2014/0300035 A1 * | 10/2014 | Eberle et al. ......... B29C 49/071 |
| | | 264/529 |
| 2015/0076105 A1 * | 3/2015 | Sato et al. ............. B67C 3/045 |
| | | 53/111 R |
| 2015/0290867 A1 * | 10/2015 | Derrien et al. ....... B29C 49/541 |
| | | 264/529 |
| 2015/0328825 A1 * | 11/2015 | Bunel et al. .......... B29C 49/071 |
| | | 264/535 |
| 2019/0382180 A1 | 12/2019 | Melrose et al. |

(56) References Cited

U.S. PATENT DOCUMENTS

| | | | |
|---|---|---|---|
| 2019/0382181 A1 | 12/2019 | Melrose et al. | |
| 2020/0031553 A1 | 1/2020 | Melrose et al. | |
| 2024/0399642 A1* | 12/2024 | Kulzer et al. | ....... B29C 49/1212 |

FOREIGN PATENT DOCUMENTS

| | | | |
|---|---|---|---|
| DE | 1 586 488 A1 | 1/1972 | |
| DE | 17 61 753 | 1/1972 | |
| DE | 2 102 319 A1 | 8/1972 | |
| DE | 32 15 866 | 11/1983 | |
| EP | 0 521 642 | 1/1993 | |
| EP | 0 551 788 | 7/1993 | |
| EP | 0 666 222 | 8/1995 | |
| EP | 0 609 348 | 1/1997 | |
| EP | 0 916 406 | 5/1999 | |
| EP | 0 957 030 A2 | 11/1999 | |
| EP | 1 063 076 | 12/2000 | |
| EP | 1565381 | 8/2005 | |
| EP | 1 645 515 A1 | 4/2006 | |
| FR | 1 571 499 | 6/1969 | |
| FR | 2503665 A1 | 10/1982 | |
| FR | 2 607 109 | 5/1988 | |
| GB | 781103 | 8/1957 | |
| GB | 1113988 | 5/1968 | |
| GB | 2050919 | 1/1981 | |
| GB | 2189214 A | 10/1987 | |
| GB | 2372977 | 9/2002 | |
| GE | 2000-677 A1 | 8/2000 | |
| JP | 48-31050 | 9/1973 | |
| JP | 49-28628 | 7/1974 | |
| JP | 54-72181 A | 6/1979 | |
| JP | 56-72730 | 6/1981 | |
| JP | 55-114717 | 2/1982 | |
| JP | 63-189224 | 8/1988 | |
| JP | 64-009146 | 1/1989 | |
| JP | 03-043342 | 2/1991 | |
| JP | 03-076625 | 4/1991 | |
| JP | H04-339751 A | 11/1992 | |
| JP | 05-193694 | 8/1993 | |
| JP | 06-336238 | 12/1994 | |
| JP | 07-300121 | 11/1995 | |
| JP | H08-53115 A | 2/1996 | |
| JP | 08-253220 | 10/1996 | |
| JP | 09-039934 | 2/1997 | |
| JP | 09-110045 | 4/1997 | |
| JP | 10-167226 | 6/1998 | |
| JP | 10-181734 | 7/1998 | |
| JP | 10-230919 | 9/1998 | |
| JP | 2000-168756 A | 6/2000 | |
| JP | 2000-229615 | 8/2000 | |
| JP | 2002-127237 | 5/2002 | |
| JP | 2006-501109 A | 1/2006 | |
| NZ | 240448 A | 6/1995 | |
| NZ | 296014 A | 10/1998 | |
| NZ | 335565 A | 10/1999 | |
| NZ | 506684 | 8/2000 | |
| NZ | 512423 | 6/2001 | |
| NZ | 521694 | 10/2003 | |
| RU | 2021956 | 10/1994 | |
| RU | 2096288 | 11/1997 | |
| WO | 1993/009031 | 5/1993 | |
| WO | 1993/012975 | 7/1993 | |
| WO | 1994/005555 | 3/1994 | |
| WO | 1997/003885 | 2/1997 | |
| WO | 1997/014617 | 4/1997 | |
| WO | 1997/034808 | 9/1997 | |
| WO | 1999/021770 | 5/1999 | |

OTHER PUBLICATIONS

IPRP for PCT/NZ03/000220, completed Jan. 11, 2005.
IPRP With Written Opinion for PCT/US2004/016405; completed Nov. 25, 2005.
ISR for PCT/NZ01/000176 (WO 02/018213), mailed Nov. 8, 2001.
ISR for PCT/NZ03/00220, mailed Nov. 27, 2003.
ISR for PCT/US2004/016405 attached to WO 2004/106176.
IPRP with Written Opinion issued in International Application No. PCT/US2004/024581, dated Jan. 30, 2006.
IPRP with Written Opinion issued in International Application No. PCT/US2007/010182, dated Oct. 28, 2008.
ISR issued in International Application No. PCT/US2004/024581, dated Jul. 25, 2005.
ISR issued in International Application No. PCT/US2007/01018, dated Oct. 2007.
National Intellectual Property Center of Georgia "Sakpatenti", Search Report in Filing No. 8770/01, Application No. AP2003 008770, GE19049, Mar. 1, 2006.
Notice of Rejection in Japanese Patent Application No. 2002-523347, dated May 24, 2011.
Notice of Rejection of Japanese Patent Application No. 2002-523347, dated May 29, 2012.

* cited by examiner

METHOD OF PROCESSING A PLASTIC CONTAINER TO INCREASE INTERNAL PRESSURE

CROSS-REFERENCE TO RELATED APPLICATIONS

The present application is a continuation-in-part of U.S. patent application Ser. No. 18/671,257, filed on 22 May 2024 and published as US2024/0308750, which is a continuation of U.S. patent application Ser. No. 18/159,339, filed on Jan. 25, 2023, now U.S. Pat. No. 11,993,443, issued May 28, 2024, which is a continuation of U.S. patent application Ser. No. 16/594,524, filed on Oct. 7, 2019, now U.S. Pat. No. 11,565,867, issued Jan. 31, 2023, which is a continuation of U.S. patent application Ser. No. 15/074,791, filed on Mar. 18, 2016, now U.S. Pat. No. 10,435,223, issued Oct. 8, 2019, which is a continuation of U.S. patent application Ser. No. 13/415,831, filed on Mar. 8, 2012 (the '831 application, and published as US2013/0312368), now U.S. Pat. No. 9,731,884, issued Aug. 15, 2017.

BACKGROUND OF THE INVENTION

1. Field of the Invention

The present invention relates generally to a hot-fill container structure that allows for the removal of vacuum pressure within the container, and more particularly, to a hot-fill container structure having an invertible vacuum panel deeply set into the base of the container. The present invention also relates to methods of making and processing containers having an invertible vacuum panel deeply set into the base of the container.

2. Related Art

The following Patent Applications are incorporated herein by reference in their entirety: U.S. Pat. Nos. 3,843,005 and 3,949,034 issued to Uhlig; U.S. Pat. No. 4,465,199 issued to Aoki; EP 1,069,983 issued to Valliencourt; U.S. Pat. No. 6,230,912 issued to Rashid; U.S. Pat. No. 8,584,879 issued to Melrose and commonly owned by the assignee of the present invention; U.S. Pat. No. 8,047,388 issued to Kelley and commonly owned by the assignee of the present invention; U.S. Pat. No. 8,444,002 issued to Schneider and commonly owned by the assignee of the present invention; U.S. Pat. No. 9,994,378 issued to Wurster and commonly owned by the assignee of the present invention; U.S. Pat. No. 8,881,937 issued to Derrien; U.S. Pat. No. 8,292,612 issued to Langlois; U.S. Pat. No. 8,616,395 issued to Patcheak; U.S. Pat. No. 9,688,013 issued to Derrien; and, U.S. Pat. No. 9,676,140 issued to Deau.

So called "hot-fill" containers are known in the art. Plastic containers, such as PET containers, are filled with various liquid contents at an elevated temperature, typically around 185 degrees fahrenheit (F). Once the liquid within the container cools, the volume of the contained liquid reduces, creating a vacuum within the container that pulls inwardly on the side and end walls of the container. This in turn leads to deformation of the plastic container if it is not constructed rigidly enough to resist the vacuum forces.

To compensate for the change in volume inside the container it is known to provide pressure compensating features in various locations on the container sidewall including the dome, the barrel, and the bottom portion. The pressure compensating features move in response to pressure changes to decrease the volume as needed through deflecting inwardly under vacuum pressure.

As disclosed in Patcheak at Col. 7, lines 21-64, a container may have a plurality of horizontal ribs 602 in the sidewall and a base portion having vacuum absorbing features that is moveable under a vacuum force and does not require a mechanical force to move the base upwardly to remove vacuum. The Patcheak base panel is also configured with a series of indentations to assist flexibility and is able to be hot filled and cooled leaving a residual vacuum in the container that applies a force that subsequently flexes the base panel inwardly. Patcheak also discloses the ribs 602 collapse under the vacuum force created during cooling. Patcheak further discloses at Col. 7, lines 34-37, that once the container has been cooled and under a vacuum load the container reaches a point where external forces such as top load or side load would beneficially result in a pressurization of the container that would help the stacked container to resist external forces. In Col. 15, lines 25-47, Patcheak identifies that the addition of a top load, for example by bulk packing containers onto pallets once the containers are cooled, may beneficially result in the horizontal ribs 602 compressing further and allowing the plastic container to reach a state wherein the plastic container is "supported in part by the product inside when exposed to excessive top load forces thereby preventing permanent distortion."

A problem exists with Patcheak, however, in that the containers are under moderately strong vacuum pressure after processing and cooling and immediately prior to bulk pallet stacking. Such containers with 'active' vacuum panels in the base, wherein the panel can move in under vacuum results in a final container still exhibiting relatively strong residual vacuum inside the container while in distribution. The panel is in an inward position under the vacuum force, and the container is subsequently stacked in pallets while under a vacuum force.

During bulk stacking, as disclosed by Patcheak, the downward pressure of the top load increases the internal pressure inside the container as the ribs collapse downwardly further from their positions under vacuum following labelling, and a further volume reduction is enforced on the container-driving up the internal pressure due to the container being sealed. However, a certain amount of the potential for increased pressure is in fact relieved by the capacity of the base to move back outwards again under the increased top load (reducing the amount of vacuum pressure as the pressure increases). The reversal of the vacuum panel reduces the potential increase in pressure that would otherwise be available if the panel was instead configured to be resistant to, or locked against, moving outward from the inverted position.

Therefore, there remains a need in the art for plastic containers and a different processing method to Patcheak that overcome the aforementioned shortcomings of the prior art.

SUMMARY OF THE INVENTION

The present invention relates to an 'as-blown' polymeric or plastic container having an invertible pressure panel located in the container base and a method of processing the container to increase top-load resistance. After filling and capping, the pressure panel is mechanically forced from an initial, outwardly-inclined position, to an inverted, inwardly-inclined position, in order to force a reduction in the volume of the sealed container and accommodate for vacuum forces caused by a cooling of heated liquid contents within the container. The entire pressure panel may be set deeply into the base of the container in the blow-molding part of the container processing, such that no portion of the pressure panel extends beyond the standing ring or surface, regardless of whether the pressure panel is in the initial position or the inverted position. This configuration can allow the container to be supported by the standing ring regardless of whether the pressure panel is in the initial position or the inverted position. After filling, the container is further processed by feeding the container into an apparatus that forces a volume reduction while stabilizing the container resulting in an increase in pressure. The container is then stacked in bulk pallet configurations to further increase internal pressures prior to distribution and sale of products.

Other prior art plastic containers suitable for containing a liquid are disclosed in U.S. Pat. No. 5,261,544 issued to Weaver, Jr.; and U.S. Pat. No. 5,908,128 issued to Krishnakumar et al, both of which are incorporated in their entirety in the present specification.

As disclosed in Weaver, Col. 5, lines 26-29, a polymeric container should be blow-molded with a minimum thickness of at least about 10 mils (0.01 inches or 0.254 mm). During blow-molding and heat-setting a container it should be recognized that in forming a container with an average thickness by total container weight of about 10 mils will inevitably lead to thinner portions and container forming performance is generally compromised when the walls fall below a local area thickness of about 8 mils (0.008 inches or 0.2032 mm), thus aiming for blow-molding an average thickness of about 10 mils should lead to a container having at least about 8 mils in the thinnest regions.

Generally, however, hot fill containers also need an amount of sidewall thickness to withstand the mechanical forces generated by vacuum inside during processing the containers. As disclosed in Krishnakumar, Col. 4, lines 17-24, a container of approximately 20 ounces in volume made from 'bottle grade' PET (having about 1.5% comonomer and an intrinsic viscosity of about 0.80) may have a side-wall thickness on the order of 0.4 mm, or 15.7 mils, in order to withstand containing a previously heated liquid.

One object of the present invention is to provide a pressure panel in the base of a container that has a portion that is relatively resistant to substantial movement under vacuum force alone. An object is to provide an apparatus to hold and stabilize the container and mechanically invert the pressure panel in order to achieve a greater, forced volume reduction inside the container than is available in Patcheak, and instead create a positive pressure within the container prior to then also bulk pallet stacking multiple such containers. A further embodiment is to provide a processed container with an inverted base configured to resist outward movement under the increase in pressure during bulk pallet stacking, in order to achieve a greater increase in internal pressure under top load forces of bulk pallet stacking than provided in Patcheak.

The increase in pressure within the container created under bulk pallet stacking is applied unequally throughout an entire vertical load, and analysis and testing has demonstrated so called 'self-activating' vacuum bases as disclosed in Patcheak only provide for a reduction in vacuum within the pallet load of containers, and not to provide a positive pressure during bulk pallet stacking, especially within a single layer height. The present invention, however, provides for a positive pressure inside the containers in order to support the containers to a greater degree.

Table A below shows example analysis and testing of a set of self-activating bases versus containers processed according to the present invention. Bottles were hot-filled, cooled, and in the case of the present invention the bases were mechanically processed in the manner herein disclosed, then tray packed and stacked 7 layers high in corrugate cardboard used to represent trays. Data loggers were placed in various bottles in the bottom layer of the stack (where the most top load would be exhibited) and 6 layers were stacked on top of the bottom layer simulating a completed pallet.

TABLE A

| | Container with Self-Active Base | Container with Mechanically Inverted Base |
|---|---|---|
| Average Pressure prior to Pallet Stack (Bottom Layer) | −3.26 psi | 0.005 psi |
| Average Increase in Pressure during Pallet Stack (Bottom Layer) | 0.582 psi | 0.680 psi |
| Average Pressure during Pallet Stack (Bottom Layer) | −2.56 psi | 0.685 psi |

Containers processed according the present invention, by comparison to Patcheak, have much higher pressures prior to pallet stacking, often a positive pressure. Advantageously, and additionally, the bases of the present invention are configured to resist outward movement when a top load is applied, unlike the bases of Patcheak that are able to move back out under a pressure increase and therefore do not offer resistance to the early top load force application. The bases of the present invention provide immediate resistance to the applied top load of pallet stacking, and therefore there is an increase in internal pressure at a faster rate and to a greater amount. Containers processed according to the present invention exhibit much higher pressures beneficially providing for containers having a positive pressure generally when stacked even one pallet high.

According to one exemplary embodiment, the present invention relates to a method of processing a plastic container wherein a substantial amount of vacuum is mechanically removed from the container after cooling and prior to pallet distribution, and through a locking of the container base in the inverted position a much lower vacuum remains, or even a positive pressure in the cooled container. The container is then bulk packed and a further increase in internal force is provided through the application of top load during storage and distribution. Through the processing of the container according to the present invention, a bulk pallet of containers will therefore more quickly achieve higher pressures than achievable in the prior art, providing a greater amount of support from the incompressible liquid product within the container.

According to one exemplary embodiment, the present invention relates to a plastic container comprising an upper portion including a finish defining an opening into the container, a lower portion including a base defining a standing surface, a sidewall extending between the upper portion and the lower portion, the sidewall defining a longitudinal axis, and at least one substantially transversely-oriented pressure panel located in the lower portion. The pressure panel can be movable between an outwardly inclined position and an inwardly inclined position, moving or inverting in the longitudinal or vertical direction, to compensate for a change of pressure inside the container. The standing surface can define a standing plane, and the entire pressure panel can be located between the standing plane and the upper portion of the container when the pressure panel is in the outwardly inclined position.

According to yet another exemplary embodiment, the present invention relates to a method of blow molding a plastic container, comprising the steps of (a) enclosing a heated and softened polymer material within a blow mold defining a mold cavity, the blow mold comprising at least first and second side mold portions and a base mold portion; (b) inflating the polymer material within the blow mold to at least partially conform the polymer material to the blow mold cavity; (c) displacing the base mold portion with respect to the first and second side mold portions to form a transverse pressure panel deeply set within a base portion of the plastic container; (d) providing the plastic container having an upper portion including a finish, a sidewall, a lower portion including a base defining a standing surface, and the transversely-oriented pressure panel located in the base for further processing on a hot filling line; (e) introducing heated liquid contents into the plastic container within a filling apparatus with the pressure panel located in an outwardly-inclined position entirely between the standing surface and the upper portion; (f) capping the plastic container; (g) stabilizing the container in an apparatus for moving the pressure panel to an inwardly-inclined position above the standing surface to increase the pressure; and (h) stacking the container among multiple other containers in a bulk pallet arrangement several layers high.

Further objectives and advantages, as well as the structure and function of preferred embodiments will become apparent from a consideration of the description, drawings, and examples.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements.

FIG. 15 is a perspective view of the plastic container of FIG. 13, shown with the pressure panel in the initial, outwardly-inclined position;

DETAILED DESCRIPTION OF THE INVENTION

Figure 1:
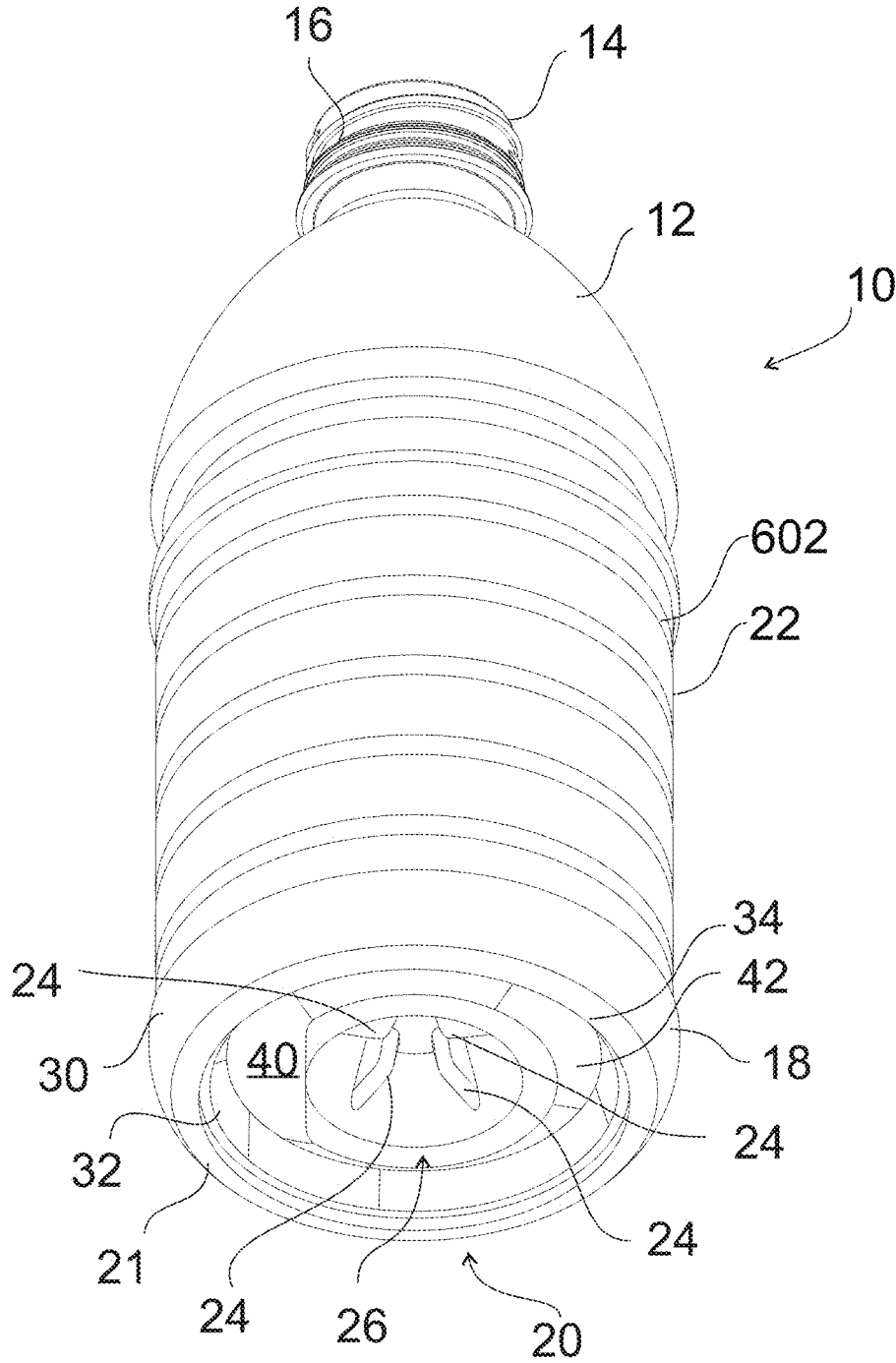
FIG. 1 is a perspective view of an exemplary embodiment of a plastic container according to the present invention, shown with a pressure panel in an initial, outwardly-inclined position.

Embodiments of the invention are discussed in detail below. In describing embodiments, specific terminology is employed for the sake of clarity. However, the invention is not intended to be limited to the specific terminology so selected. While specific exemplary embodiments are discussed, it should be understood that this is done for illustration purposes only. A person skilled in the relevant art will recognize that other components and configurations can be used without departing from the spirit and scope of the invention. All references cited herein are incorporated by reference as if each had been individually incorporated.

As discussed above, to accommodate vacuum forces during cooling of the liquid contents within a hot-fill container, plastic containers have typically included a series of vacuum panels located around the sidewall and/or in the base portion. The vacuum panels deform inwardly, and the base deforms upwardly, under the influence of the vacuum forces. This configuration attempts to prevent unwanted distortion elsewhere in the container. However, the container is still subjected to internal vacuum forces. The sidewalls and base merely provide a suitably resistant structure against that force. Additionally, the vacuum panels in the sidewall can undesirably detract from the appearance and feel of the container and limit the design possibilities for the container.

Typically, at a bottling plant, containers are filled with a hot liquid and then capped before being subjected to a cold water spray in a cooling tunnel, resulting in the formation of a vacuum within the container. The container structure needs to be able to cope with this vacuum force. U.S. patent application Ser. No. 10/529,198, filed on Dec. 15, 2005, the entire content of which is incorporated herein by reference, discloses hot-fill containers that provide for the substantial removal or substantial negation of the vacuum pressure within the containers. The disclosed containers include a transversely-oriented pressure panel located in the container base. The pressure panel is movable between an initial, outwardly inclined position, and an inverted, inwardly inclined position, in order to reduce the volume of the container and accommodate for vacuum forces within the container. The present invention relates to additional embodiments of this concept in which the pressure panel is set deeply into the base of the container, such that no portion of the pressure panel extends beyond the standing ring, regardless of whether the pressure panel is in the initial position or in the inverted position. This configuration can allow the container to be supported by the standing ring regardless of whether the pressure panel is in the initial position or the inverted position.

Referring to FIGS. 1-4, an exemplary embodiment of a plastic container 10 according to the present invention is shown. The container 10 can include an upper portion 12 including a finish 14 that defines an opening into the interior of the container 10. As shown, the finish 14 can include threads 16 or other structures adapted to secure a closure (not shown) onto the container 10. The container 10 can also include a lower portion 18 having a bumper region 83, a chime 82, a base 20, and a sidewall 22 extending between the upper portion 12 and the lower portion 18. The base 20 can define a standing surface 21 that is substantially flat and adapted to support the container 10 in a substantially upright position (e.g., with longitudinal axis A substantially perpendicular to the surface on which container 10 is resting).

In the exemplary embodiment shown, the sidewall 22 is substantially tubular and has a substantially circular transverse cross-sectional shape. Alternative cross-sectional shapes can include, for example, an oval transverse cross-section; a substantially square transverse cross-section; other substantially polygonal transverse cross-sectional shapes such as triangular, pentagonal, etc.; or combinations of curved and arced shapes with linear shapes. As will be understood by one of ordinary skill in the art, when the container 10 has a substantially polygonal transverse cross-sectional shape, the corners of the polygon are typically rounded or chamfered. Although the container 10 is shown as having reinforcing ribs or rings 602 in the sidewall 22 to resist paneling, dents and other unwanted deformation of the sidewall, particularly under vacuum force, other embodiments are possible where the sidewall 22 is substantially devoid of such features (e.g., the sidewall 22 can be smooth like that of a conventional glass container).

Figure 4:
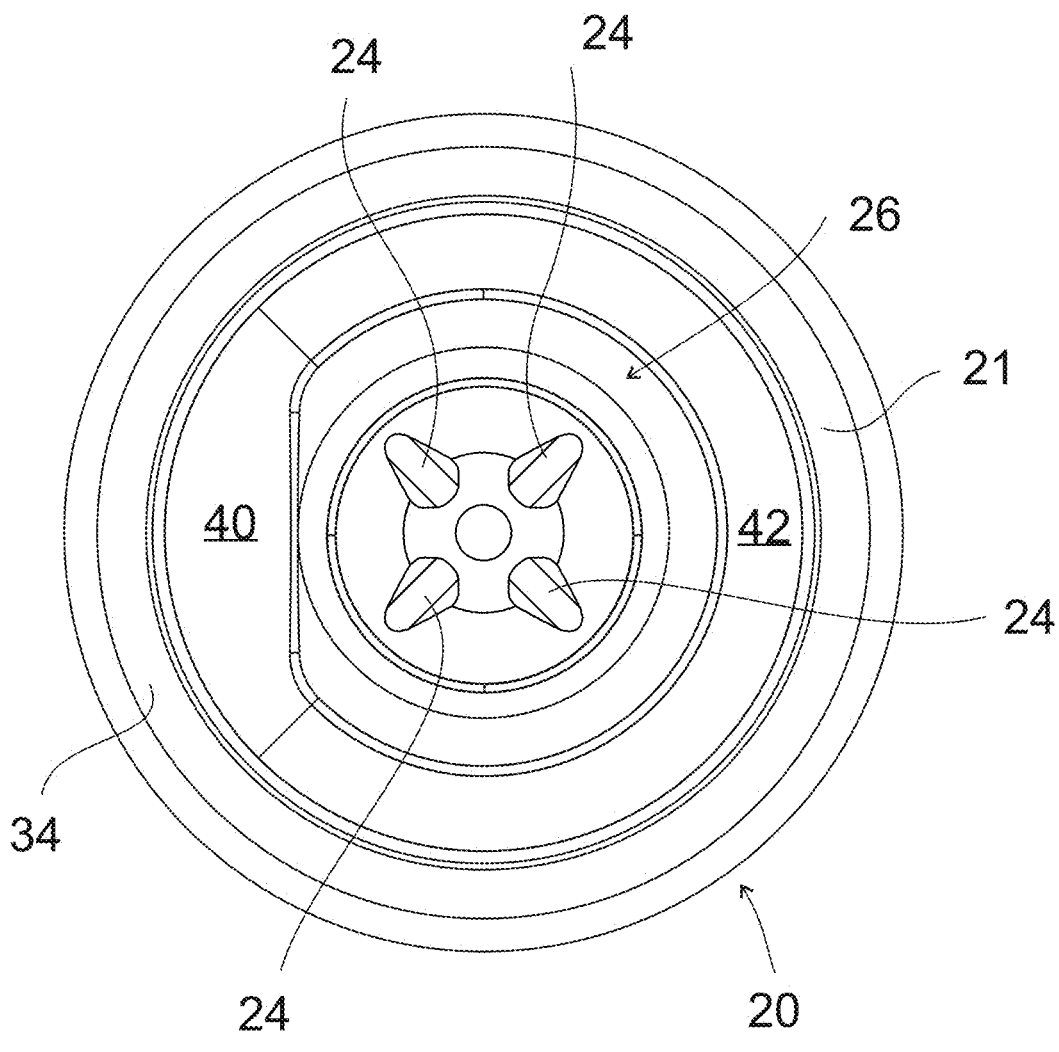
FIG. 4 is a bottom view of the plastic container of FIG. 1.

As best seen in FIG. 4, a portion of the base 20 can include a plurality of reinforcing ribs 24, however other embodiments with or without the reinforcing ribs 24 are possible.

The lower portion 18 of the container 10, and particularly the base 20, can include a substantially transversely-oriented pressure panel 26. The pressure panel 26 can be moved between an outwardly-inclined position (shown in FIGS. 1 and 2) and an inwardly-inclined position (shown in FIG. 3) in order to reduce the internal volume of the container 10 and compensate for any vacuum forces created within the container, for example, during the filling process. For example, the pressure panel 26 may substantially remove the internal vacuum that develops within the container 10 during a hot-fill process once the container 10 has been hot-filled, capped, and cooled.

Figure 2:
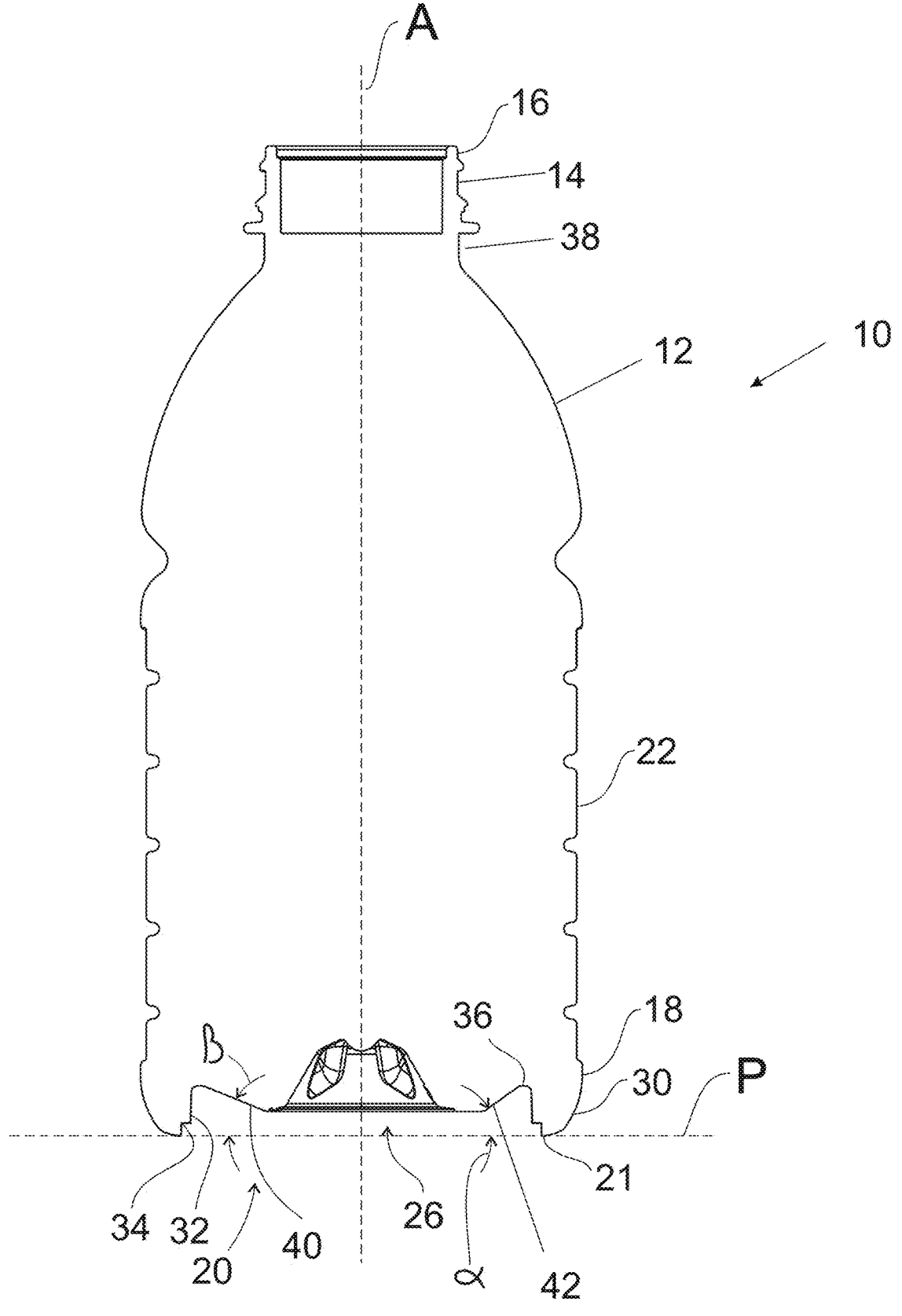
FIG. 2 is a side, sectional view of the plastic container of FIG. 1, shown with the pressure panel in the initial, outwardly-inclined position.
Figure 3:
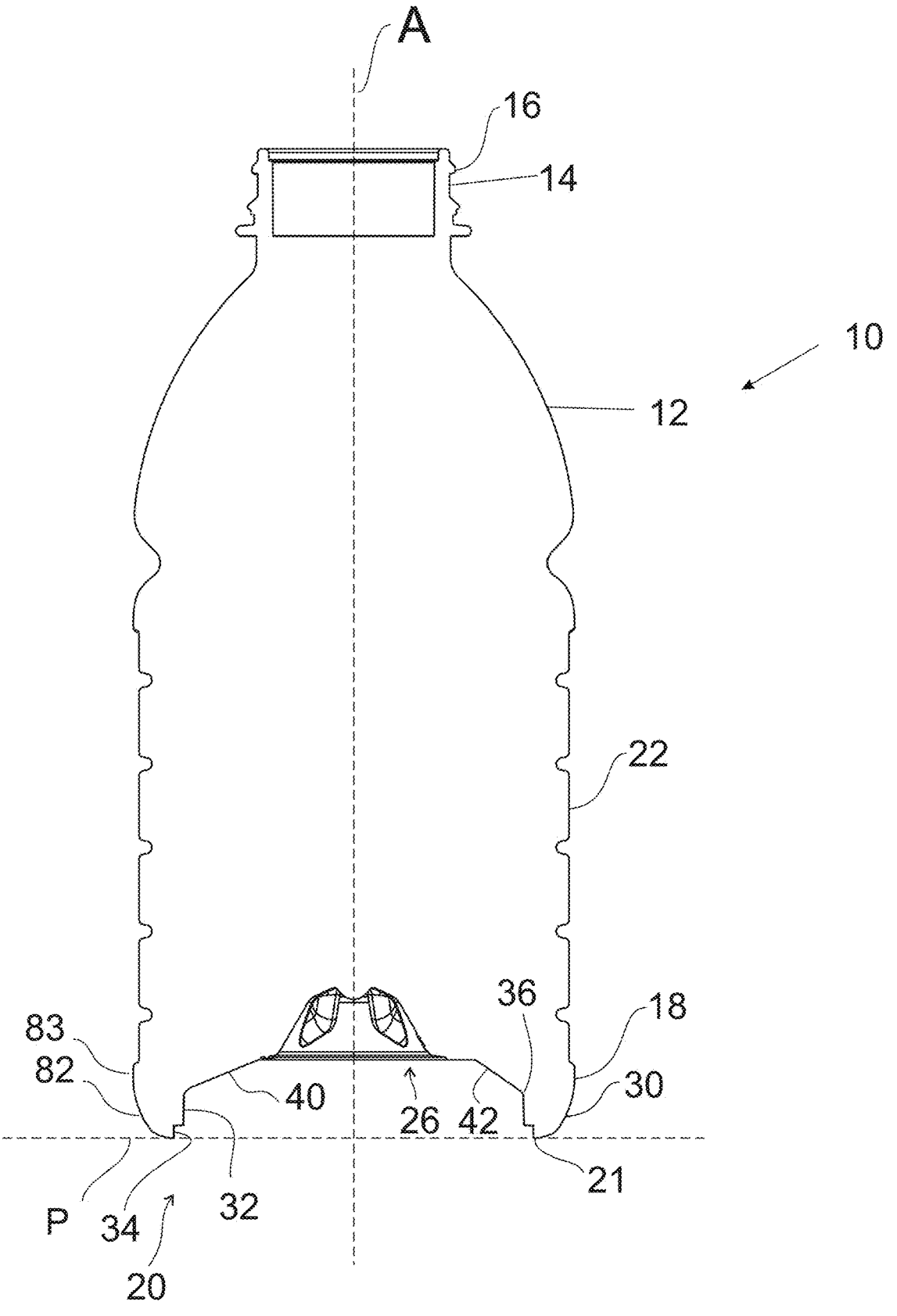
FIG. 3 is a side, sectional view of the plastic container of FIG. 1, shown with the pressure panel in an inverted, inwardly-inclined position.

As best seen in the sectional views of FIGS. 2 and 3, the pressure panel 26 can be deeply set into the container 10 in order to facilitate standing of the container 10 on its standing surface 21 regardless of whether the pressure panel 26 is located in the outwardly-inclined position (FIG. 2) or the inwardly-inclined position (FIG. 3). In other words, the entire pressure panel 26 structure can be located between the plane P of the standing surface 21 and the upper portion 12 of the container 10 when the pressure panel 26 is in the outwardly-inclined position (FIG. 2) and also when the pressure panel 26 is in the inwardly-inclined position (FIG. 3).

Figure 5:
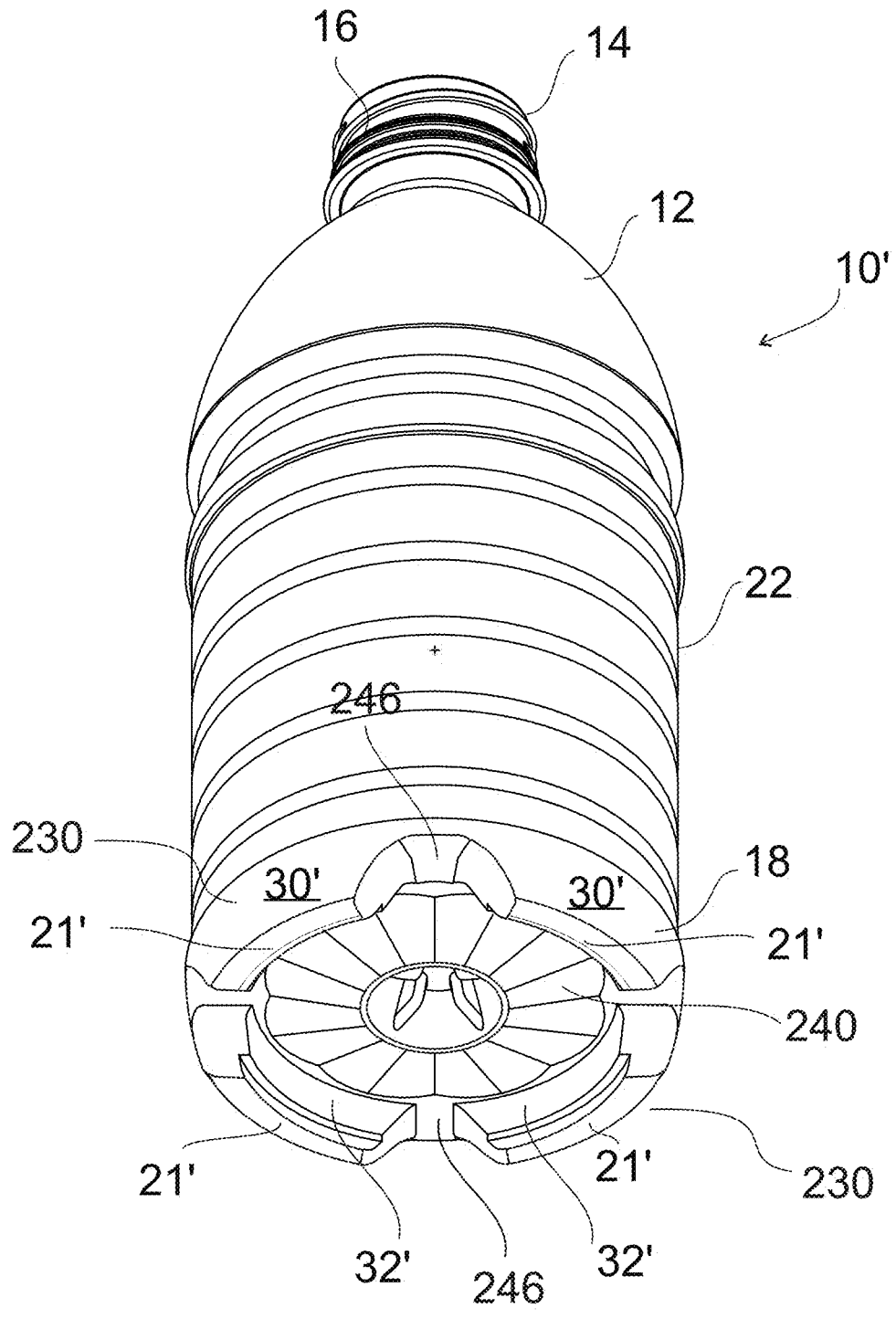
FIG. 5 is a perspective view of another exemplary embodiment of a plastic container according to the present invention, shown with the pressure panel in the initial, outwardly-inclined position.
Figure 18:
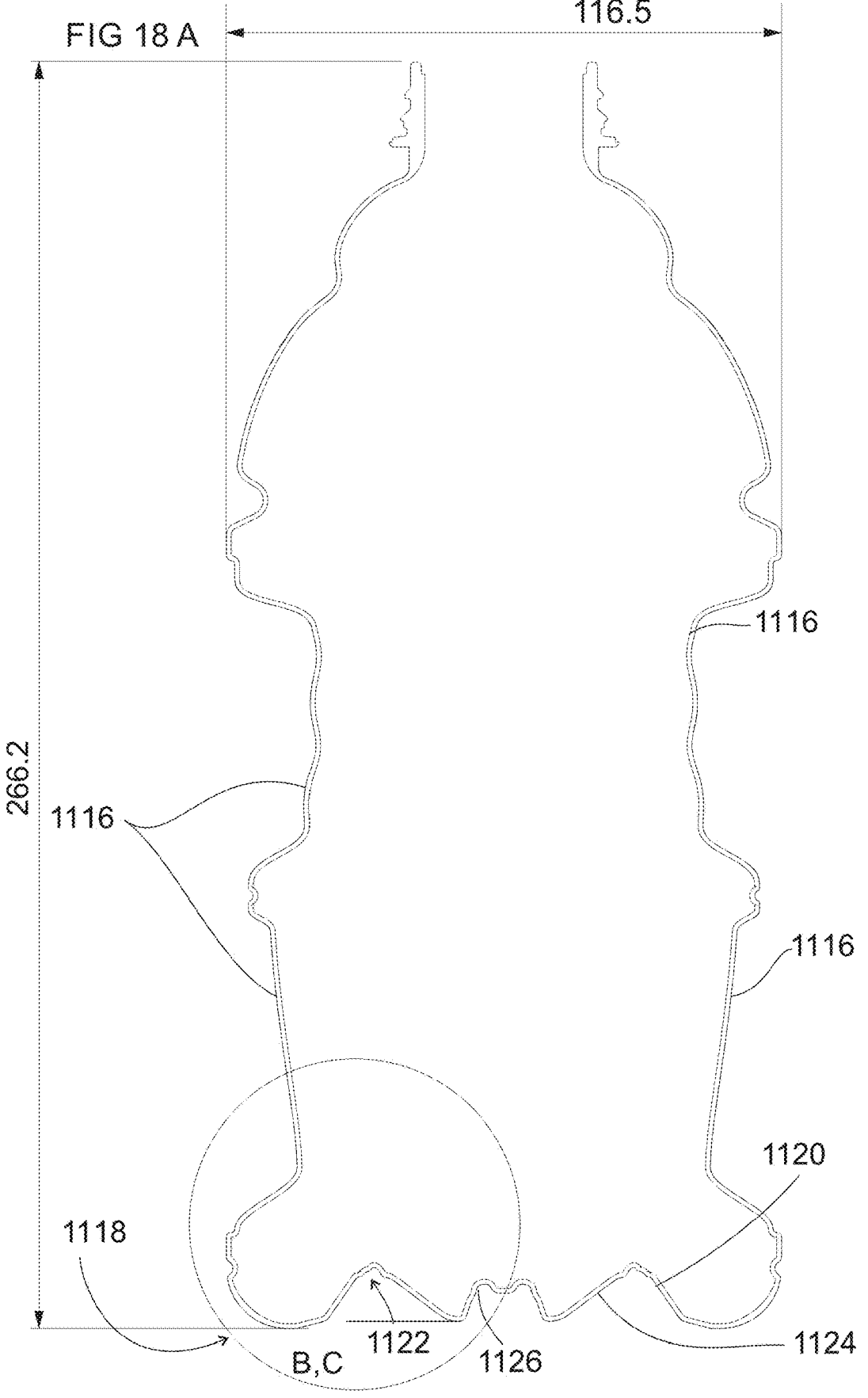
FIGS. 18A-18C is a side, sectional view of a portion of a plastic container according to another embodiment of the present invention.
Figure 18B:
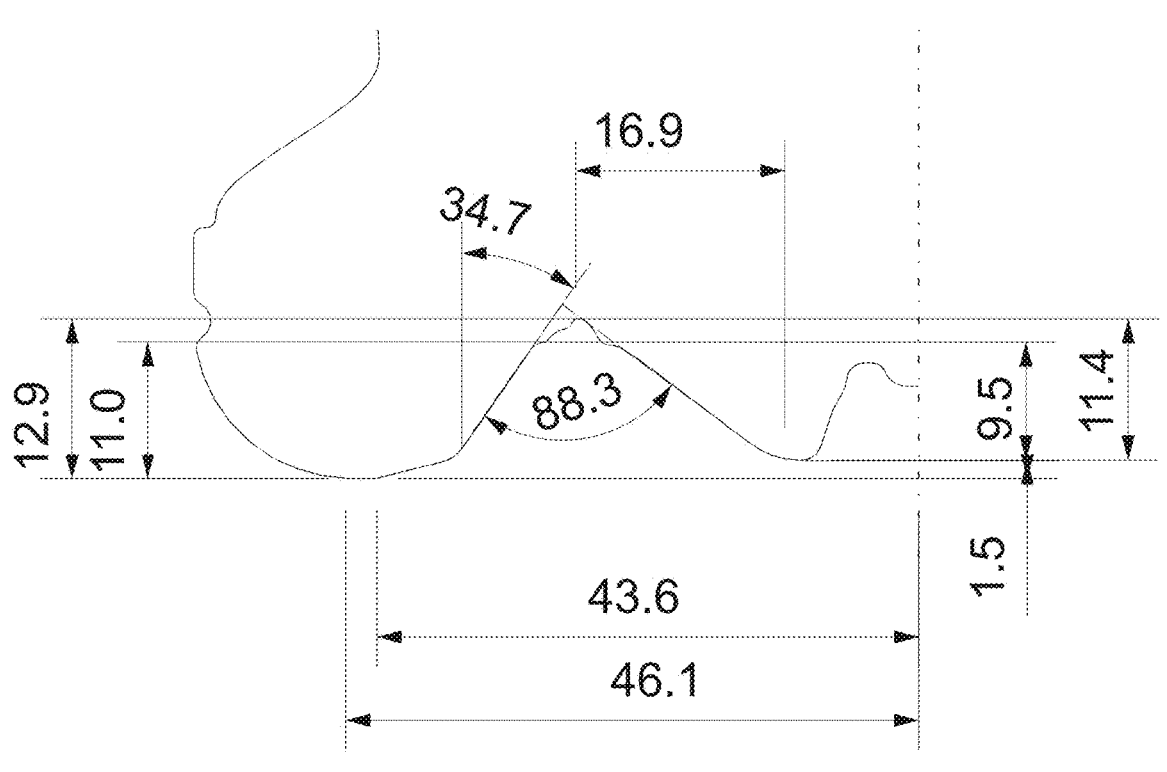
Figure 18C:
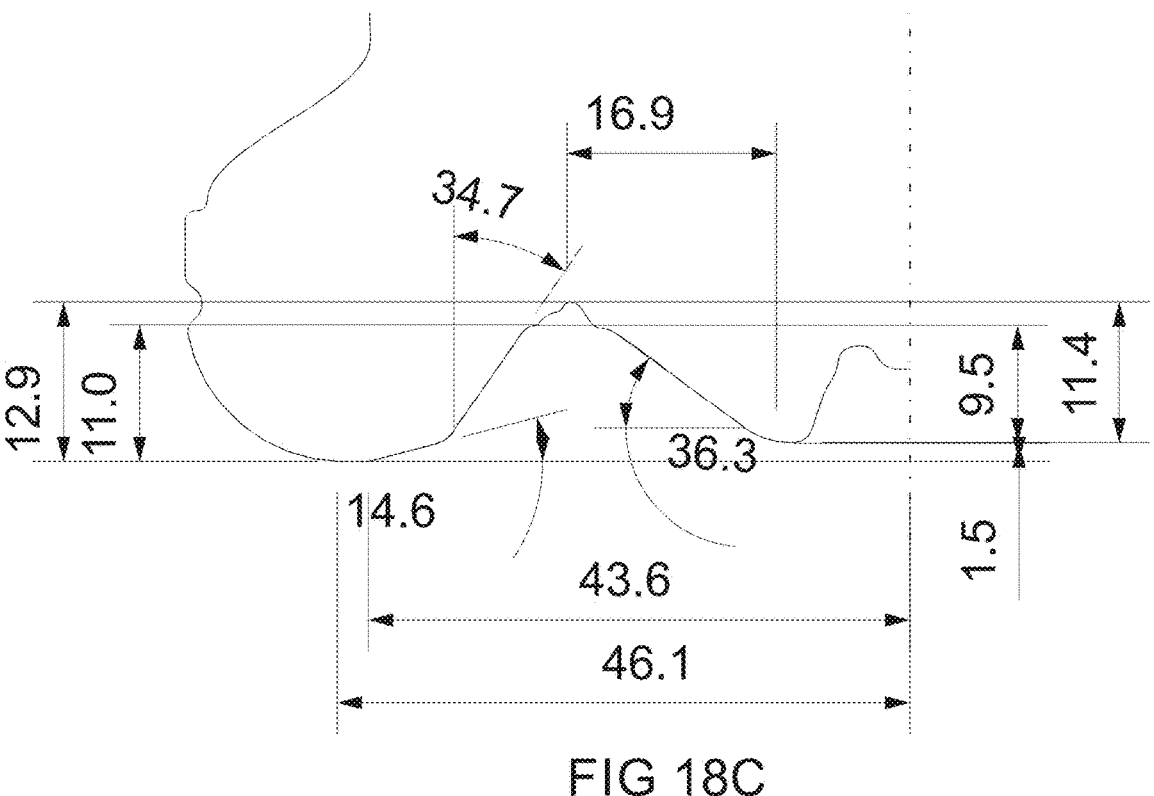
Figure 19:
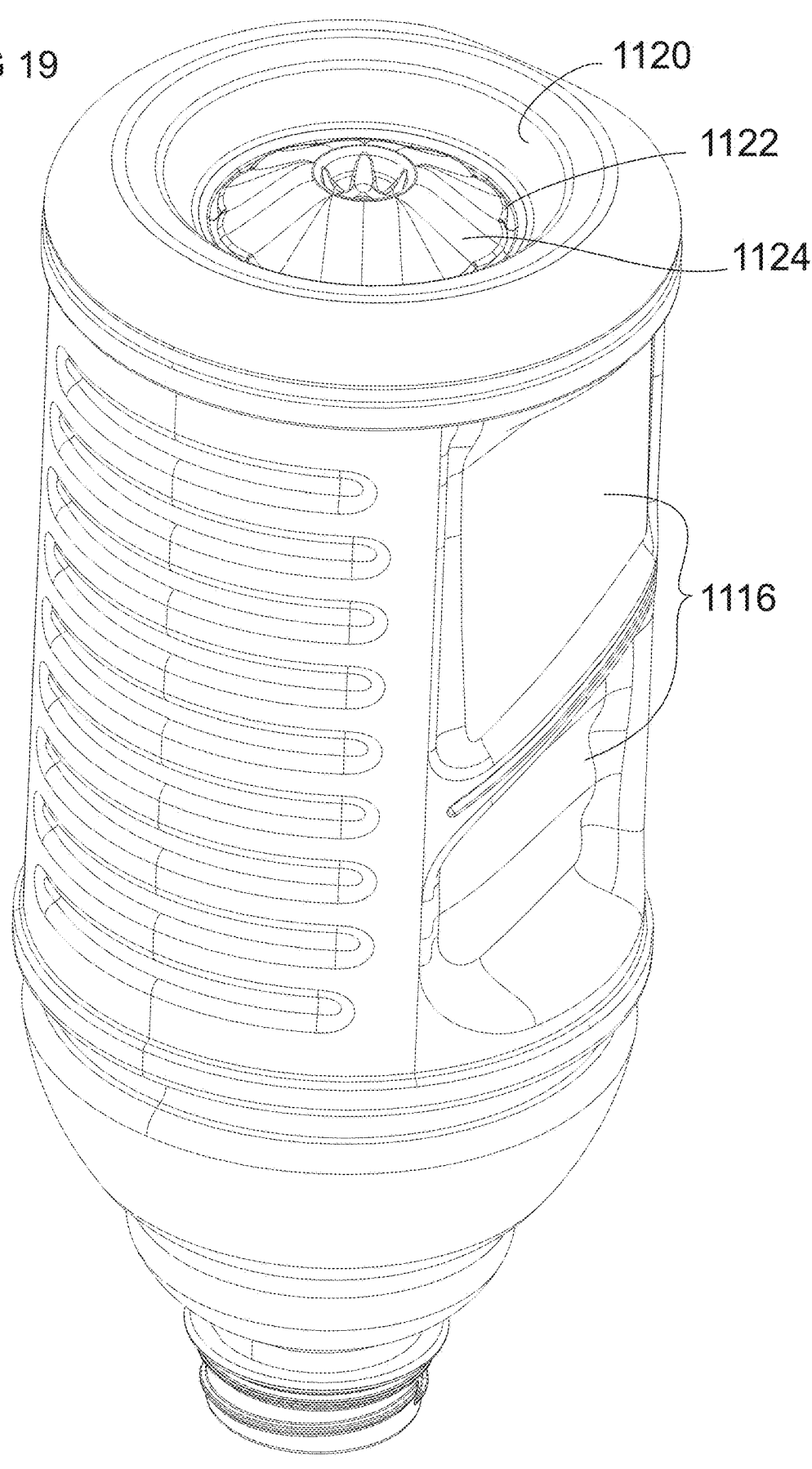
FIG. 19 is a perspective view of the plastic container of FIG. 18, shown with the pressure panel in the initial, outwardly-inclined position.
Figure 20:
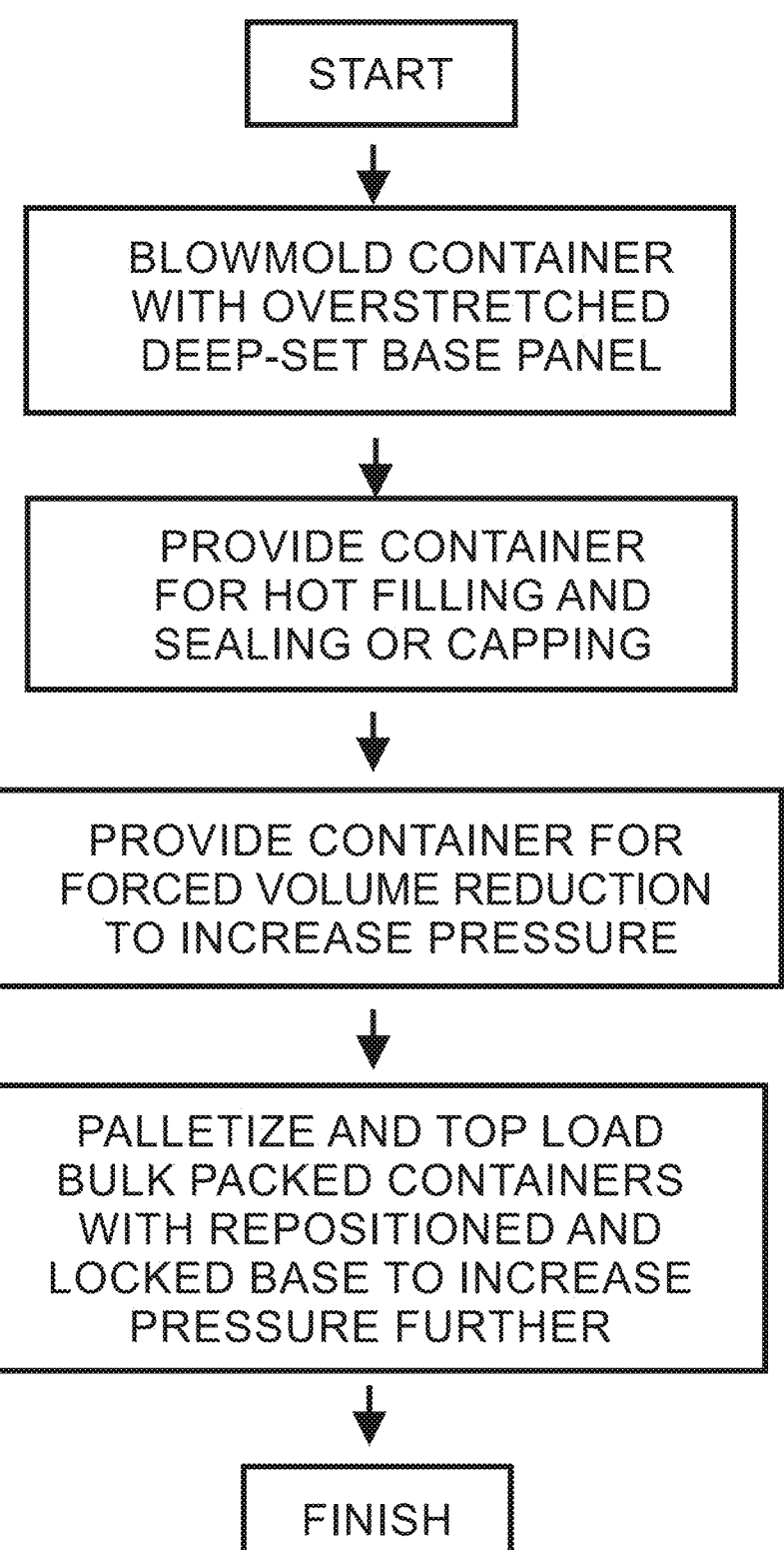
FIG. 20 is a schematic representation of a system for handling plastic containers.
Figure 21:
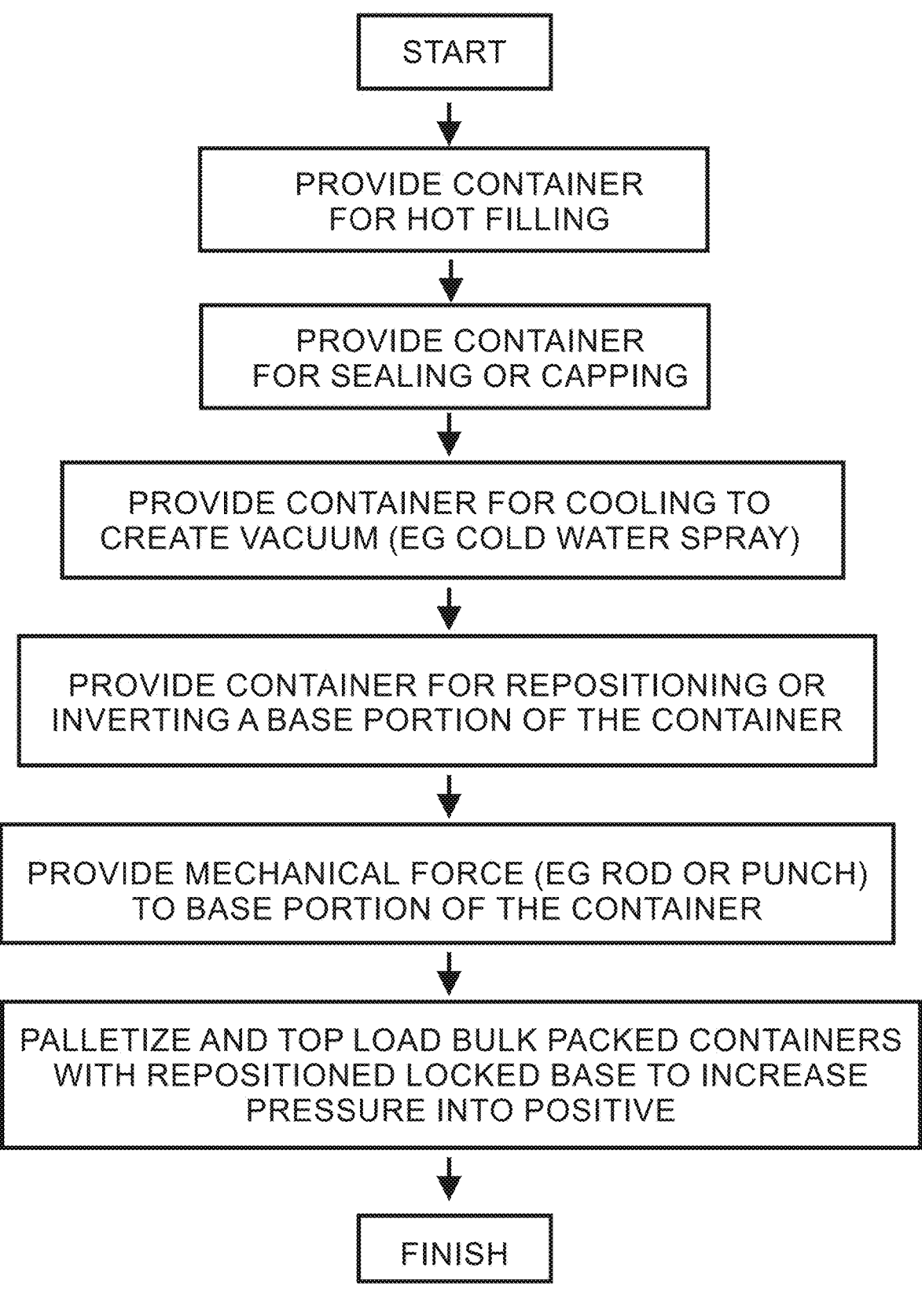
FIG. 21 is a schematic representation of handling plastic containers.

According to the exemplary embodiment shown in FIGS. 1-4, the lower portion 18 of the container 10 includes a concave outer wall portion 30 that forms the chime region 82 and that extends from the lower end of the sidewall 22 to the standing surface 21. The standing surface may be a ring or annular portion as shown in FIG. 1, or may be discontinuous as shown in FIG. 5. The pressure panel 26 is deeply set into the lower portion 18 of the container 10 via an inner wall 32 that extends from the standing surface 21 to the pressure panel 26. The inner wall may therefore comprise an instep or hollow recessed portion between the pressure panel 26 and the standing surface 21. In the exemplary embodiment shown, the inner wall 32 is parallel or nearly parallel to the longitudinal axis A of the container 10, and provides the recessed portion with a concave annular ring shape; however, other configurations and/or inclinations of the inner wall 32 are possible that are not concave annular ring structures, and may have different angles as shown in FIGS. 18-19 with reference to the inner wall 1120. In addition, one of ordinary skill in the art will know that other configurations besides the inner wall 32 may be implemented to set the pressure panel 26 deeply into the lower portion 18. An annular, recessed channel 34 can be provided in the inner wall 32 adjacent the standing surface 21 to provide a further recessed concave ring structure in the inner wall 32. In the exemplary embodiment shown, the annular recessed channel has a substantially square or annular cross-section, however, other shapes are possible for the channel to be inwardly stepped. Channel 34 can act as a rib member and reinforce the foot portion or standing surface 21 and/or facilitate stacking of multiple containers on top of one another, depending on the shape and size of the finish 14 and/or closure.

In the exemplary embodiment of FIGS. 1-4, the standing surface 21, inner wall 32, and outer wall 30 are substantially continuous about the circumference of the container 10 (see FIG. 4). However, as shown in the alternative embodiment of FIGS. 5 and 6, and FIGS. 27A-27E, the container 10' can have a standing surface 21, inner wall 32', and outer wall 30' that are discontinuous.

The pressure panel or inner annular wall 240 has an inner periphery 244 and an outer periphery 242, and is set, with respect to the longitudinal axis and the opening into the container, at an outward or downward angle prior to filling with a heated liquid. The outer annular wall includes support or foot portions 230 and the inner wall portions 32' extend from the standing surfaces 21' to the inner annular wall or pressure panel 240. Radial webs or straps 246 are uniformly spaced apart and separate each support 230. The web surface is closer to the finish than the footed contact surface, or expressed another way, the webs 246 are longitudinally displaced above the footed contact surface 21'. In addition, each support 230 has a larger arcuate extent than that of each radial web 246. The inner annular wall 240 extends within the concave outer annular wall 30'. The outer periphery 242 of the inner annular wall or pressure panel 240 merges with the inner wall 32' of each of the supports 230, and radially or circumferentially with the plurality of spaced-apart, horizontally disposed, radial webs or straps 246 located adjacent the outer periphery 232 of the standing surface of the base. Each of the webs 246 extends between the supports 230 and connects to the container sidewall 22 in the lower portion 18 at an elevation above the horizontal plane "P" extending through the standing surface 21 to form radius 202 such that web surface 246 is visible from a side of the container. Preferably the inner annular wall 240 and the central dimple or push up 248 merge via an annular hinge 250 at the foot of the push-up, comprising radius 251.

In order to facilitate movement (e.g., folding) of the pressure panel 26 between the outwardly-inclined position of FIG. 2 and the inwardly-inclined position of FIG. 3, pressure panel 26 can include a decoupling or hinge structure 36 that is located between the inner wall 32 and the pressure panel 26. In the exemplary embodiment shown, the hinge structure 36 comprises a substantially flat, non-ribbed region, that is susceptible to folding, however, other configurations of the hinge structure, such as a crease, are possible.

Referring now particularly to FIG. 4, the pressure panel 26 can comprise an initiator portion 40 and a control portion 42. Both the initiator portion 40 and control portion 42 can comprise part of the pressure panel 26 that folds when the pressure panel 26 is moved from its initial position in FIG. 2 to its inverted position in FIG. 3. The initiator portion 40 can be adapted to move or fold before the rest of the pressure panel 26 (e.g., before the control portion 42). In the exemplary embodiment shown, the control portion 42 is at a steeper angle to the standing plane P than the initiator portion 40, thereby resisting expansion of the pressure panel from the inverted state (FIG. 3) to the initial state (FIG. 2), for example, if the container 10 were accidentally dropped.

In order to maximize the amount of vacuum compensation from the pressure panel 26, it is preferable for at least the control portion 42 to have a steep angle of inclination with respect to the standing plane P. As shown in FIG. 2, the control portion 42 can be at a first angle alpha, with respect to the standing plane P. According to one exemplary embodiment, the first angle alpha, can be at least 10 degrees, and preferably is between about 30 degrees and about 45 degrees, but may be much greater than about 45 degrees with mechanical assistance to force inversion of the panel 26. According to this embodiment, the initiator portion 1 can be at a second angle beta, with respect to standing plane P, that may be at least 10 degrees less than the first angle alpha, but may be considerably less than this, and even angled in the opposite direction to the angular direction of the control portion, e.g., toward the upper portion of the container.

When the pressure panel is inverted from the outward state (FIG. 2) to the inward state (FIG. 3), it can undergo an angular change that is approximately equal to its angle of inclination. For example, if the control portion 42 is initially set at an angle alpha, of about 10 degrees, it will provide an angular change of approximately 20 degrees. At such a low angle of inclination, however, it can be difficult to provide an adequate amount of vacuum compensation in a hot-filled container. Therefore, it is preferable to provide the initiator portion 40 and control portion 42 with steeper angles. For example, with the control portion set at an angle alpha, of about 35 degrees, the pressure panel 26 will undergo an angular change of about 70 degrees upon inversion. According to this exemplary embodiment, the initiator portion 40 can be set at an angle beta, of about 20 degrees.

Figure 22:
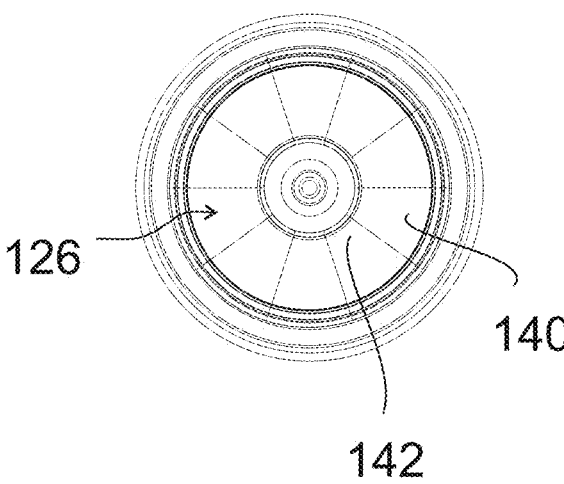
FIG. 22 illustrates a lower portion of a container similar to that shown in FIG. 7 according to an alternate embodiment.
Figure 23:
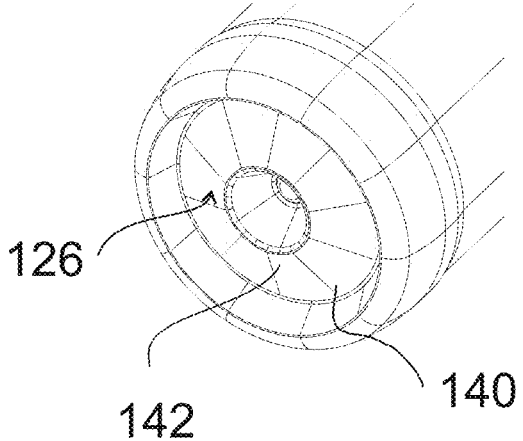
FIG. 23 illustrates a lower portion of the container of FIG. 13 similar to the view shown in FIG. 8 according to an alternate embodiment.

Referring to FIGS. 22-23, a base portion of a container according to an alternative embodiment is shown, wherein the control portion of the pressure panel comprises a substantially continuous conical area extending around the base. According to this embodiment, the initiator portion 140 and the control portion 142 are set at a common angle, such that they form a substantially uniform pressure panel 126. However, initiator portion 140 may still be configured to provide the least amount of resistance to inversion of pressure panel 126, such that it still provides an initial area of folding or inversion. For example, the initiator portion 140 may have a smaller material thickness than the control portion 142. According to the embodiment shown in FIGS. 22-23, initiator portion 140 causes the pressure panel 126 to begin inversion at its region of widest diameter, near the hinge structure 136.

Figure 6:
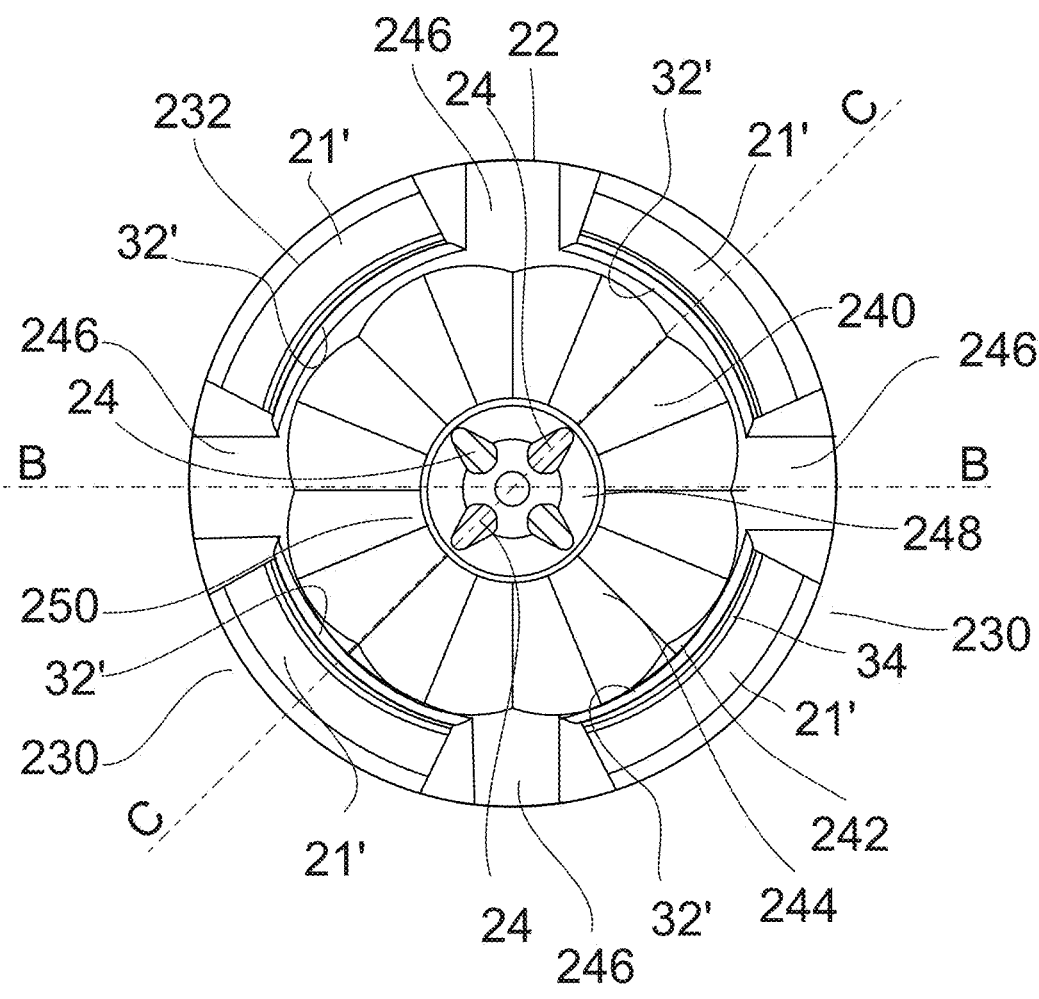
FIG. 6 is a bottom view of the plastic container of FIG. 5.
Figures 7, 8:
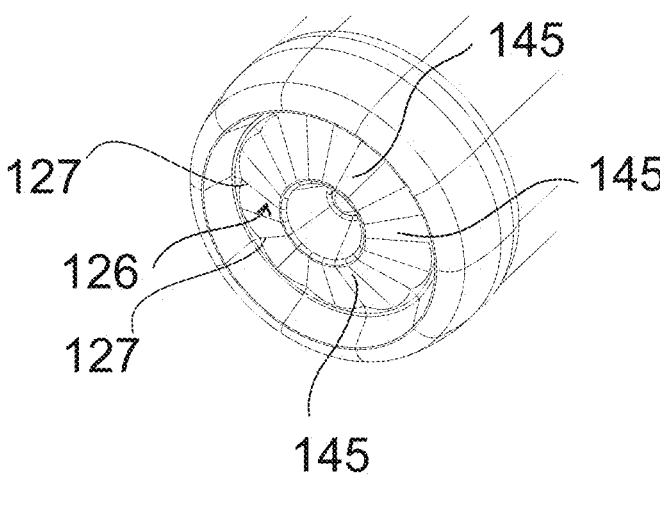
FIG. 7 is a perspective view of a portion of a plastic container according to yet another exemplary embodiment of the present invention, shown with the pressure panel in an initial, outwardly-inclined position.
FIG. 8 is a bottom view of the plastic container of FIG. 7.
Figure 9:
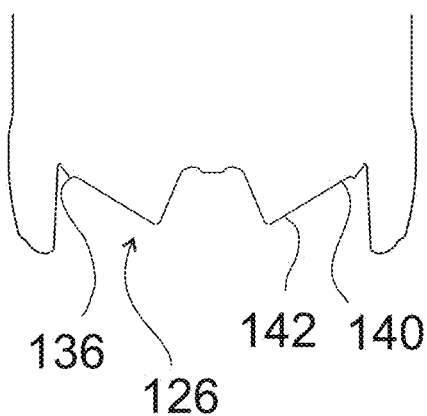
FIG. 9 is a side, sectional view of a portion of the plastic container of FIG. 7, shown with the pressure panel in the initial, outwardly-inclined position.
Figure 10:
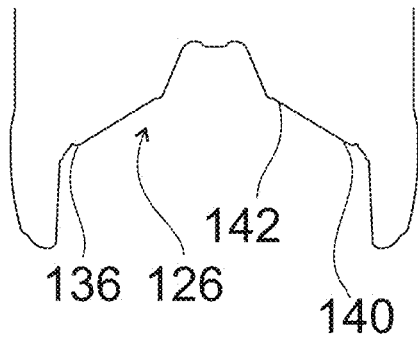
FIG. 10 is a side, sectional view of a portion of the plastic container of FIG. 7, shown with the pressure panel in the inverted, inwardly-inclined position.
Figure 24:
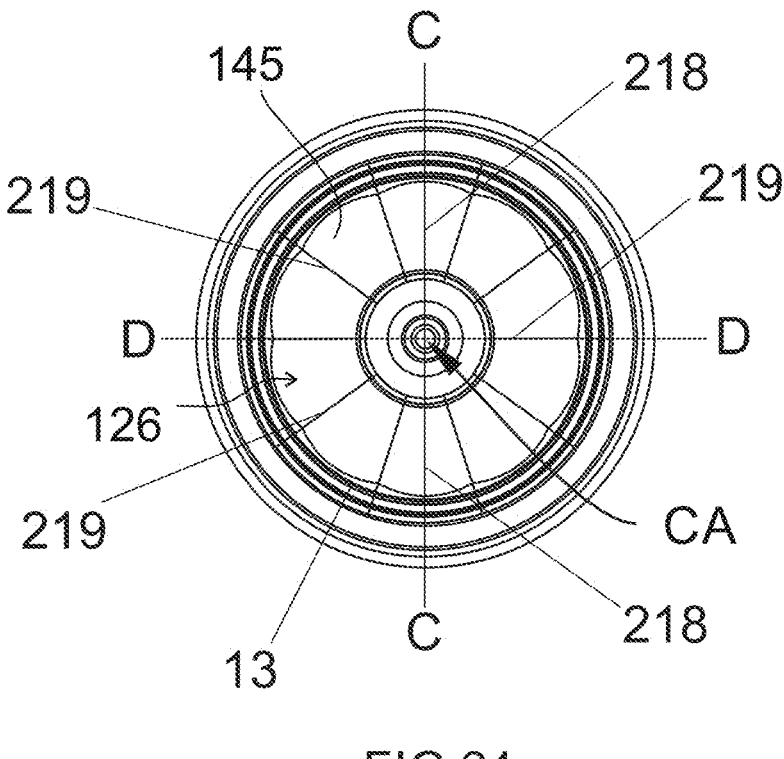
FIG. 24 is a bottom plan view of FIG. 8 with planes C-C and D-D indicated.
Figure 25:
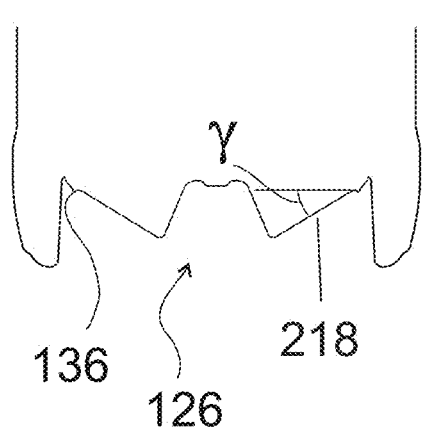
FIG. 25 is a side section view of FIG. 15 taken along C-C.
Figure 25:
Figure 26:
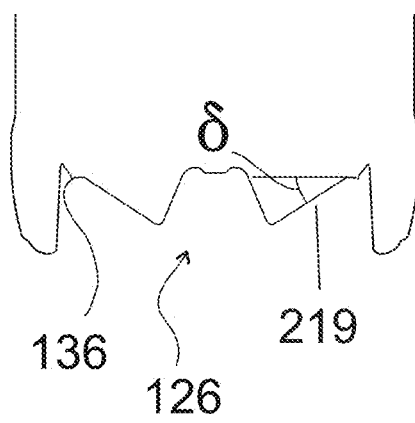
FIG. 26 is a side section view of FIG. 15 taken along D-D.
Figure 27A:
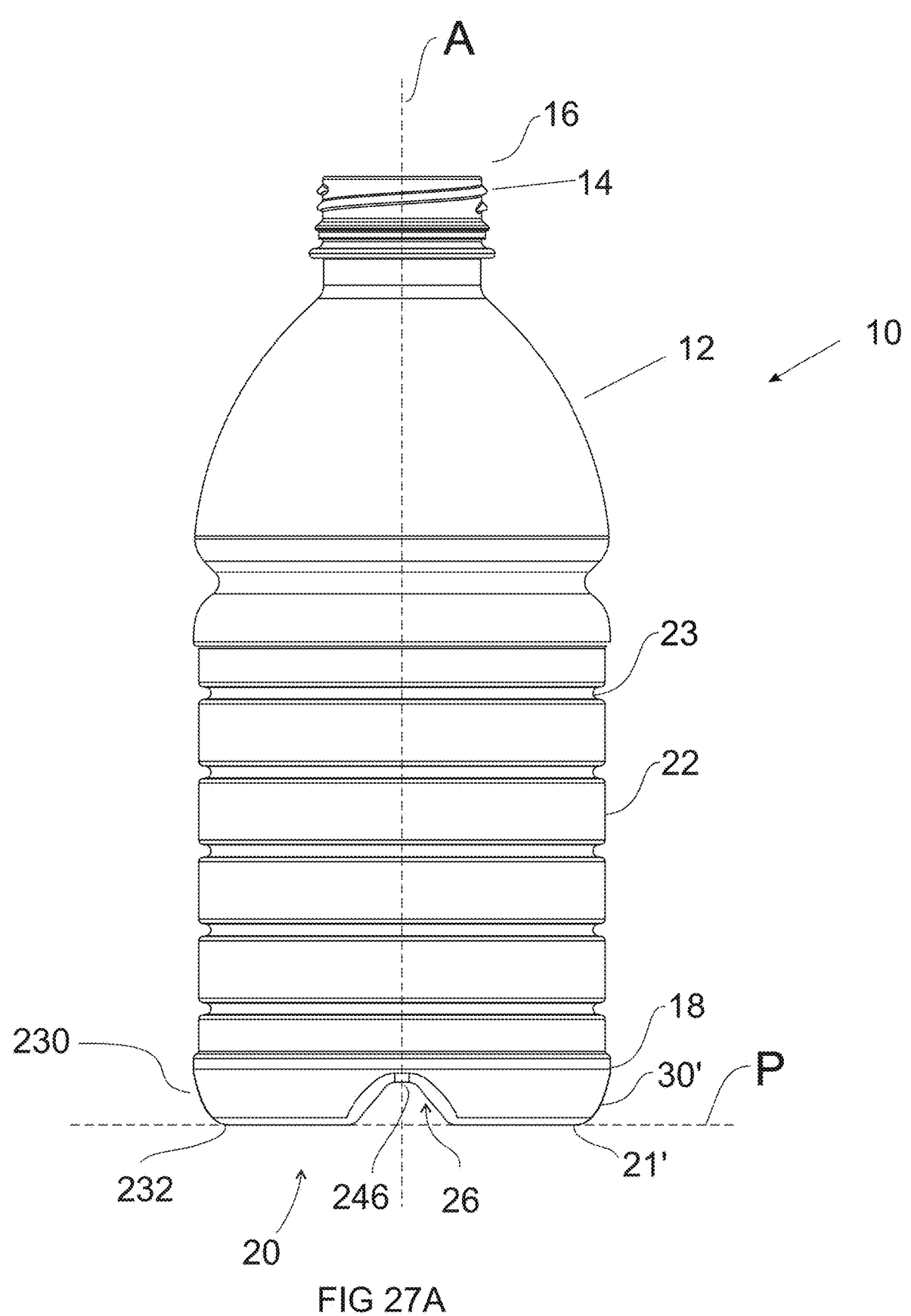
FIG. 27A is a side view of the plastic container of FIG. 5.
Figure 27B:
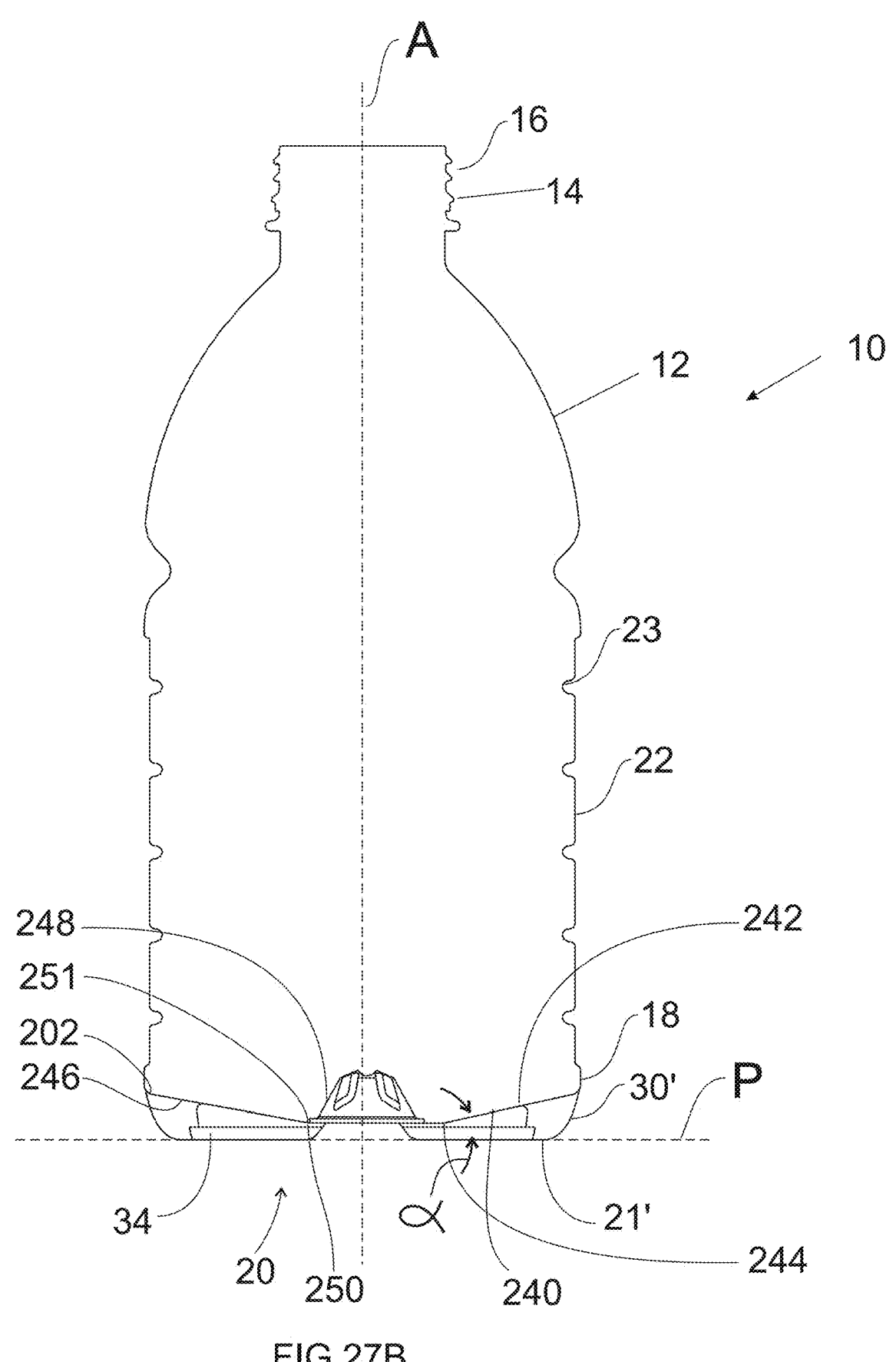
FIGS. 27B and 27E are side sectional views of the plastic container of FIG. 6 through plane B-B.
Figure 27C:
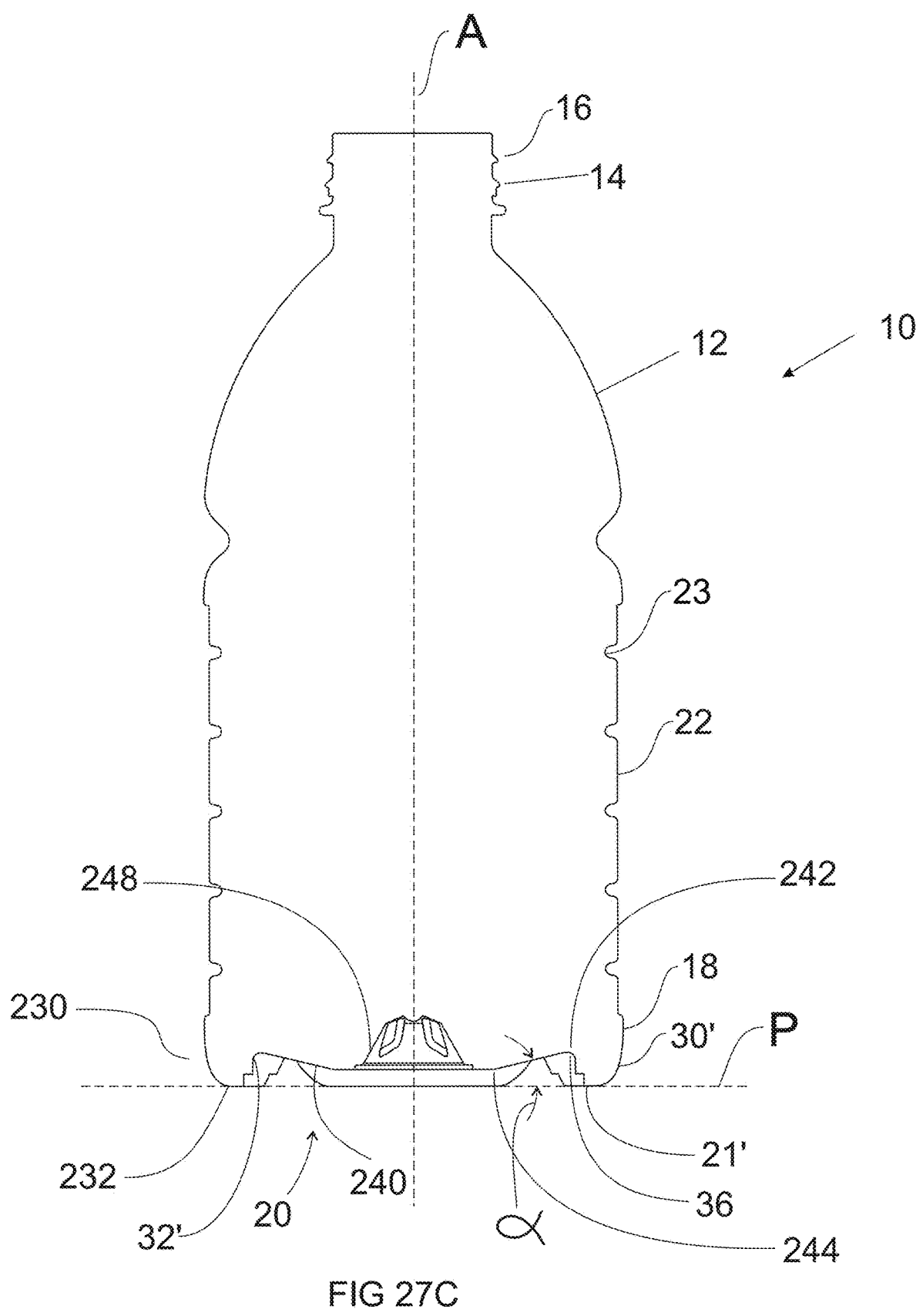
FIGS. 27C and 27D are side sectional views of the plastic container of FIG. 6 through plane C-C.
Figure 27D:
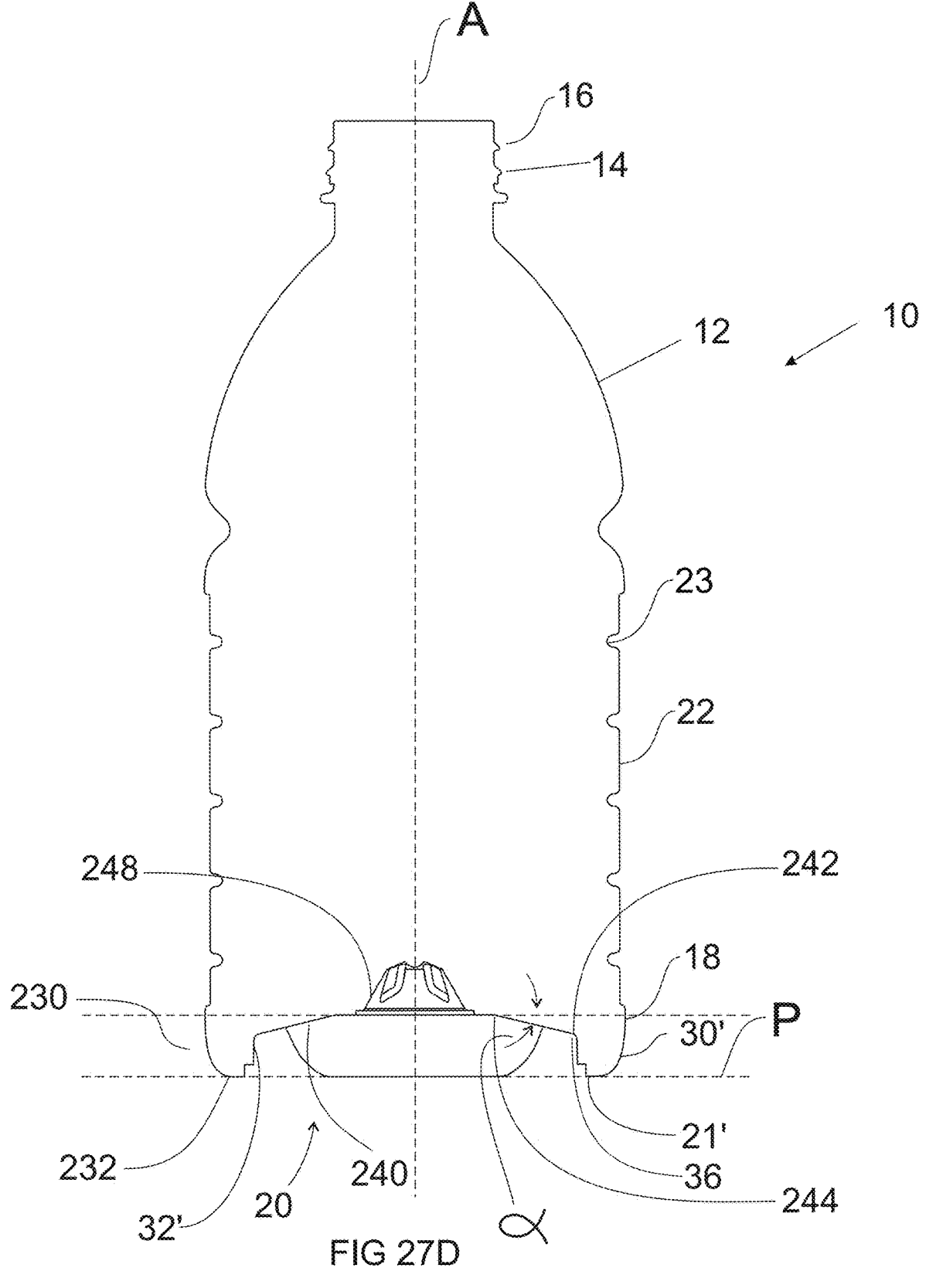
Figure 27E:
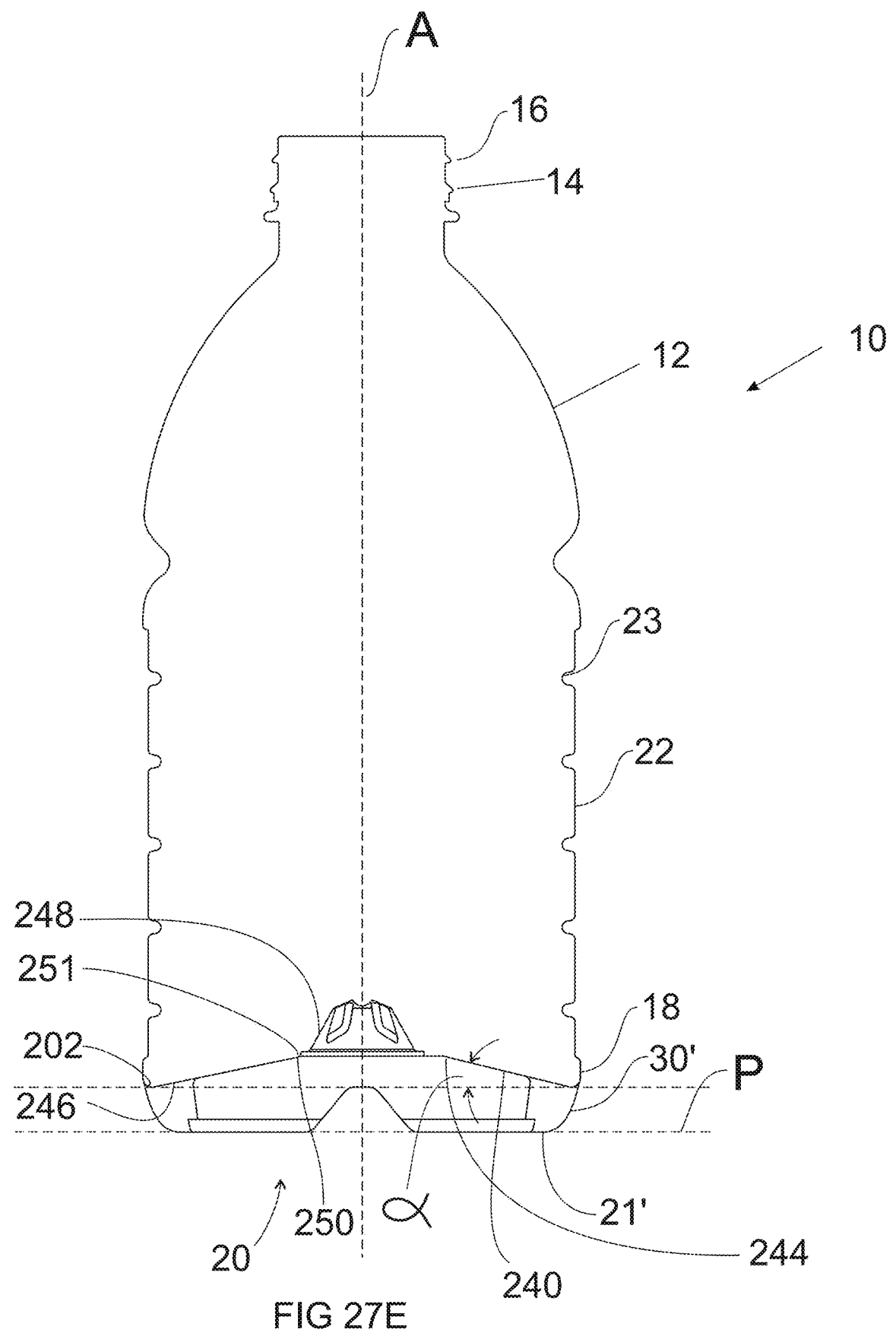

Additional structures may be added to the pressure panel 126 in order to add further control over the inversion process. For example, the pressure panel 126 may be divided into fluted regions, as shown in FIGS. 6 and 7. As shown, the fluted regions 145 can be outwardly convex, resulting in inward creases 127 between each outward flute and evenly distributed around the container's longitudinal axis to create alternating regions of greater and lesser angular inclination. Referring to FIGS. 24-26 in particular, panel portions 145 that are convex outwardly, and evenly distributed around the central axis create regions of greater angular set 219 and regions of lesser angular set 218. The angular set in the midline 218 of each of the plurality of flutes 145 has lesser angular set gamma than the angular set delta in the plurality of creases 219 created between each fluted panel portion 145. This may provide for greater control over the inversion of the panel. Such geometry provides increased resistance to reversion of the panel, and a more even distribution of forces when in the inverted position. This type of geometry can provide increased resistance against the panel returning from the inward position (FIG. 10) to the outward position (FIG. 9), for example, if the container were dropped. The fluted configuration can also provide more even distribution of forces on the pressure panel 126. According to an alternative embodiment, the flutes can be inwardly concave. Inwardly directed flutes offer less resistance to initial inverting forces, coupled with increased resistance to reverting back to the original, outward position. In this way, they behave in much the same manner as ribs to prevent the panel being forced back out of the outwardly inclined position, but allow for hinge movement from the first outwardly inclined position to the inwardly inclined position. Such inwardly or outwardly directed flutes or projections function as ribs to increase the force required to invert the panel.

Figure 13:
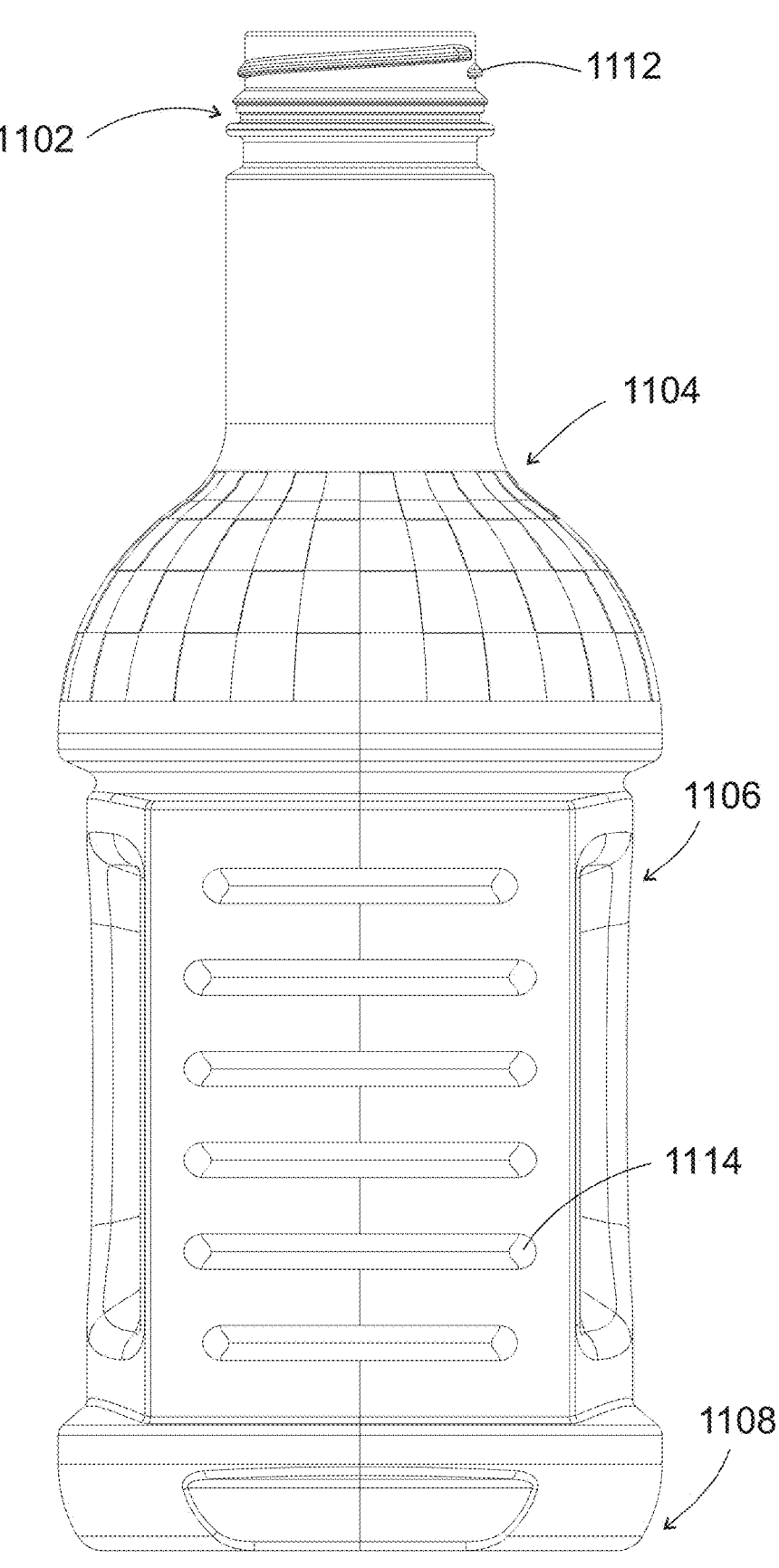
FIG. 13 is a side view of a portion of a plastic container according to another embodiment of the present invention.
Figure 14:
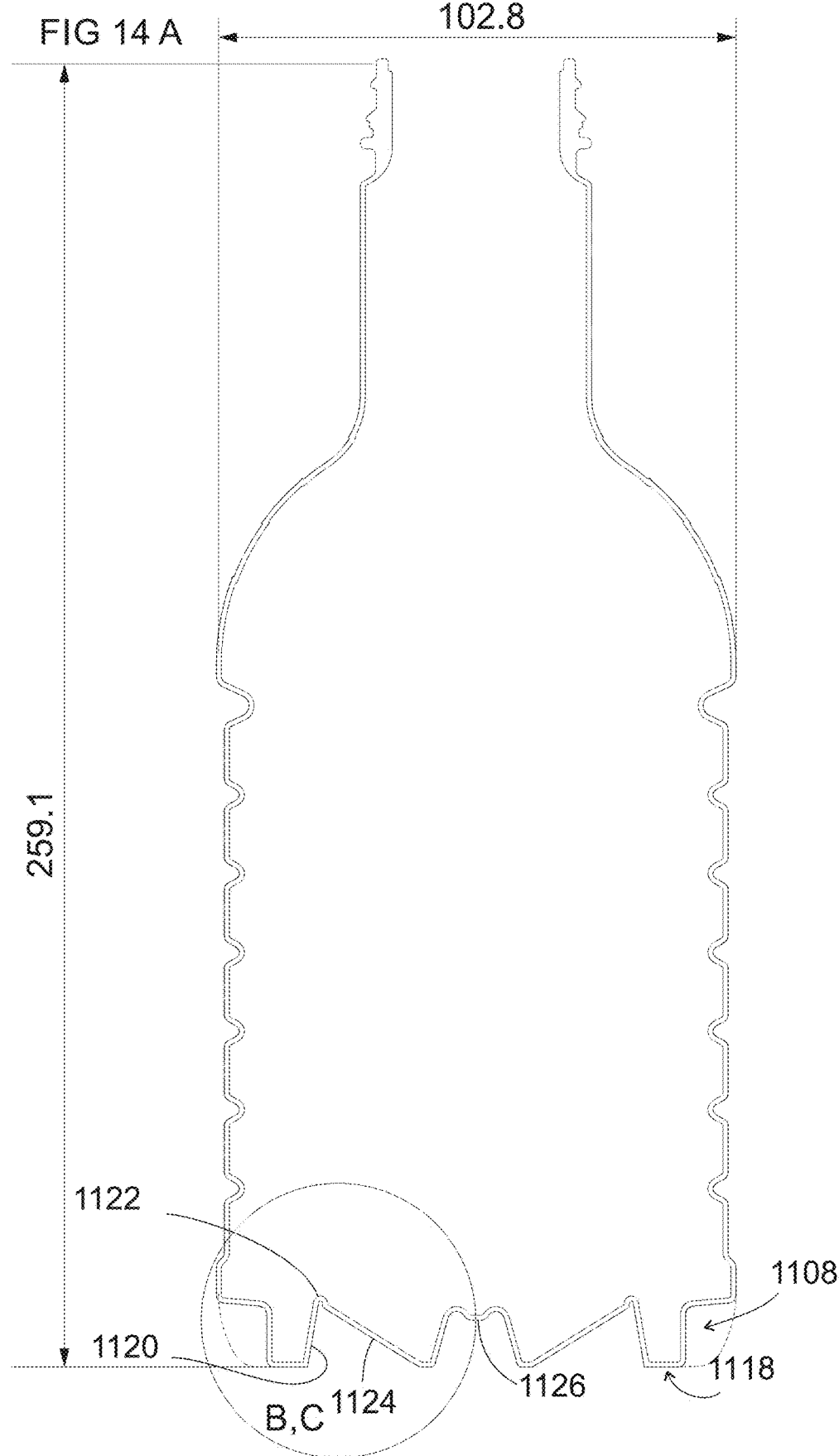
FIGS. 14A-14C is a side, sectional view of the plastic container of FIG. 13, shown with the pressure panel in the initial, outwardly-inclined position.
Figure 14B:
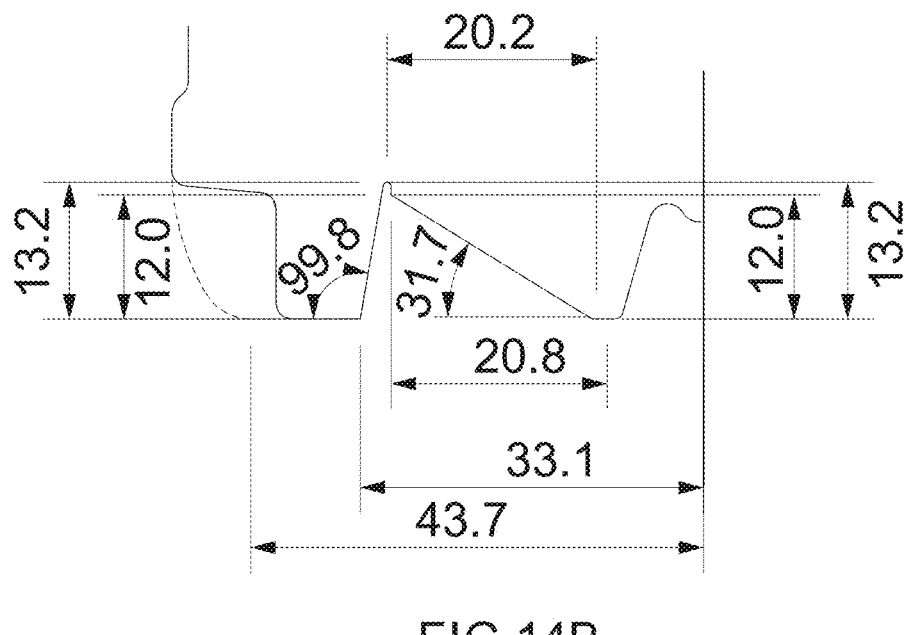
Figure 14C:
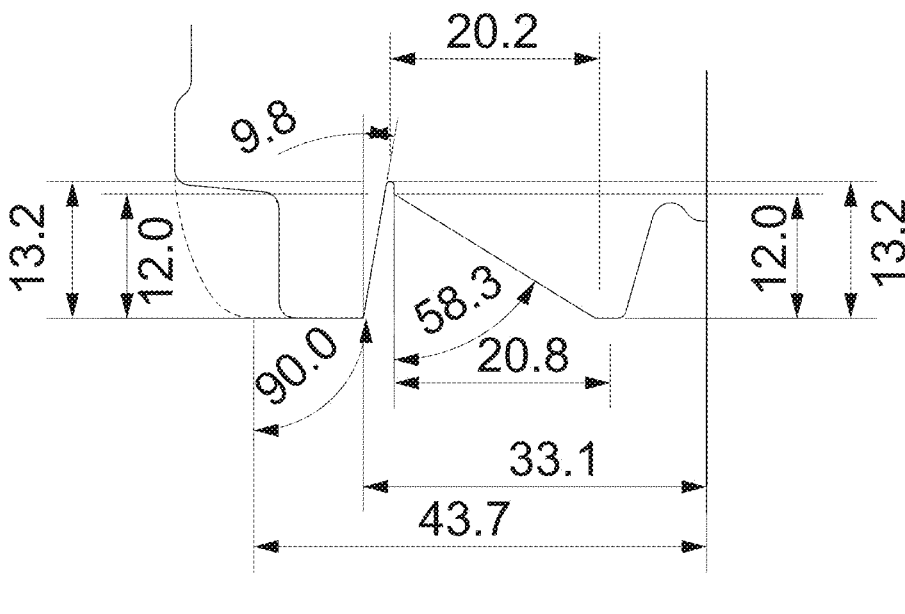
Figure 15:
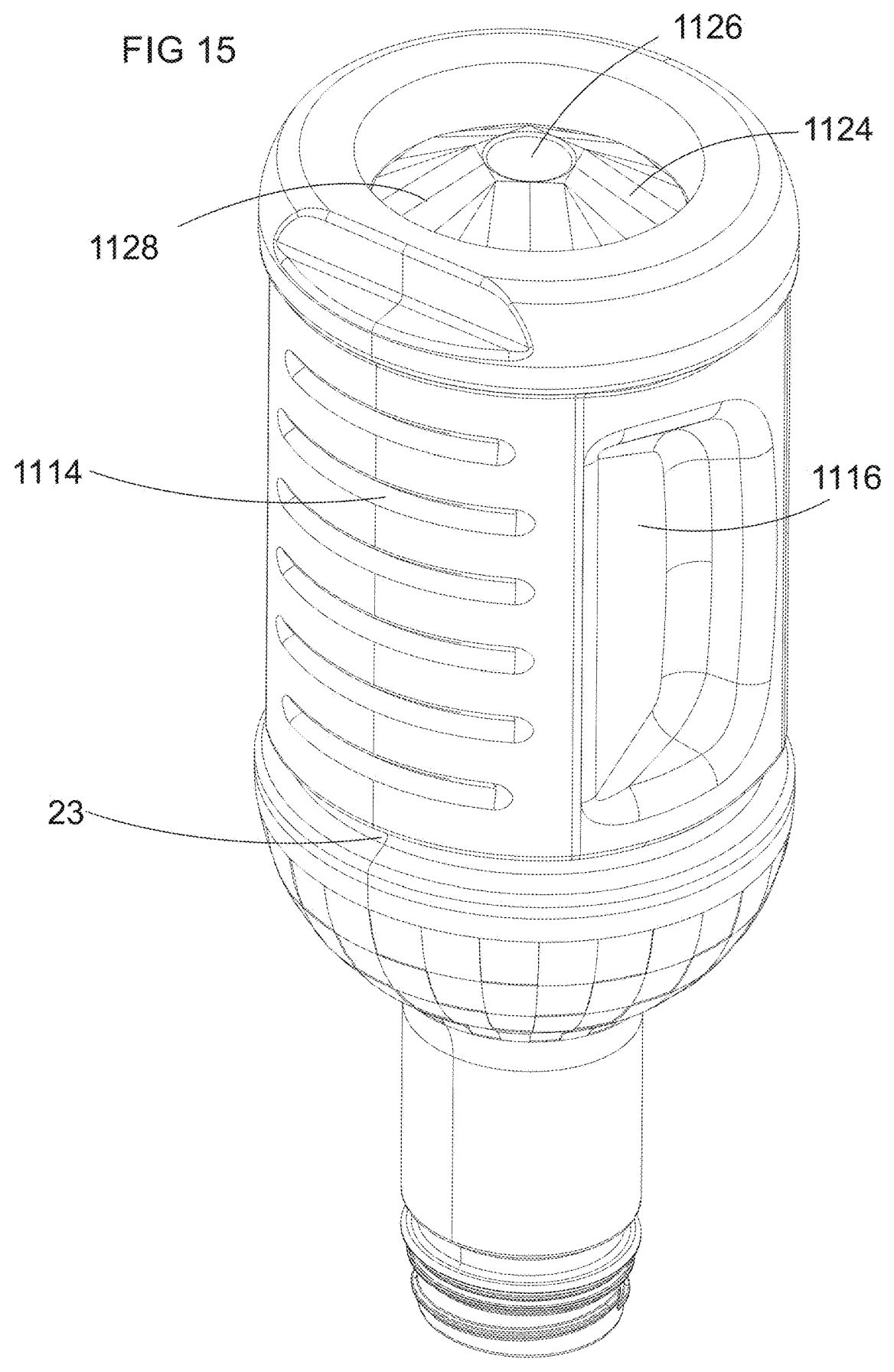

FIGS. 13 to 15 show another exemplary embodiment of a container that can be used as described herein. The container includes an upper portion 1102, shoulder 1104, body 1106 and base 1108. The upper portion 1102 includes an opening into the container which may be closed and sealed, such as via a screw cap using thread 1112.

The container body 1106 in the present example includes ribs 1114 in a first region thereof and panels 1116 in second portions thereof. Panels 1116 in this example act as vacuum panels as discussed below and also facilitate gripping of the container by a consumer, but in other examples may be configured to serve only as grip panels and not pressure panels. In another example, vacuum panels may be placed in the container body separately from the grips or without the grips.

The container base 1108 includes standing ring or bearing surface 1118 on which the container rests when in an upright position. Adjacent the standing ring 1118 is a recess or instep forming a first wall 1120 which joins pressure panel or second wall 1124 via a hinge structure 1122. An inwardly projecting push-up or section 1126 is provided in the center of the base 1108. The panel or second wall 1124 may include creases 1128 as shown which aid control over the configuration of the panel or second wall 1124 as it moves between outwardly and inwardly inclined positions.

The container of FIGS. 13 to 15 is particularly adapted to hot-fill applications but may be used in other applications where there are changes in pressure inside the container.

According to one hot-filling method using the container of FIGS. 1 3-15, the container is provided to a filling station with the second wall 1124 configured as shown in FIGS. 14 and 15. The container is then filled with hot or heated liquid and sealed, for example, using a screw cap. As the container cools, contents of the container (particularly the headspace), contract. This causes the pressure in the container to drop. Cooling may be accelerated, for example, by spraying the outside of the container with water in a cooling tunnel or the like on a processing line as is understood by those skilled in the art.

To prevent unwanted deformation of the container caused by the reduction in internal pressure, one or both pressure panels 1116, 1124 are configured to move inwards to reduce the container volume and increase the internal pressure of the container. In one example, at least the panels 1116 provided in the container sidewall are adapted to move inwards through action of the vacuum force generated inside the container during cooling, and in another example the panel 1124 is adapted to move inward through action of the vacuum force generated inside the container during cooling. In a third example, both move inward, and in a further example, the container sidewalls are subjected to vacuum force prior to the base.

In the present example, panel 1124 is also configured to move to adjust the container volume. More particularly, panel 1124 is configured to invert about hinge structure 1122 from being outwardly inclined as shown in FIGS. 14 and 15 to being inwardly inclined (not shown).

Inversion of the panel 1124 may be initiated by engagement of a pusher or other external mechanical force against the base 1108, preferably the centrally located push-up 1126 of the base 1108. Additionally or alternatively, the panel 1124 may include an initiator portion that is configured to initiate or cause the rest of the panel to move between the outwardly and inwardly inclined positions. The initiator portion may reduce or obviate the need for a pusher, providing for movement of the panel 1124 due to the forces generated by the pressure differential between the inside and outside of the container. To this end, the initiator portion may have a lower angle of inclination than other portions of the panel 1124 relative to the standing plane formed by the standing ring 1118.

According to preferred embodiments, opposing vacuum panels 1116 are subjected to vacuum force prior to repositioning of the base. More preferably, the vacuum panels 1116 move inwards prior to movement of the second wall 30 or panel 1124 to the inwardly inclined position. Other methods of using containers as described herein can also be used with the container of FIGS. 13-15.

It will be noted that the instep or first wall 1120 is configured so as to elevate the panel 1124 and other portions of the base 1108 above the standing ring 1118 when the panel 1124 is outwardly inclined. Such a configuration provides improved container stability during the filling operations. However, the instep or first wall 1120 may be recessed to a lesser extent such that a portion of the base extends below the standing ring 1118 when the panel 1124 is outwardly inclined. As will be appreciated, this will mean that different portions of the container base 1108 act as the standing ring depending on whether the panel or second wall 1124 is inwardly or outwardly inclined.

The container shown in FIGS. 13 to 15 may also be used in pasteurisation processes. According to an example such process, the container is filled with the panel 1116, 1124 in the inward position and then sealed. The container and its contents are then heated, causing an increase in internal pressure. As a result of this the panels 1116, 1124 move to an outward position. After the heating stage of the pasteurisation process is completed and the container is cooled, the panels 1116, 1124 preferably revert to the inwardly inclined position.

Figure 16:
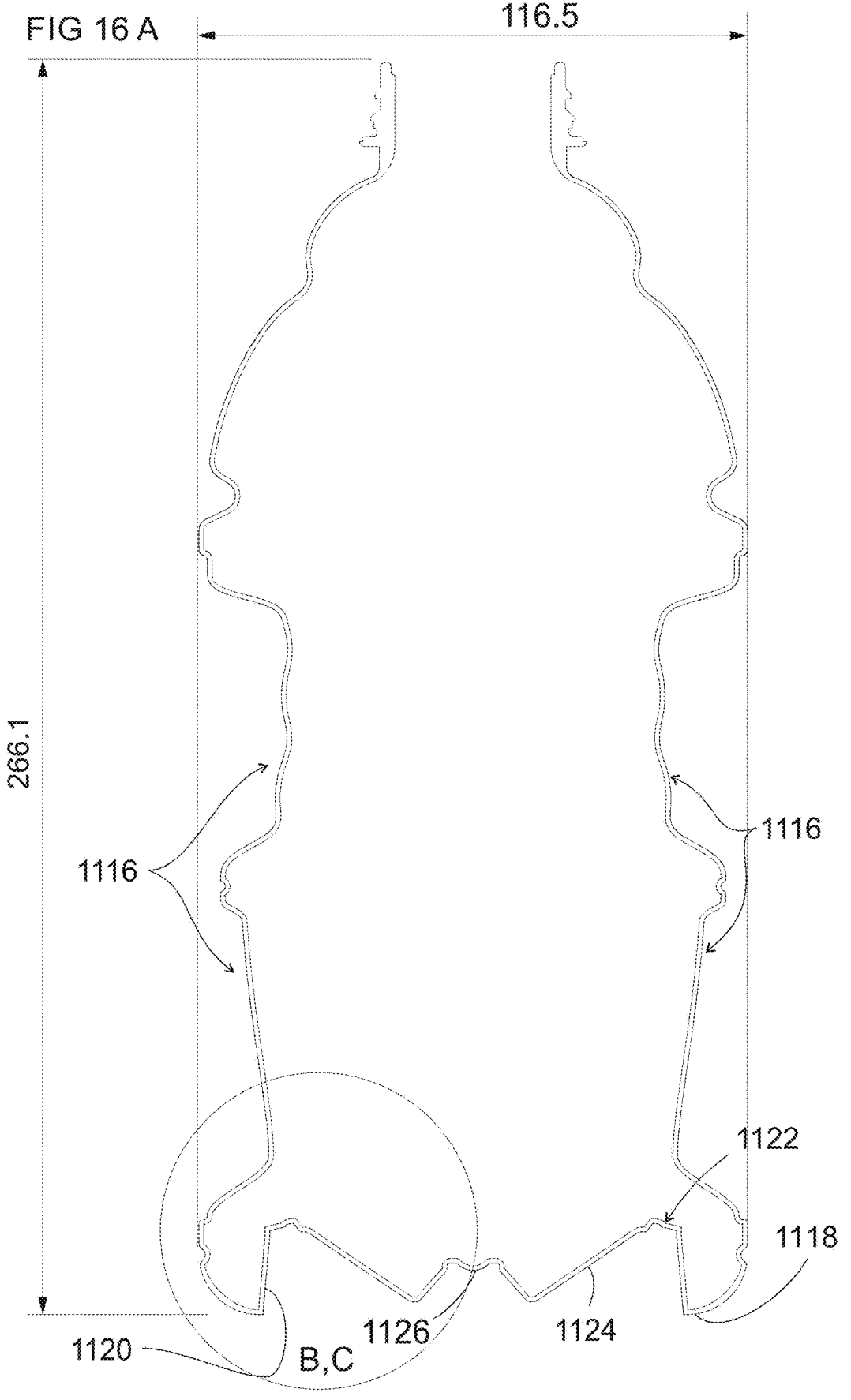
FIGS. 16A-16C is a side, sectional view of a portion of a plastic container according to another embodiment of the present invention.
Figures 16B, 16C:
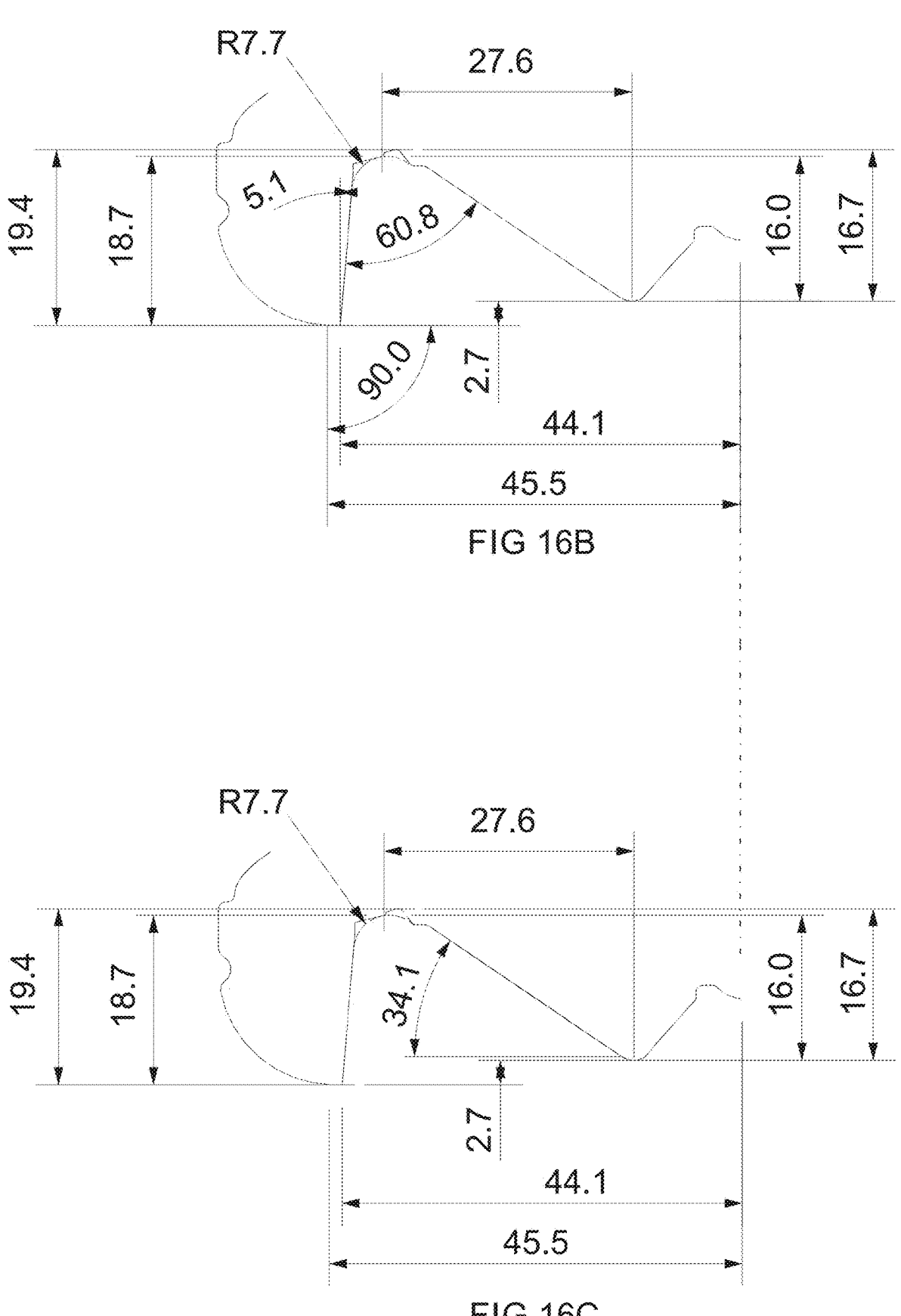
Figure 17:
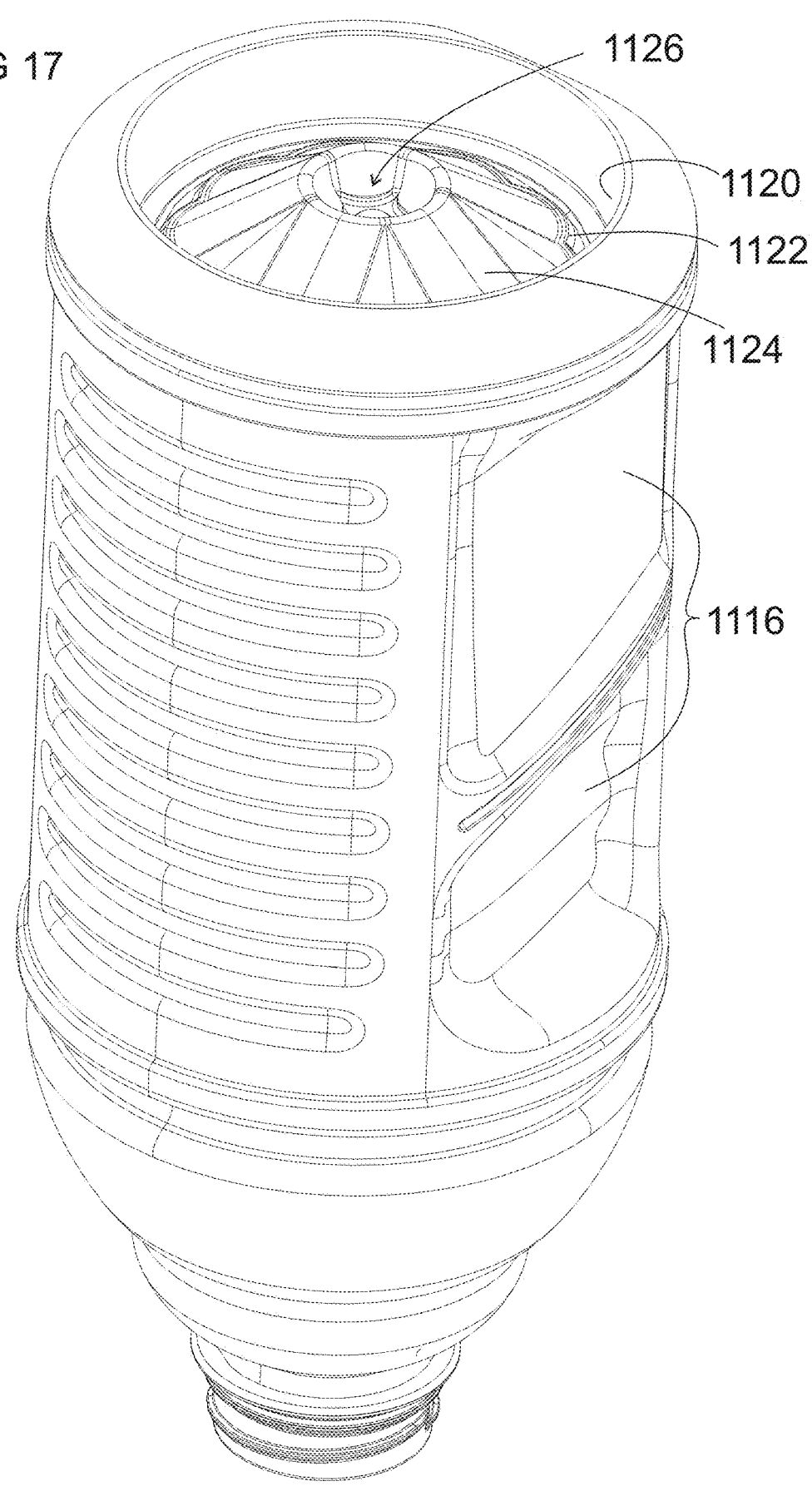
FIG. 17 is a perspective view of the plastic container of FIG. 16, shown with the pressure panel in the initial, outwardly-inclined position.

FIGS. 16 and 17 show a container according to another embodiment. Many of the features of this embodiment are the same or substantially the same as those of the embodiment of FIGS. 13 to 15 and like references have been used to aid clarity. Only features that differ from the embodiment of FIGS. 13 to 15 will be described.

As shown in FIGS. 16 and 17, the container of this embodiment includes first and second panels 1116 on two opposing faces of the sidewall thereof, at least one of which is a vacuum panel.

FIGS. 18 and 19 show another embodiment of a container that is substantially identical to the container of FIGS. 16 and 17 and again only points of difference will be described.

Notably, in the embodiment of FIGS. 18 and 19, the first wall or instep 1120 is inclined at a lesser angle than in the embodiment of FIGS. 16 and 17. As will be appreciated, other angles of inclination may also be used.

The operation or preferred use of the containers of FIGS. 16 and 17, and FIGS. 18 and 19, is substantially identical to that described in relation to the embodiment of FIGS. 13 to 15.

Figures 11A, 11B, 11C, 11D, 11E:
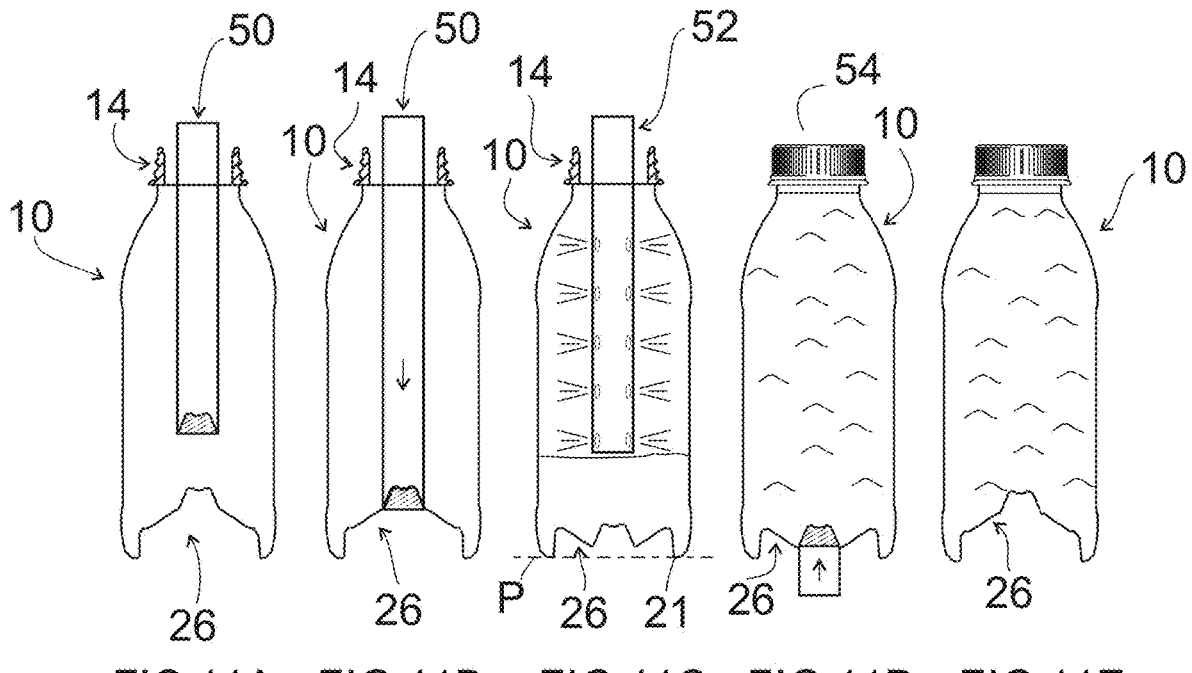
FIGS. 11A-11E schematically illustrate an exemplary method of processing a plastic container according to the present invention.

Referring to FIGS. 11A-11E, an exemplary method of processing a plastic container according to the present invention is shown. Prior to processing, the container 10 may be formed (e.g., blow molded) with the pressure panel 26 in the inwardly-inclined position. According to this embodiment, a force can be applied to the pressure panel 26 in order to move the pressure panel 26 into the outwardly-inclined position. For example, as shown in FIGS. 11A and 11B, a first mechanical pusher 50 can be introduced through the opening in the container finish 14 and forced downwardly on the pressure panel 26 in order to move it to the outwardly-inclined position (shown in FIG. 11C). One of ordinary skill in the art will know that other types of mechanical or other forces can alternatively be used to move the pressure panel 26 into the outwardly-inclined position. Alternatively, the container 10 can be initially formed with the pressure panel 26 located in the outwardly-inclined position.

Referring to FIG. 11C, the container 10 can be filled with liquid contents when the pressure panel 26 is located in the outwardly-inclined position. Particularly, the container 10 can be "hot-filled" with the liquid contents at an elevated temperature, for example, 185 degrees Celsius (C). As shown in FIG. 11C, the liquid contents can be introduced into the container 10 via a filling nozzle 52 inserted through the opening in the container finish 10, although one of ordinary skill in the art will know that any number of known filling devices and techniques can be implemented. According to an alternative embodiment, the first mechanical pusher 50 and the filling nozzle 52 can be the same instrument.

Referring to FIG. 11D, once the container 10 has been filled to the desired level, the filling nozzle 52 can be removed, and a cap 54 can be applied to the container finish 14. Any number of capping techniques and devices known in the art can be used to apply the cap 54 to the container finish 14. Next the container 10 can be cooled, for example, by spraying the container 10 with cool water, or alternatively, by leaving the container 10 in ambient conditions for a sufficient amount of time. As the container 10 and its contents cool, the contents tend to contract. This volumetric change inside the sealed container 10 can create a vacuum force within the container 10.

In order to alleviate all or a portion of the vacuum forces within the container 10, the pressure panel 26 can be moved from the outwardly-inclined position of FIG. 11D to the inwardly-inclined position of FIG. 11E. For example, following filling, capping, and cooling of the container 10, an external force can be applied to the pressure panel 26, for example, by a second mechanical pusher 56, as shown in FIG. 11D. Alternatively, the pressure panel 26 can be moved by the creation of relative movement of the container 10 relative to a punch or similar apparatus, in order to force the pressure panel 26 into the inwardly-inclined position. Alternatively, the pressure panel 26 can invert to the inwardly-inclined position under the internal vacuum forces within the sealed container 10. For example, all or a portion of the pressure panel 26 (e.g., the initiator portion) can be made flexible enough to cause the pressure panel 26 to invert under the internal vacuum forces.

The inversion of the pressure panel 26 from the outwardly-inclined position to the inwardly-inclined position reduces the internal volume of the container 10, and thereby increases the pressure inside the sealed container 10. This can alleviate any vacuum created within the container 10 due to the hot-fill process. This can also remedy any deformation of the container 10 that was caused as a result of the internal vacuum.

As shown in FIGS. 11A-11E, the entire pressure panel 26 is above the plane P of the standing surface 21 (see FIG. 11C) of the container 10. As a result of this configuration, the containers 10 according to the present invention can be stored, transported, and capped/filled, etc., all while standing on the standing surface 21. This can eliminate the need for any adapters or other devices to stabilize the container 10 in the upright position. This can also make the containers 10 of the present invention more readily adapted for use with conventional, existing container transports, capping and filling stations, and storage facilities.

According to preferred embodiments, different stages of the filling and/or pasteurisation processes may be performed at different stations within a filling or processing facility. To this end, the container may be conveyed in between stages or during a particular stage depending on system requirements and preferences.

As stated above, the containers according to the present invention may be manufactured with the base panel extending above or below the standing ring, providing for various degrees of container stability during the filling operations.

One alternative embodiment of the present invention comprises manufacturing the base panel to extend below the standing ring and providing an apparatus to introduce the container into a holding device to stabilize the container prior to filling and capping. Subsequent to this, the container is conveyed with the base panel extending below the standing ring but above the lowest level of the holding device, wherein the container is vertically stabilized in the holding device as it is conveyed throughout the filling line and cooling tunnel. Prior to application of a label, the container and attached holding device may be conveyed together into an inverter apparatus and the base panel mechanically inverted and then the holding device may be removed. Following this, the container may then finally travel in direct contact with the conveyor through the label application device and on for packing and distribution.

However, a particularly preferred embodiment of the present invention includes providing a container that is already geometrically stable and able to be conveyed without the application of a mobile holding device that accompanies the container throughout the filling line. In this embodiment the base panel is manufactured to extend only above the standing ring, wherein there remains a need to provide a holding device during the process of mechanically inverting the base, and wherein the holding device may be fixed in place within the inverting apparatus, providing less complexity to the manufacturing process of both blowing and filling of the container. This preferred embodiment also comprises mechanically forcing a volume reduction in the container during processing in order to increase the internal pressure within the container to create greater stability within the container in distribution. It is well known in the art, that the higher the container pressure, the more rigid the sidewalls resulting in a higher top load and more resistance to denting during distribution and sale of a container. Carbonated beverage processing provides the best example of a method of producing lightweight containers that can withstand the rigors of distribution and bulk pallet stacking due to the raised positive internal pressure in the containers provided by the addition of CO2 during filling prior to capping or sealing. In order to best achieve a high pressure within hot filled containers, and to overcome the negative impact of vacuum build up in the container after a cooling of a filled product, an object of the present invention is to accomplish a higher positive internal pressure within a hot-filled container particularly suited to bulk pallet stacking as part of a processing and conveyor-driven system. There is a requirement to ensure the blow-molder is capable of providing for deeply set mechanically moveable base panels in the container and for an apparatus or a device for forced volume reduction of the container to create an internal pressure that is preferably in excess of ambient pressure at the time of inversion, and a container configuration that can increase further in pressure upon being subjected to increased top-load through bulk pallet stacking for distribution purposes.

Figures 12A, 12B, 12C:
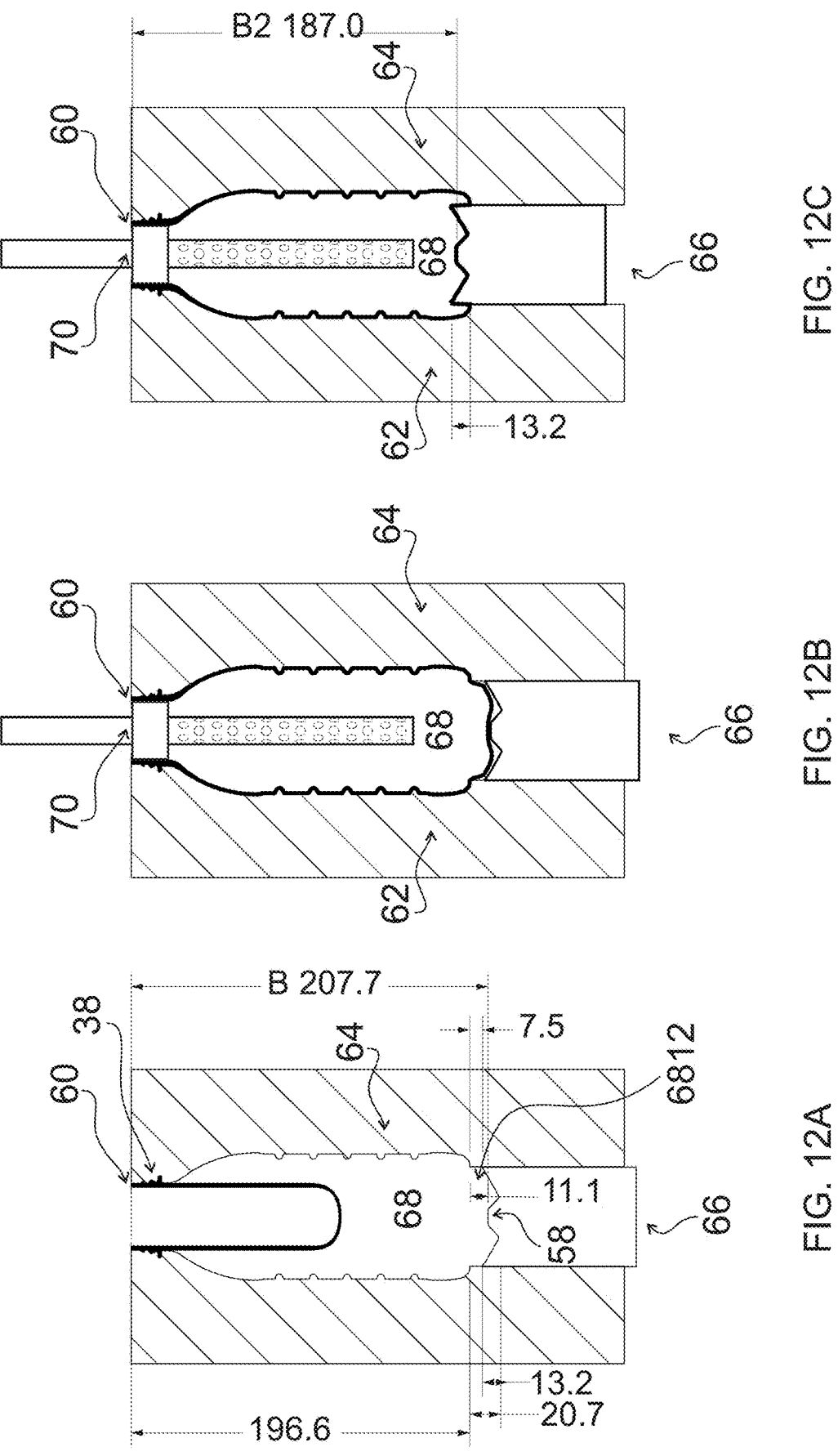
FIGS. 12A-12F schematically illustrate an exemplary method of forming plastic containers according to the present invention.
Figures 12D, 12E, 12F:
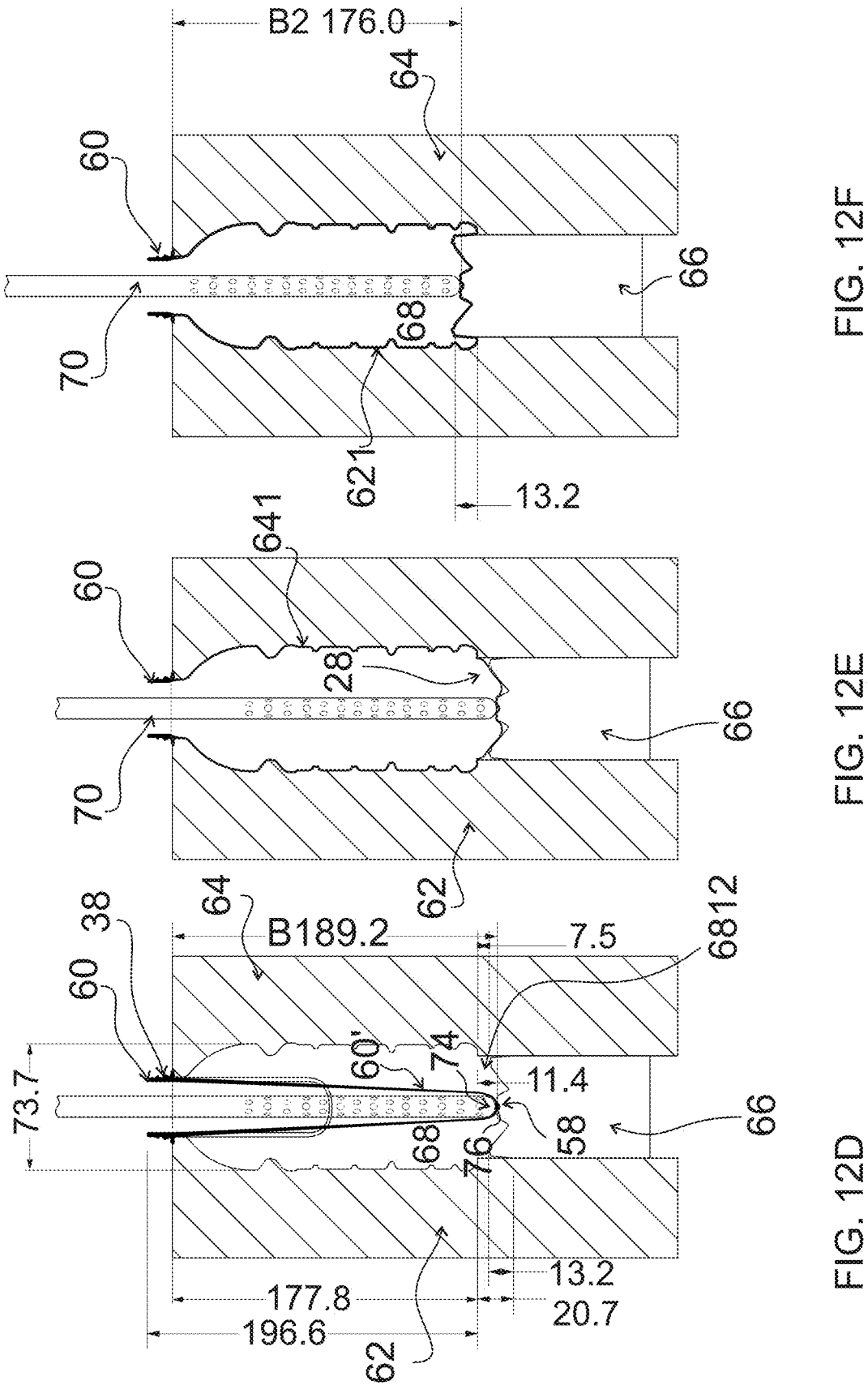

Referring to FIGS. 12A-12F, an exemplary method of blow molding a plastic container according to the present invention is shown. Referring to FIG. 12A, the method includes enclosing a heated and softened polymer material (such as PET, PEN, PP, blends thereof, and other suitable materials known in the art) within a blow mold. In the exemplary embodiment shown, the polymer material comprises a plastic container preform 60. However, according to an alternative embodiment, the polymer material can comprise a tube of extruded polymer material, for example, as used in the known process of "extrusion blow molding."

The blow mold can comprise two or more side mold portions 62, 64, and a base mold portion 66. The side mold portions 62, 64 can move from an open position (not shown) in which the side mold portions are separated from one another, to a closed position, shown in FIGS. 12A-12C. In the closed position, shown, the side mold portions 62, 64 define a mold cavity 68 having an extended bottom. The mold cavity 68 corresponds to the shape of a plastic container to be molded therein. The base mold portion 66 is located within the side mold portions 62, 64 and close the extended bottom region 6812 of the mold cavity 68 and is movable with respect to the side mold portions 62, 64 in the vertical direction (as viewed in FIGS. 12A-12F) between the retracted position shown in FIGS. 12A and 12B and 12D and 12E, and the extended position shown in FIGS. 12C and 12F. The initial position defines one possible initial configuration of the mold cavity 68 such that an initial length B is defined between the top of the preform 60, which engages the neck finish 38, and the apex 58 of the base mold 66 and by way of example only measures approximately 208 mm in length.

The final position of the base mold 66 accordingly defines the shorter length B2, mentioned above relative to the container 10, which corresponds to the length between the top 64 of the preform 60 and the apex 58, measuring by way of this example only 187 mm, wherein the base mold 66 moves outwardly and inwardly at least 21 mm to provide for an 'overstretching' of the central base portion of the container. In this example of the present invention the container may be overstretched along the central length by approximately 10%. Of course, as disclosed by Schneider, the base mold may move at least 40 mm outwardly and inwardly, allowing for a potential overstretching along the central length of approximately 20%. Schneider discloses the container may be overstretched along an axial direction from about 15 mm to 40 mm, more preferably from about 20 mm to about 35 mm, and most preferably from about 20 mm to about 30 mm greater than the axial dimension of the finished container.

As disclosed further by Kelley, the base mold may move even further than Schneider and up to at least 65 mm between the outward and inward or retracted and extended positions. With reference to FIGS. 39A-E a particularly preferred embodiment of the present invention is disclosed that may also incorporate the range of base movement in blow molding and over-stretching the base as Kelley discloses. Preferably, the upstanding container bottom sidewall portion or inner wall 32 has a height Hs as measured parallel to a longitudinal axis A of the container that is preferably within a range of greater than about 0.35 inch to about 1.2 inch—or about 9 mm to about 30 mm. The inner wall, 32 also has a length Ls that is defined as the surface distance between a top portion 28 and a bottom portion 30 as viewed in vertical cross-section as shown in FIG. 39D. Preferably, the length Ls is within a range of about 100% to about 115% of the height Hs. The substantially straight portion 32 is also preferably substantially parallel to a substantially straight portion 27 of an outer sidewall of the container bottom 17, which facilitates the formation of a deep inset invertible base having a relatively tall narrow standing ring. "Substantially parallel" for purposes of this feature is defined as within an angle range of about 0 degrees to about 20 degrees.

Preferably, the substantially smooth inner wall 32 has an average wall thickness Ts that is within a range of about 0.018 inch to about 0.011 inch, and that is most preferably about 0.014 inch.

Figures 39A, 39B, 39C:
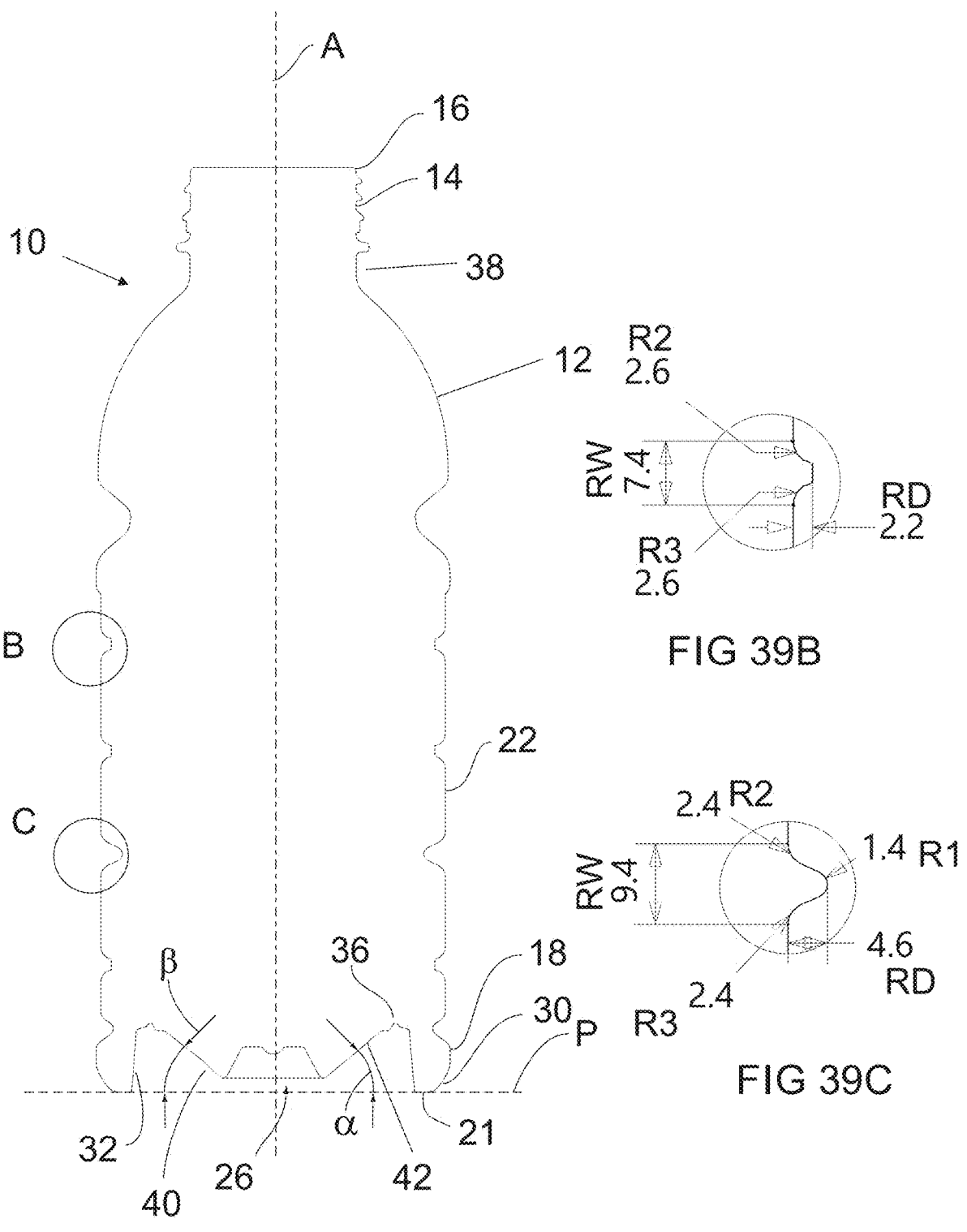
FIGS. 39A-39E show additional front and side sectional views of a container according to another embodiment of the invention.
Figure 39D:
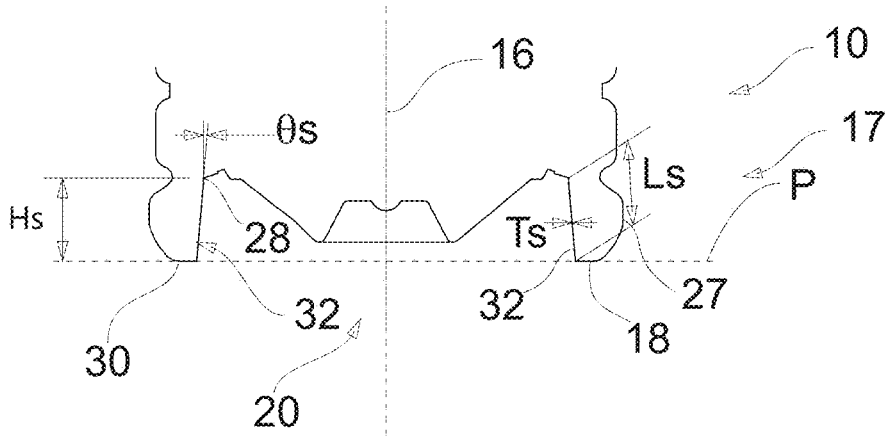
Figure 39E:
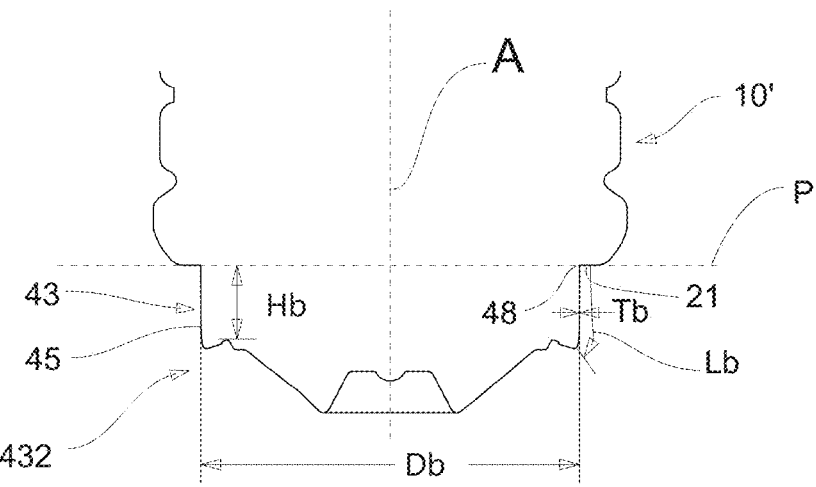

As is best shown in FIG. 39E, the base projection portion 432 includes an upstanding sidewall portion 43 that in the preferred embodiment forms the upstanding container bottom sidewall portion 32 shown in FIGS. 39A and 39D after the base projection portion 432 is relatively displaced and inverted with respect to the standing ring 21. Upstanding sidewall portion 43 is preferably although not necessarily substantially smooth and may include a plurality of spaced vertically or longitudinally oriented ribs or grooves that aid in the separation of the base projection portion 432 from the blow mold cavity wall after molding.

The substantially smooth upstanding sidewall portion 43 preferably has an average wall thickness Tb that is preferably within a range of about 0.018 inch to about 0.011 inch, and that is most preferably about 0.014 inch.

The substantially smooth upstanding sidewall portion 43 includes a substantially straight portion 45 that in the preferred embodiment is angled downwardly with respect to a vertical plane as viewed in vertical or longitudinal cross-section as shown in FIG. 39E. The substantially straight portion 45 is preferably symmetrically shaped about a circumference of the base projection portion 432 so as to define a substantially straight annular wall. The substantially straight portion as viewed in vertical or longitudinal cross-section preferably is substantially parallel to a longitudinal axis A of the container blank 10'. Substantially parallel in this case is defined as being angled with respect to a vertical plane at an angle theta b that is within a range of about 0 degrees to about 15 degrees.

The substantially straight portion 45 has a height Hb as measured parallel to a longitudinal axis 44 of the container blank 10' that is preferably greater than about 0.3 inch. The substantially smooth upstanding sidewall portion 43 of the base projection portion 432 has a length Lb measured, as is best shown in FIG. 39E, along its curvature between a first, upper location 48 and a second, lower location 49. Preferably, the length Lb is within a range of about 100% to about 115% of the height Hb. Preferably, the length Lb is also within a range of about 75% to about 115% of the height Hs of the upstanding container bottom sidewall portion 32.

Figure 40A:
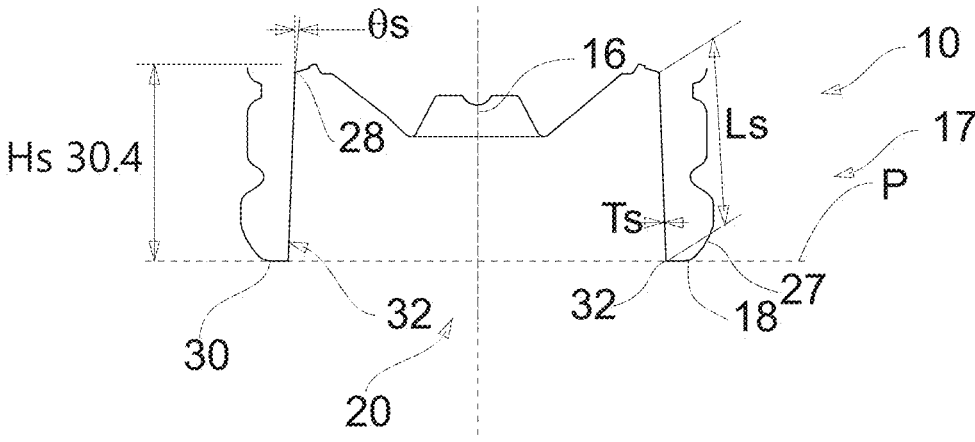
FIGS. 40A-40F show additional front, side and sectional and elevation perspective views of a container according to another embodiment of the invention.

With reference to FIGS. 40A-40E, the range extent of base mold movement or 'over-stroking' as disclosed by Kelley may be appreciated. FIG. 40A shows preferably the upstanding container bottom sidewall portion or inner wall 32 has a height Hs as measured parallel to a longitudinal axis A of the container that is preferably up to about 1.2 inch—or about 30.4 mm.

Figure 40B:
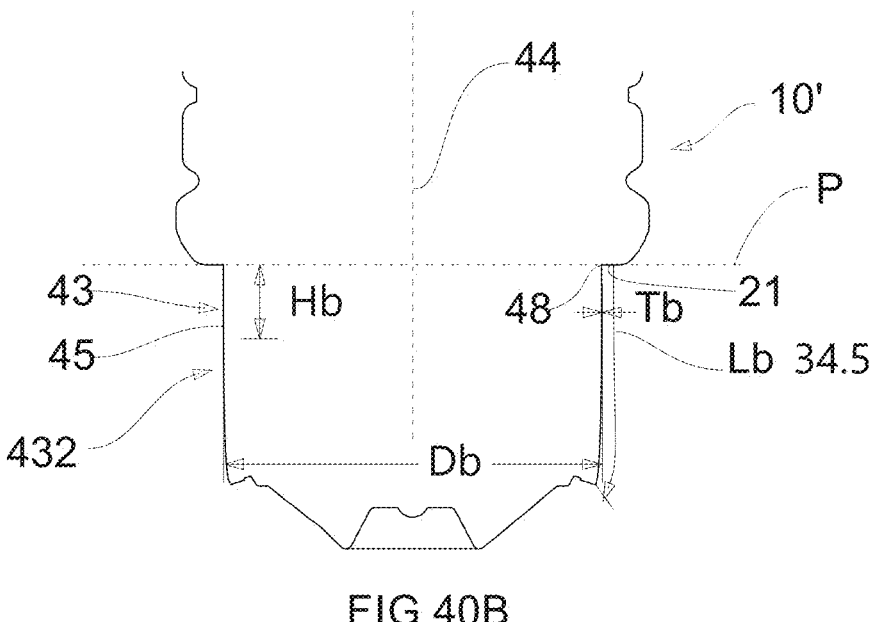

As shown in FIG. 40B, the overstretching of the base during molding to create an inner wall up to about 30.4 mm may be achieved by ensuring the length Lb is preferably overstretched to about 115% of the height Hs, in other words preferably to about 1.35 inches or 34.5 mm.

Figures 40C, 40D, 40E:
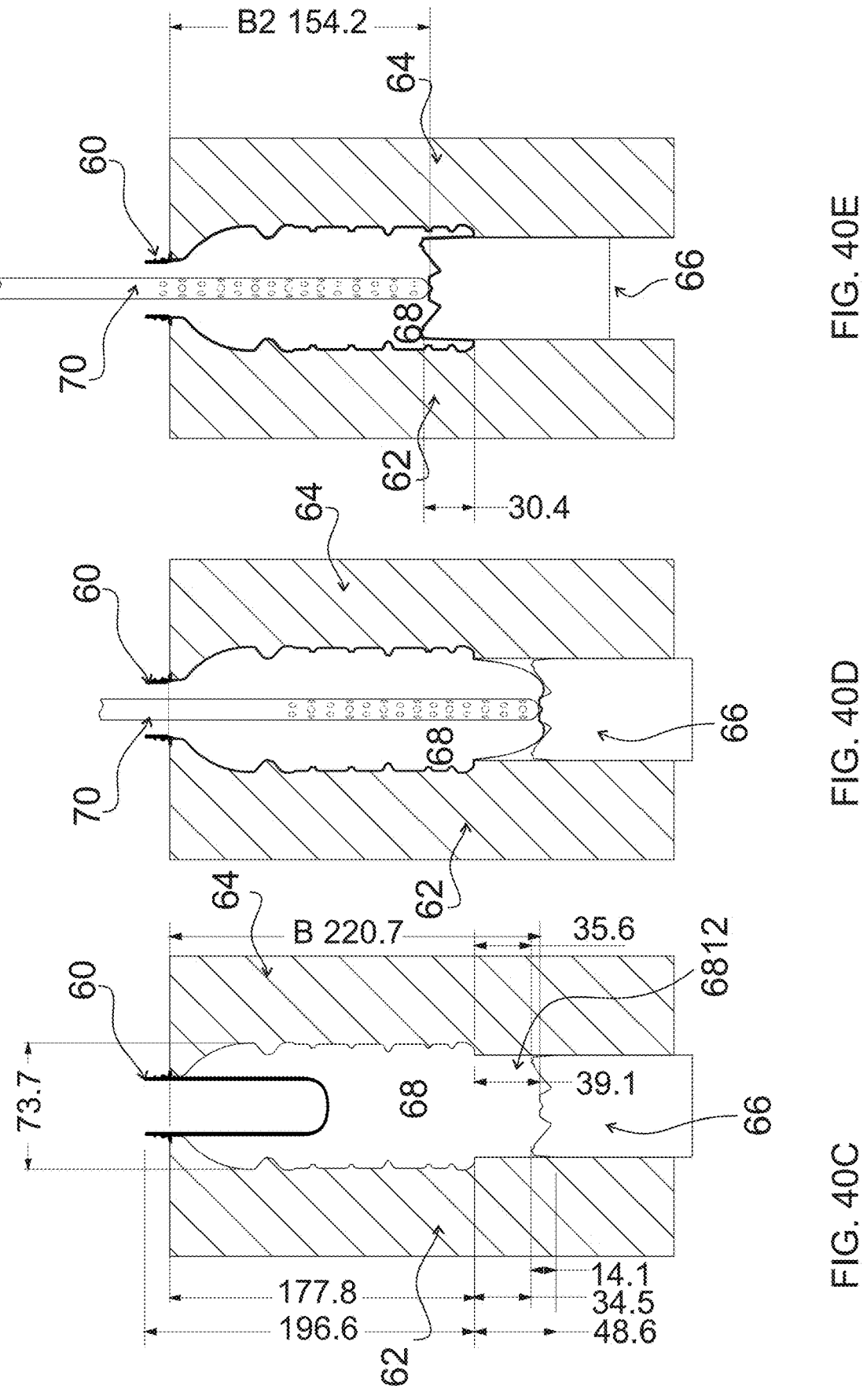

As best seen in FIGS. 40C-40E, the method of base over-stroking as disclosed by Kelley and incorporated within the present invention provides for a maximum mold base retraction of up to 1.35 inches or 34.5 mm, and for a maximum mold base extension of up to 1.2 inches or 30.5 mm-meaning a base mold movement during molding within a range of up to 2.55 inches or 65 mm.

Mechanical, pneumatic, hydraulic, or other means known in the art can be implemented to move the base mold portion 66 between the retracted and extended positions.

Figure 40F:
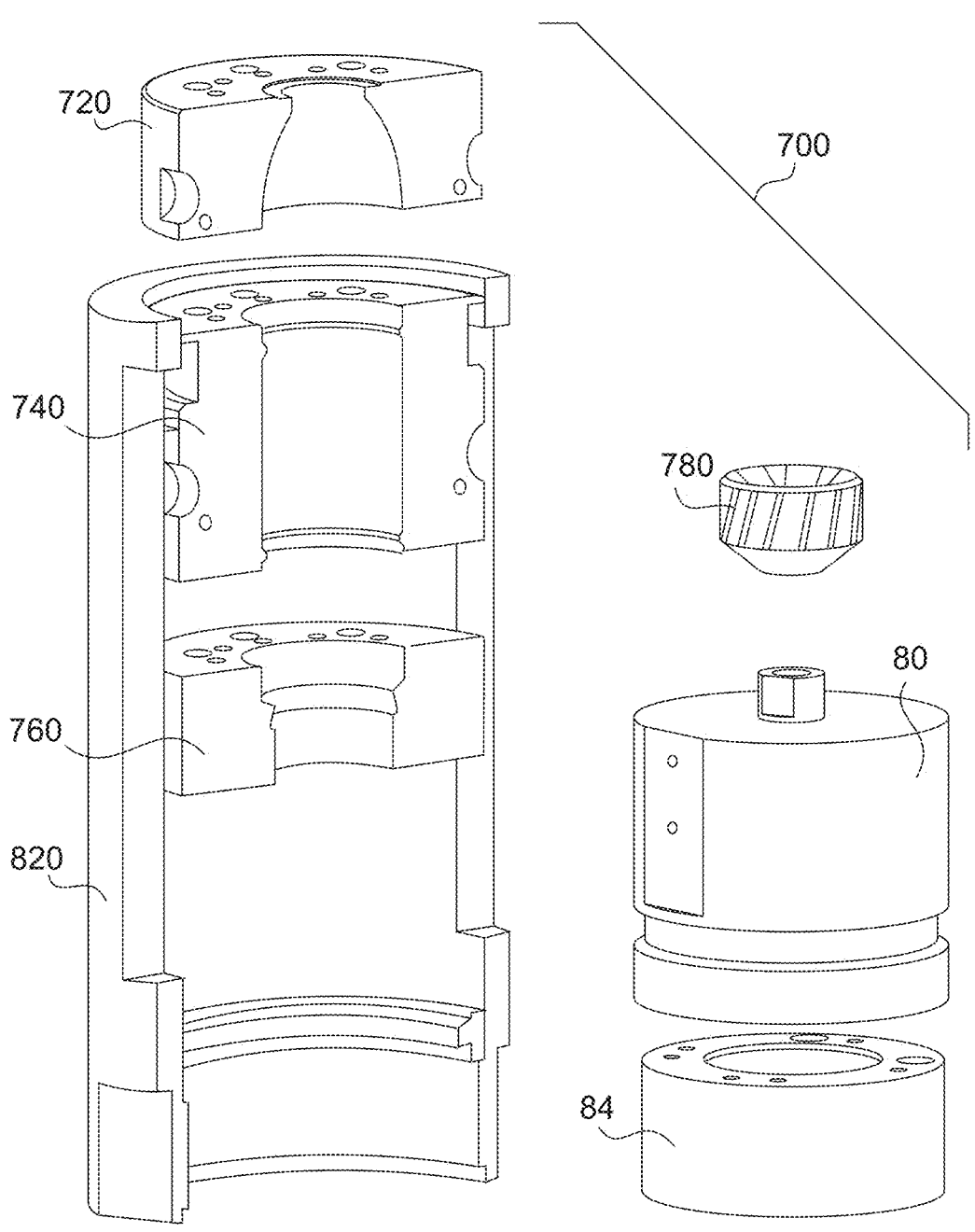

FIG. 40F depicts a mold assembly 700 disclosed by Kelley that is constructed according to a preferred embodiment of the invention for molding a container blank 10' and then relatively displacing or inverting the base projection portion 432 of the container blank 10' with respect to the standing ring 40 until the base projection portion 432 is positioned above the standing ring 40 in order to complete formation of a container 10.

Mold assembly 700 includes a first mold portion 720 that is shaped to define an upper portion of the main body 36 of the container blank 10'. A second mold portion 740 is shaped to define the rest of the main body 36, while a third mold portion 760 is shaped to form portions of the container blank bottom 38 including the base projection portion 432. Actuator 80 is supported by a pedestal 84 that is received within the mold housing 820.

In order to form a container blank 10', a heated plastic preform is positioned within the mold assembly 700 and the mold assembly is locked. The preform is then subjected to a pre-blow process in order to prevent the preform from collapsing on itself and is then longitudinally stretched using a stretch rod in otherwise conventional fashion in order to initiate the well-known reheat stretch blow molding process.

High pressure (typically on the order of 520-600 psi) is then applied to the interior of the preform with the surface of the base mold or fourth moveable mold portion 780 in the downward position in order to cause the plastic material from the preform to stretch and conform to the mold surfaces that are defined by the various above-described mold portions 720, 740, 760, and 780. This forms the container blank 10'. After the container blank 10' has been formed, the actuator 80 will be instructed by a control system to displace the fourth movable mold portion 780 upwardly with respect to the mold portions 720, 740, 760 in order to upwardly displace and invert the base projection portion into its final position above the standing ring of the container. Effectively, the base projection portion 432 is inverted in order to form the deep inset base of the container that is depicted in FIG. 1, 4 or 5. This step is advantageously initiated while the high pressure is still being maintained within the container blank 10', before the pressurized gas is exhausted from the mold assembly.

Preferably, the level of pressurization within the container blank 10' relative to ambient pressure at the time that the fourth movable mold portion 780 is moved upwardly is at least 50% of the maximum pressurization that occurs within the mold during the formation of the container blank 10'. The pressurization within the container blank 10' relative to ambient pressure at the time that the fourth movable mold portion 780 is preferably at least 260 psi, relative to external ambient pressure. This will prevent crushing of the container sidewalls during the upward movement of the fourth movable mold portion 780.

In addition, the upward movement of the fourth movable mold portion 780 is preferably performed before substantial cooling of the base projection portion has occurred, and while the plastic material retains a substantial amount of stretchability and flexibility. Preferably, the upward movement of the fourth movable mold portion 780 takes places within about 10 seconds after the container blank 10' is formed.

A stretch rod 700 can be inserted into the neck portion of the heated and softened preform 60 and can be used to stretch or elongate the preform 60 substantially along the longitudinal axis of the container. In this manner the unstretched preform 60 is axially stretched to form an over-stretched preform 60' with a length greater than A and approximately equal to B. As disclosed in Valliencourt the stretch rod 70 may be fully advanced so that it clamps a closed end 76 of the over-stretched preform 60 between an end 74 of the stretch rod 70 and the apex 58 of the base mold 66 while the mold base 66 is either in its initial position or in an intermediate position between the initial and final positions. The need for and timing of the clamping of the preform between the stretch rod 70 and base 66 will vary depending on the exact design characteristics, including weight, of the particular container 10 being molded. The present invention, unlike Valliencourt, anticipates a heated preform being stretched and blown into a mold cavity which is also heated, rather than cooled, in order to provide for far greater stretching ratios. The present invention anticipates stretching the preform at least below the container height and contact surface in order to over-stretch the preform, and unlike Valliencourt, overstretching the container during molding by a ratio of 0-20% or more to achieve greater crystallinity within the base.

Air or another medium can be expelled from the stretch rod 70 or other device to at least partially inflate the preform 60 into conformity with the mold cavity 68 in what is commonly known in the art of stretch blow molding as a "pre-blow" step. The pre-blow medium can be initiated during the preform over-stretching step or immediately after the completion of the preform over-stretching step. The exact timing of the introduction of the pre-blow medium will be dependent on the specific design characteristics of the desired container. Preferably, the preform 60 is inflated into substantially complete conformity with the mold cavity 68 while the base mold portion 66 is in the retracted position, as shown in FIG. 12B. Following a predetermined amount of time for the pre-blowing medium to expand the stretched preform 60 into the partially blown container 28, the base mold 66 may then be moved into its final position. During this movement, the stretch rod 70 is retracted at a rate corresponding to advancement of the base mold 66. This ensures that the end 76 of the over-stretched preform 60 is and remains clamped against the base mold 66, such that the stretch rod 70 is pressing against the inside surface of the preform, and the outside end surface of the preform is pressing against the mold 66. For the avoidance of doubt, this means the gap between the stretch rod 70 and the base mold 66 is filled only with the thickness of the preform polymer. Such clamping prevents shifting or movement of the over-stretched preform 60' transversely and the formation of an unacceptable container through uneven material expansion caused by a shifting 'gate' or end of the preform. The timing delay between the first pre-blowing process and the moving of the base mold 66 is critical to the success of the process and full formation of the container 10. If the delay is too great, too much material may be blown outward and if the base mold 66 is moved too early, an insufficient amount of material will be moved into the chime 82 defining areas of the mold cavity 68.

In order to stretch blow mold the container from the partially inflated volume, it is commonly known in the art of stretch blow molding to increase the pressure during the final blowing step in order to force the plastic material into complete conformity with the mold cavity 68. This can eliminate the need for the polymer material to expand deeply into tight corners, narrow spaces, for example into the base and chime area, etc., that are associated with the deeply-set pressure panel of the present invention. This can avoid resultant thin or weak spots in the formed container. The chime area 82 of the container refers to the bottom edge where the base of the bottle meets the sides. This part is also known as the "heel" of the bottle. It is a crucial area for the stability and strength of the container, especially in lightweight plastic containers required to withstand large top load forces, for example when bulk stacking containers in pallet loads for distribution, as a well-formed chime 82 or heel helps distribute the weight and pressure evenly. Preferably adjacent and above the chime 82 is a bumper region 83 that comprises the lower maximum diameter of the container.

As a result of retracting the base and applying a pre-blow pressure the polymer can be more easily blown into the base and chime 82 area. After blowing the material into the base and chime 82 area, the next step in the molding process is to blow the preform 60 into substantial conformity with the mold cavity 68. This is completed preferably after the base mold 66 has been moved into its final position and the mold cavity 68 is in its final molding configuration. However, it may be initiated prior to the base mold 66 actually reaching the final position if sufficient material has been moved into the base and chime 82 area. The result of the application of the higher pressure is the sidewalls 22 and base 20 of the fully blown container 10 are fully expanded so that they substantially conform with the side molding surfaces 621, 641 of the mold halves 62 and 64 and the base mold 66. As used herein, "substantial conformity" means conformity sufficient to produce an acceptable resultant container. During this latter application of blowing medium, the stretch rod 70 continues to clamp a portion, the apex 58, of the blown container 10 between the end 74 of the stretch rod 70 and the apex 58 of the base mold 66. At this point, the fully blown container 10 has a final length A, measured from the rim of the preform 60 to the apex 58 of the base 66. If desired, venting of the blow medium can be accomplished through the stretch rod 70 for added cooling. In summary, while the polymer material is still in a heated and softened state, the base mold portion 66 can be displaced upwardly into the mold cavity 68 to form a transverse pressure panel deeply set within the base portion of the plastic container (see, for example, the base 20 and pressure panel 26 of FIGS. 1-4).

It is one object of the present invention to improve upon Valliencourt by overstretching the container during blow molding and by retracting the base a greater distance below the contact surface than provided for in Valliencourt by between at least 15 mm and 40 mm, as disclosed by Schneider.

It is a further object of the present invention to introduce the blowing medium in an improved molding apparatus and including the methods disclosed in Valliencourt in order for at least:

(a) Providing the blowing medium in at least two different pressures, if not at least three different pressures;

(b) First providing the blowing medium at a lower pressure and then providing the blowing medium at a higher pressure;

(c) Providing the blowing medium at one pressure P1 during the phase of stretching the preform, and at another pressure P2 during the pre-blow molding phase with the base in the retracted position, wherein P1 may be the same as P2, or P1 may be less than P2;

(d) Providing the blowing medium at one pressure P2 during the pre-blow phase of molding, and at another pressure P3 during the final blow molding phase with the base in the final extended position, wherein P2 may be the same as P3, or P2 may be less than P3;

(e) Providing the blowing medium at one pressure P2 during the pre-blow phase of molding, and at a higher pressure P3 during the final blow molding phase after the base mold has been moved into the final extended position, wherein movement of the base mold from the retracted position to the extended position is completed prior to providing the blowing medium P3;

(f) First providing the blowing medium at a lower pre-blow pressure P2 before movement of the base mold (66) from the retracted position, and then providing the blowing medium at a higher pressure P3 after movement of the base mold (66) from the retracted position;

(g) Providing the blowing medium at a lower pre-blow pressure P2 after movement of the base mold (66) from the retracted position, and before the base mold (60) has reached a final extended position, and further providing the blowing medium at a higher pressure P3 prior to the base mold (66) reaching the final extended position, wherein the pressure is increased from P2-P3 during movement of the base from the retracted position to the extended position;

(h) Providing the blowing medium at a lower pre-blow pressure P2 before movement of the base mold (66) from the retracted position, and then providing for an increase in pressure prior to movement of the base mold (66) to the final extended position, wherein the blowing medium is provided at a higher pressure P3 prior to the base mold (66) reaching the final extended position and the pressure is increased from P2-P3 during movement of the base from the retracted position to the extended position;

(i) Providing the blowing medium at a lower pre-blow pressure P2 before movement of the base mold (66) from the retracted position to the extended position, and then providing for an increase in pressure simultaneously with movement of the base mold (66) from the retracted position, wherein the blowing medium is provided at a higher pressure P3 prior to the base mold (66) reaching the final extended position and the pressure is increased from P2-P3 during movement of the base from the retracted position to the extended position; and, (j) Providing the blowing medium at a lower pre-blow pressure P2 before movement of the base mold (66) from the retracted position, and then providing for an increase in pressure after movement of the base mold (66) from the retracted position, wherein the blowing medium is provided at a higher pressure P3 prior to the base mold (66) reaching the final extended position and the pressure is increased from P2-P3 during movement of the base from the retracted position to the extended position.

In another preferred embodiment Air can continue to be expelled to blowing pressure into the stretch rod in the blow mold cavity during displacement of the base mold portion 66 to the extended position, or alternatively, the supply of air can be turned off.

Referring to FIGS. 1-4, by "deeply set" it is meant that the pressure panel 26 is located entirely between the standing plane P and the upper portion 12 of the container when the pressure panel 26 is in the outwardly-inclined position (FIG. 2) and when it is in the inwardly-inclined position (FIG. 3). In the exemplary embodiment of FIGS. 12A-12C, the base mold portion 66 moves substantially along the longitudinal axis of the plastic container being formed in the mold cavity 68, however, other orientations are possible.

Once the plastic container has been formed in the mold cavity 68, the base mold portion 66 can return to the retracted position, and the side mold portions 62, 64 can separate to release the formed container.

By utilizing the blow molding method of the present invention, it is possible to initially form the general container shape with an overstretched and partly formed downwardly inclined base panel portion, and then deflect the bottom upwardly at orientation temperature. As a result, the container base and deeply-set pressure panel can be of improved material thickness and uniformity. In addition, the base and pressure panel can be multi-axially stretch oriented to provide increased strength without the attendant thinness or weakness at the heel portion of the bottle.

The base of the plastic container according to the present invention is preferably crystallized to some extent. Some degree of crystallinity and/or biaxial orientation can be achieved normally during the blow molding process. However, crystallization can be promoted through heat setting of the container. For example, the walls and base of the mold can be held at an elevated temperature to promote crystallization. When the container is heat set at a temperature of about 180 degrees F., the container sidewalls, base, pressure panel, etc., can be typically crystallized to about 20%. This degree of crystallinity is typical for a blow molding process and does not represent a significant amount of heat setting or increased crystallinity or orientation, as compared with a typically prepared container. However, the properties of the base and pressure panel of the present invention can be advantageously enhanced by heat setting the container, and particularly the base and pressure panel, at ever higher temperatures. Such temperatures can be, for example, greater than 250 degrees F. and can be 325 degrees F. or even higher. When these elevated heat-set temperatures are utilized, crystallinity can be increased to greater than 20% or 25% or more. One drawback of increasing crystallinity and biaxial orientation in a plastic container is that this process introduces opacity into the normally clear material. However, unlike bases in prior art containers, which can require a crystallinity of 30% or more, utilizing crystallinities of as low as 22-25% with a base structure according to the present invention can achieve significant structural integrity, while maintaining the substantial clarity of a base that is preferred by manufacturers, packagers and consumers.

U.S. Pat. Nos. 4,465,199; 3,949,033; 4,378,328; and 5,004,109, all of which are incorporated herein by reference, disclose further details relating to blow molding methods utilizing displaceable mold portions. The methods disclosed in these references can also be implemented to form plastic containers according to the present invention. According to an alternative embodiment of the invention, the plastic container can be removed from the blow mold prior to forming the deeply-set pressure panel. Outside of the mold, the pressure-panel and related structure(s) can be formed in the base of the plastic container using a mandrel or similar device. U.S. Pat. No. 4,117,062, the entire content of which is incorporated herein by reference, provides further details on this type of post-mold processing.

Following the blow molding process the container may then be passed directly to a Filling Apparatus for further processing, wherein the processing and handling apparatus includes apparatus for blow molding and filling and capping and cooling and forced volume reduction with container holding devices contained within the volume reduction apparatus, and labelling apparatus; or otherwise transported or conveyed from the blow molder to a filling line apparatus for filling, capping, cooling, forced volume reduction and container stabilization with holding devices, and labelling apparatus. In particular after filling the container with the base in a first, outward position and capping or sealing the container, the container may be conveyed to an apparatus or device to mechanically force the base upward into a locked position and force an increase in the pressure within the container.

A forced volume reduction apparatus is now generally described in FIGS. 30-36. Filled and capped containers including the invertible bases of the present invention may be fed into such an apparatus in order to force the central longitudinal height of the container to be reduced in length, in turn forcing the container to reduce in volume, thereby creating an increase in pressure due to the container being sealed. This may be applied to any filled and capped container, irrespective of exact internal temperature at entry, which will vary according to filling or processing technique. The exit pressure from the apparatus will always be greater than the entry pressure.

Figure 30:
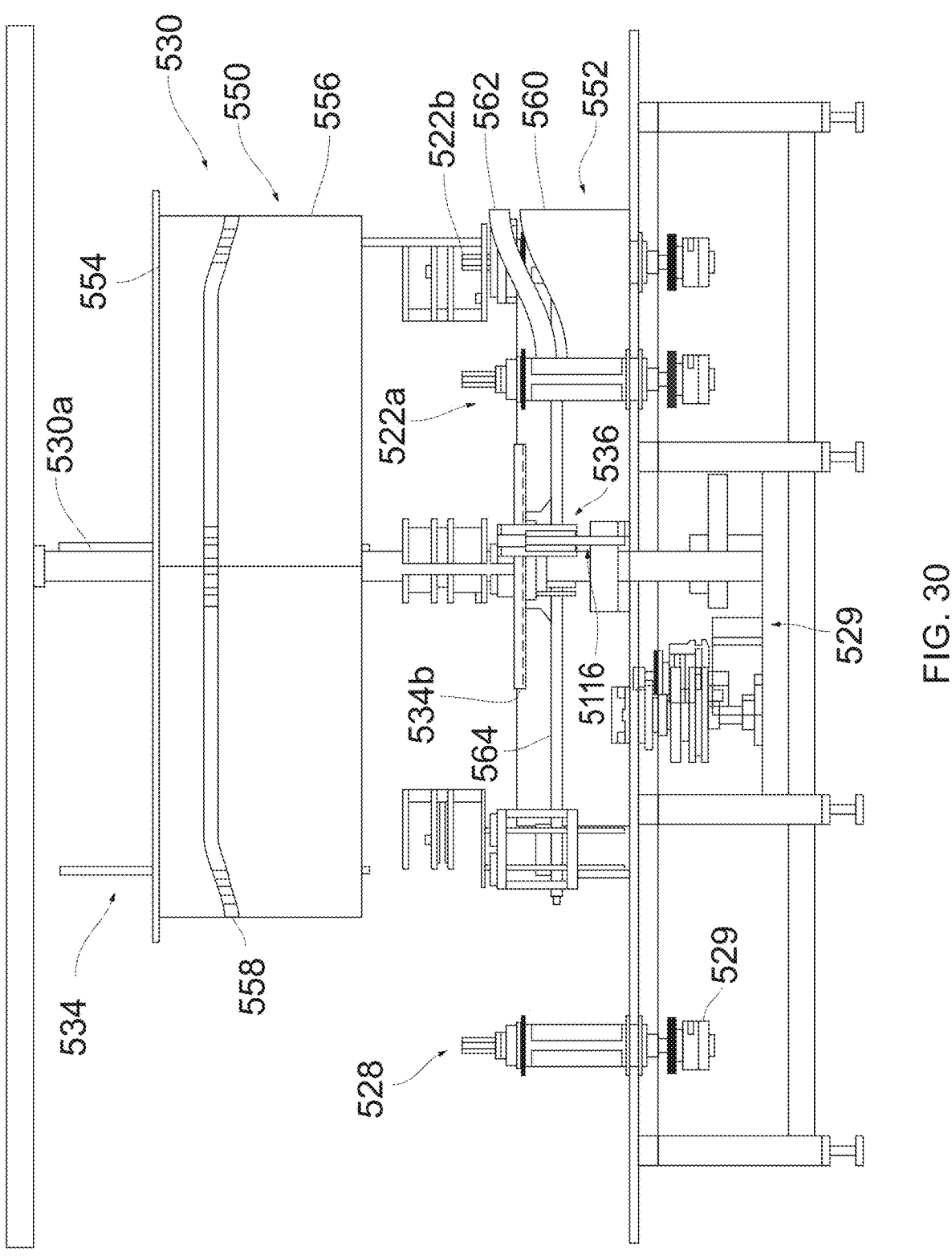
FIG. 30 is a front side elevation view of a handling system that combines single containers with a container handling device according to an embodiment of the invention.
Figure 31A:
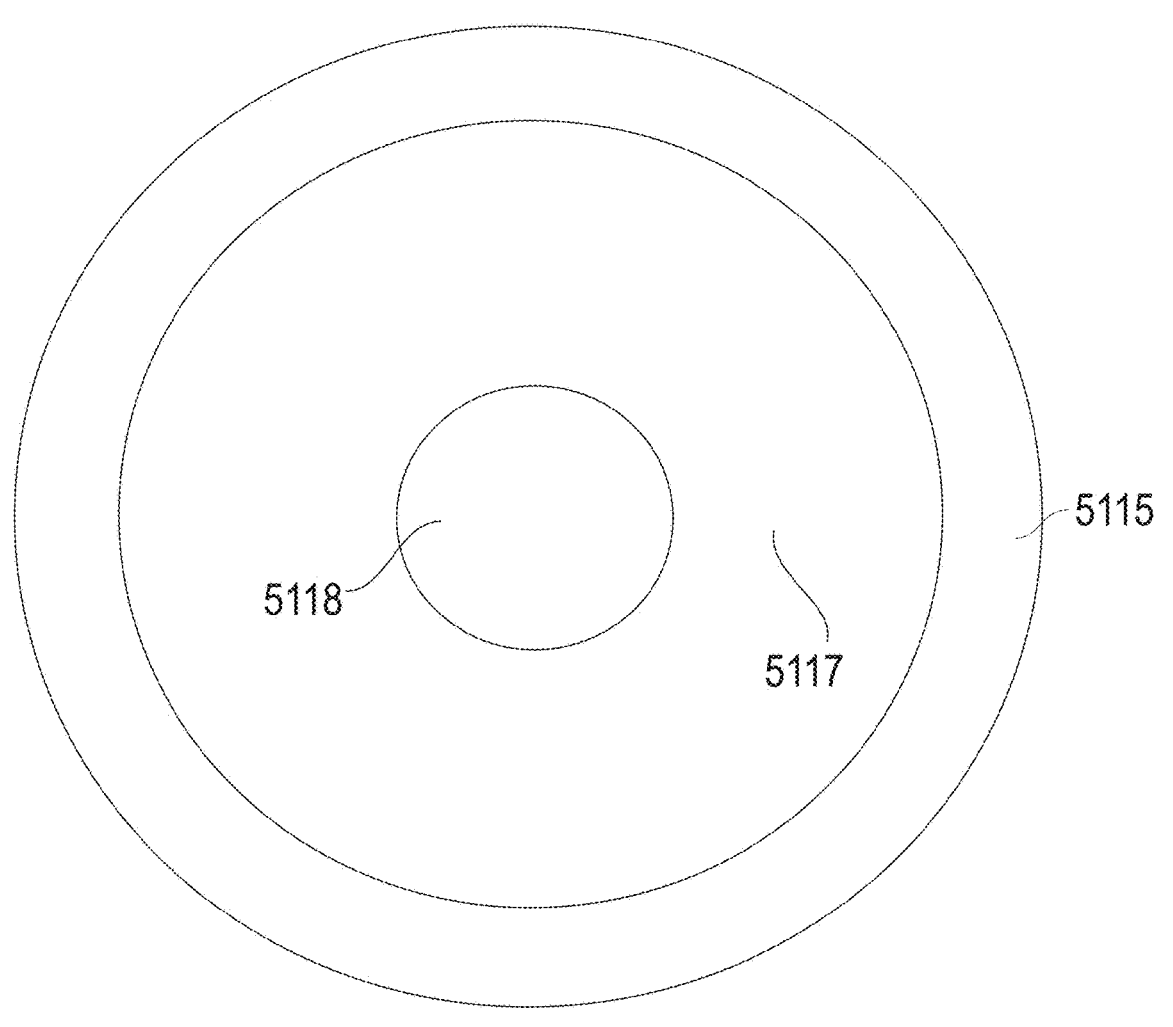
FIGS. 31A-31B show a plan and front view of a base plate holder portion of a container holding device according to an embodiment of the invention.
Figure 31B:
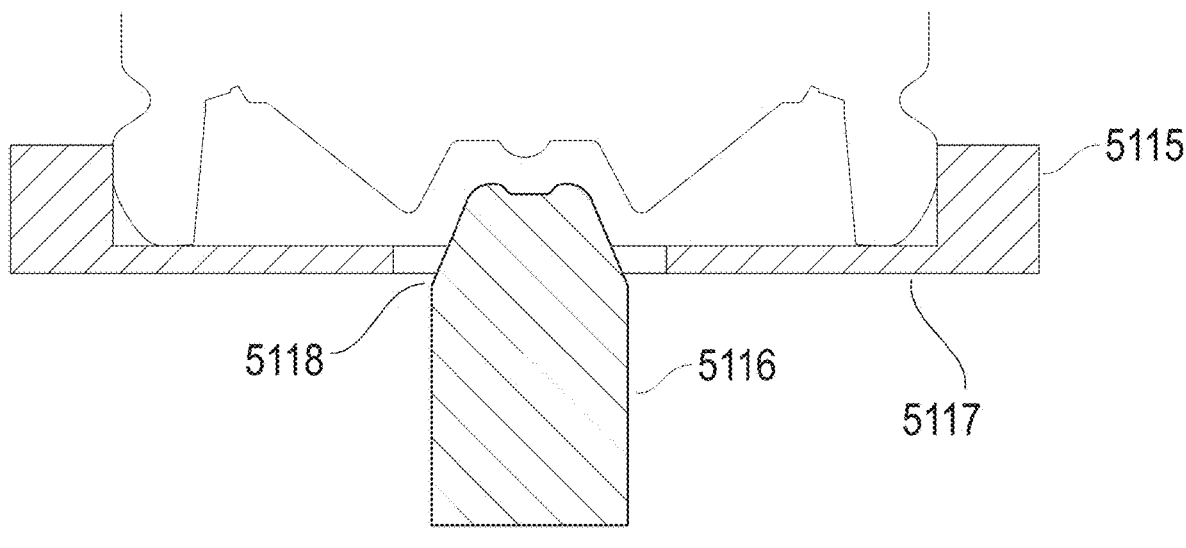
Figure 34:
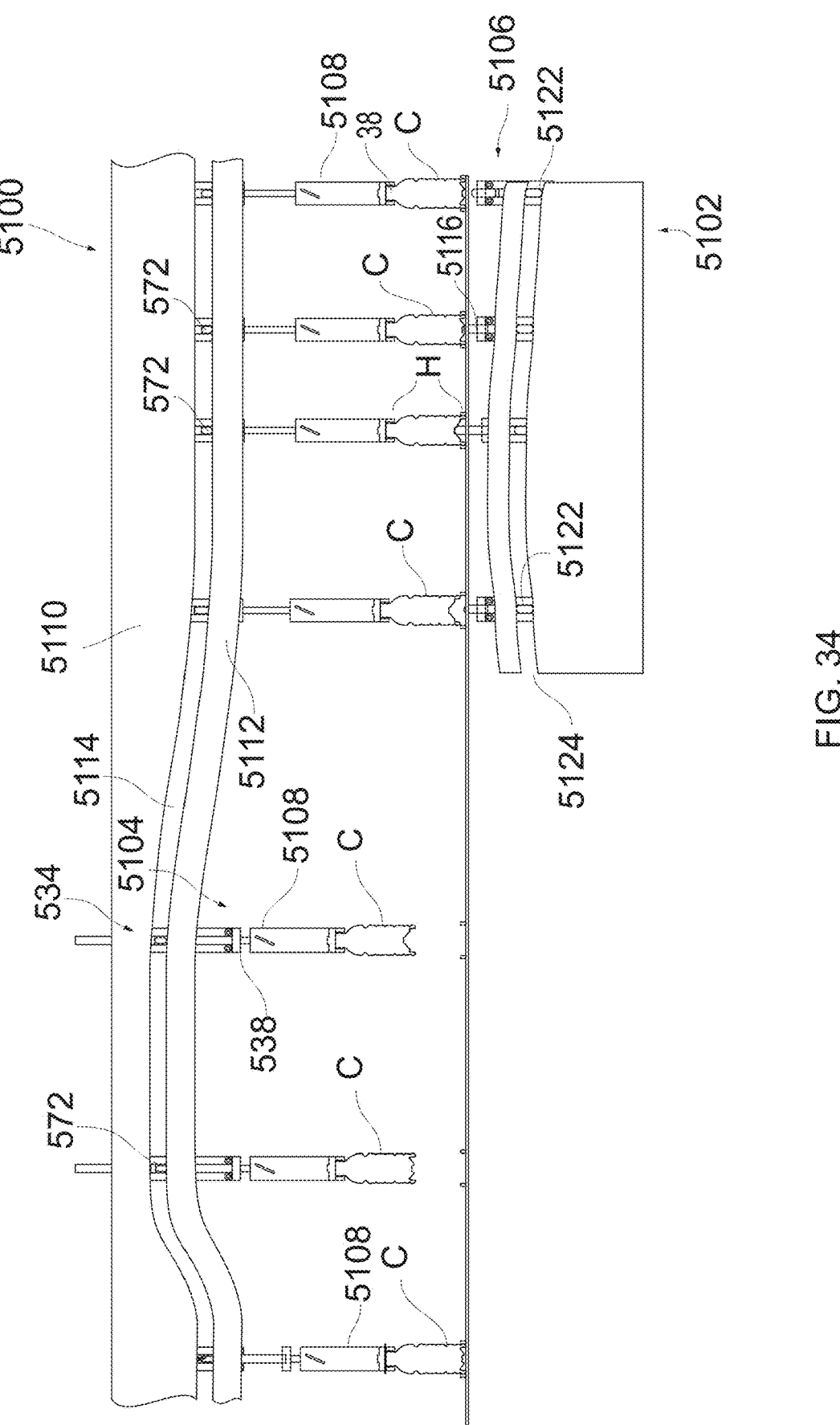
FIG. 34 is an unfolded elevation view of a section of the activation portion of FIG. 32 illustrating the activation of the container and the removal of the container from the container holding device.

Referring firstly to FIGS. 30 and 31, main turret assembly 530 includes an upper cam assembly 550 and a lower cam assembly 552. Cam assemblies 550 and 552 comprise annular cam plates that encircle shaft 530a and actuator assemblies 534 and 536. The cam plates provide cam surfaces to actuate the actuator and/or device holding assemblies H, as will be more fully described below. Upper cam assembly 550 includes upper cam plate 554 and a lower cam plate 556, which define there between a cam surface or groove 558 for guiding the respective extendable rods 538 of actuator assemblies 534. Similarly, lower cam assembly 552 includes a lower cam plate 560 and an upper cam plate 562 which define there between a cam surface or groove 564 for guiding extendable rods 5116 of actuator assemblies 536. Mounted to extendable rod 538 may be a guide member or cam follower, which engages cam groove or surface 558 of upper cam assembly 550. As noted previously, actuator assemblies 534 are mounted in a radial arrangement on main turret system 530 and, further, are rotatably mounted such that actuator assemblies 534 rotate with shaft 530*a* and container holder wheel 532. In addition, actuator assemblies 534 may rotate in a manner to be synchronized with the in-feed of containers C. As each of the respective actuator assemblies 534 is rotated about main turret system 530 with a respective container, the cam follower is guided by groove 558 of cam assembly 550, thereby raising and lowering extendable member 538 to enable a holding device to capture and secure the upper end and/or neck finish of each container as seen in FIG. 34 in order to stabilize the container prior to mechanically forcing the pressure panel in the base upwards.

Various container holding devices are may be used, for example the containers according to one preferred embodiment of the invention may be supported at the neck of each container during the forced volume reduction operations to provide maximum control of the container processes. The apparatus may be aligned in a rotary manner as disclosed in the drawings or in a linear direction.

Figure 32:
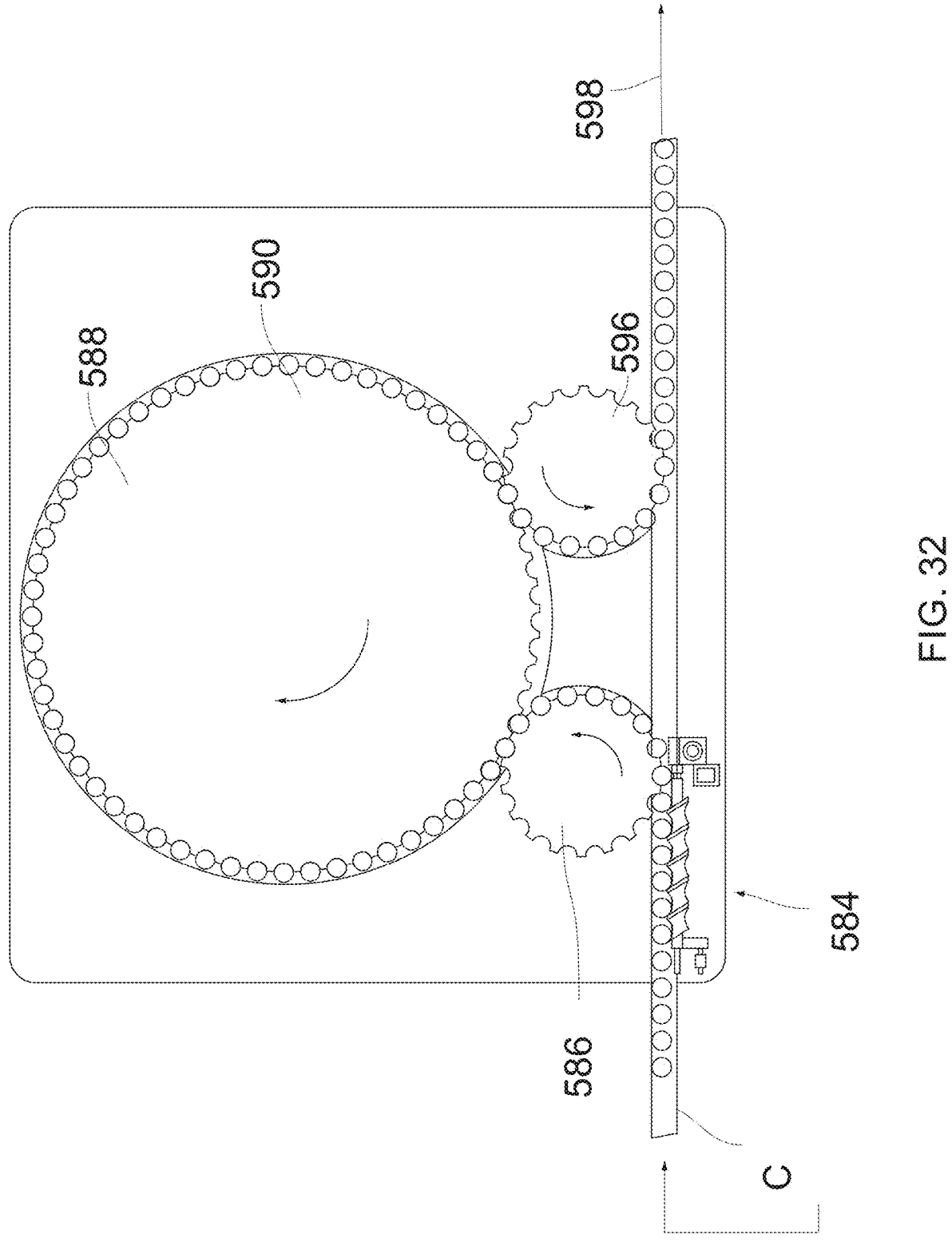
FIG. 32 is a schematic plan view of an activation portion of the handling system according to an alternate embodiment of the invention.
Figure 33:
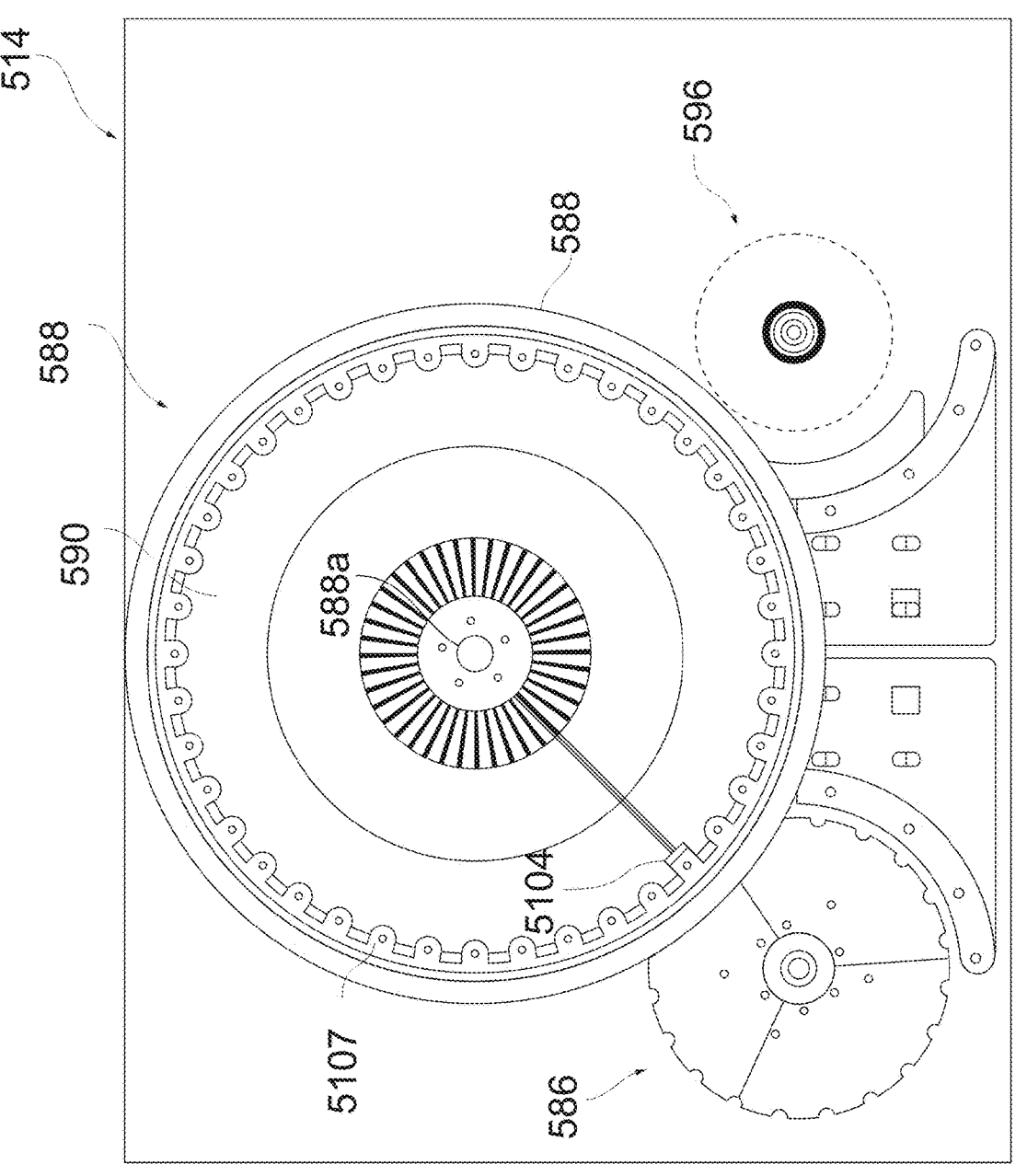
FIG. 33 is a detailed plan view of the activation portion of the handling system of FIG. 32.

Referring to FIGS. 32 and 33, one system for singularly activating containers C includes a feed-in scroll assembly 584, which feeds and, further, spaces the respective containers at a spacing appropriate for feeding into a feed-in wheel 586. Feed-in wheel 586 is driven by a motor (not shown) which is coupled to a gear or sheave mounted on its shaft and includes a generally star-shaped wheel that feeds-in the containers to turret assembly 588. Turret assembly 588 includes a container holder wheel 590 for guiding and moving containers C and any fixed portion of container holding devices H, for example base plates as similar to base plates common in the art for stabilizing containers in a rotary labelling device (although example base plate holder 5117 suitable for the present invention are configured to include a central opening 5118 for the through passage of an extendable rod or pusher 5116, in a circular path. Containers may be stabilized in many types of holding device H. By way of example only, it is generally most preferable for a holding device to include a lower holding portion for the base region of a container and/or a holding portion for the upper part of the body or bell portion of neck support region of the container. While it is most preferable to include both upper and lower holding devices, it is possible to use only a single upper or lower holding device. By way of example only, a lower holding device may be configured to include a modified base plate holder 5117—as shown more clearly by way of example in FIG. 31A-31B, wherein a central opening 5118 in the base plate holder provides for the passage of an extendable rod or pusher 5116. Preferably the base plate holder also has sufficient height to the lateral sides 5115 to hold the lower bumper portion in secure position. In other embodiments, the lower holding device may be included or incorporated in conjunction with the housing 5120, which supports extendable rod 5116, in order to provide a vertically mobile holding device that contains the base portion of the container during travel within the volume reduction apparatus, and releases the container for subsequent ejection after base panel inversion, by lowering of the housing 5120 or extendable rod 5116 and attached holding device. In other embodiments the lateral sides may include a portion of the sidewall, and in further embodiments there may be sidewall holding devices either in addition to upper and/or lower holding devices, or in the place of either. By way of example only a holding device for the upper portion of the container may include a neck body gripper 5109 comprising the lowest part of container gripper 5108 and designed to stabilize the region of the container below the seal or cap to prevent sideways movement during inversion of the base. Neck body gripper 5109 may also be configured to enclose or contain any region in the upper part of the container and may also be configured to only contain an upper portion of the container and not the upper neck portion. A plurality of actuator assemblies 5104 and 5106 for removing the containers from the container holders, depending on the style of holding device incorporated, and for activating the respective containers while the containers are stabilized by the holding device, will be more fully described below. After the respective containers have been activated and the respective containers removed from the container holding devices, as the containers are discharged by a discharge wheel 596 to a conveyor 598 for further processing. Wheels 586 and 596 may be driven by a common motor, which is drivingly coupled to gears or sheaves mounted to the respective shafts of wheels 586 and 596.

Turret assembly 588 includes container holder wheel 590, upper and lower cam assemblies 5100 and 5102, respectively, a plurality of actuator assemblies 5104 for gripping the containers, and a plurality of actuator assemblies 5106 for activating the containers. In addition, turret system 588 includes a support plate 5107, which supports the container holders and containers as they are moved by turret system 588. As best seen in FIG. 33, container holder wheel 590, actuator assemblies 5104, actuator assemblies 5106, and plate 5107 are commonly mounted to shaft 588*a* so that they rotate in unison. Shaft 588*a* is similarly driven by the common motor, which is drivingly coupled to a gear or sheave mounted on shaft 588*a*.

Figure 35:
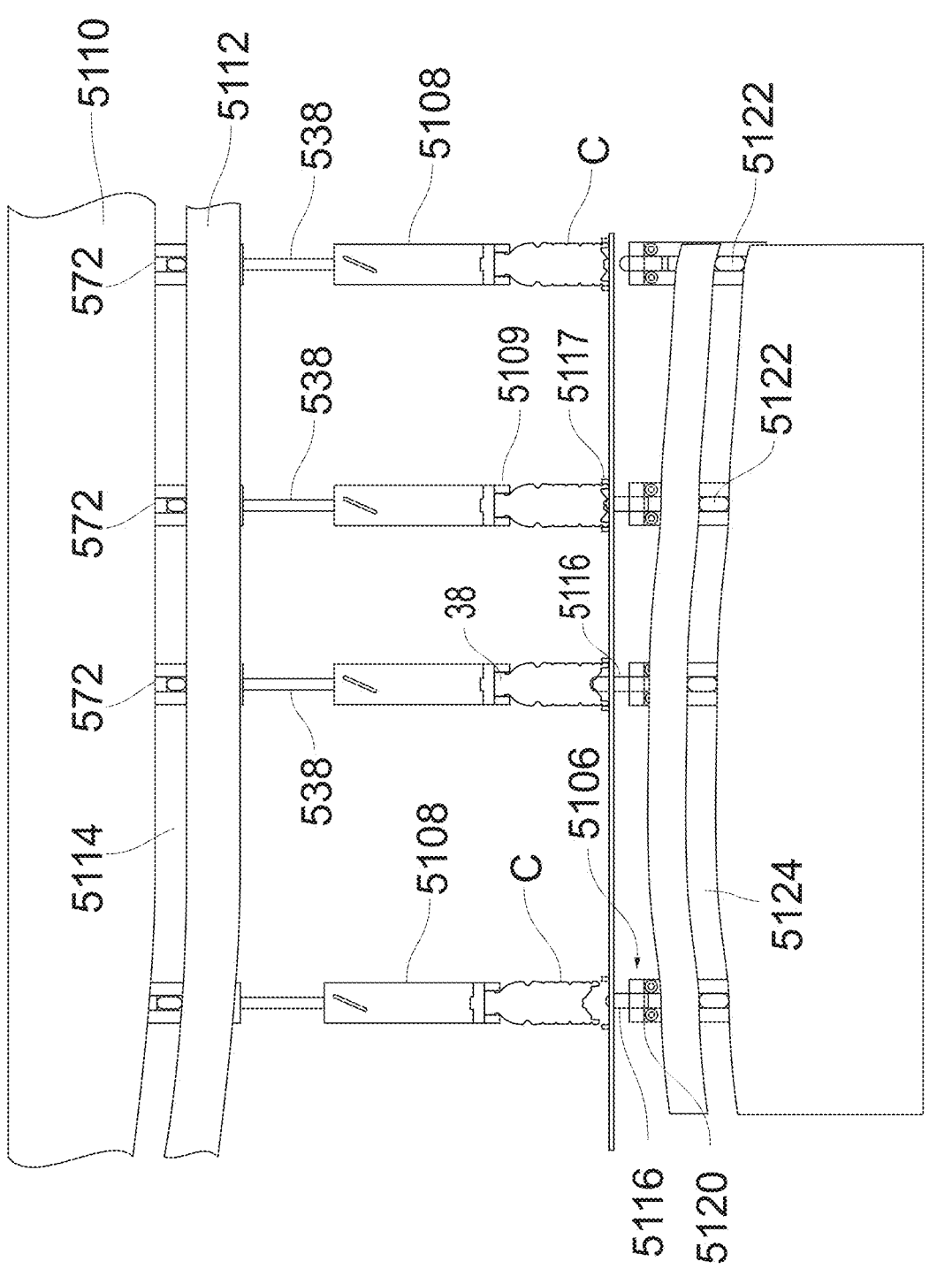
FIG. 35 is an enlarged view of a section of the activation portion of FIG. 34.
Figure 36:
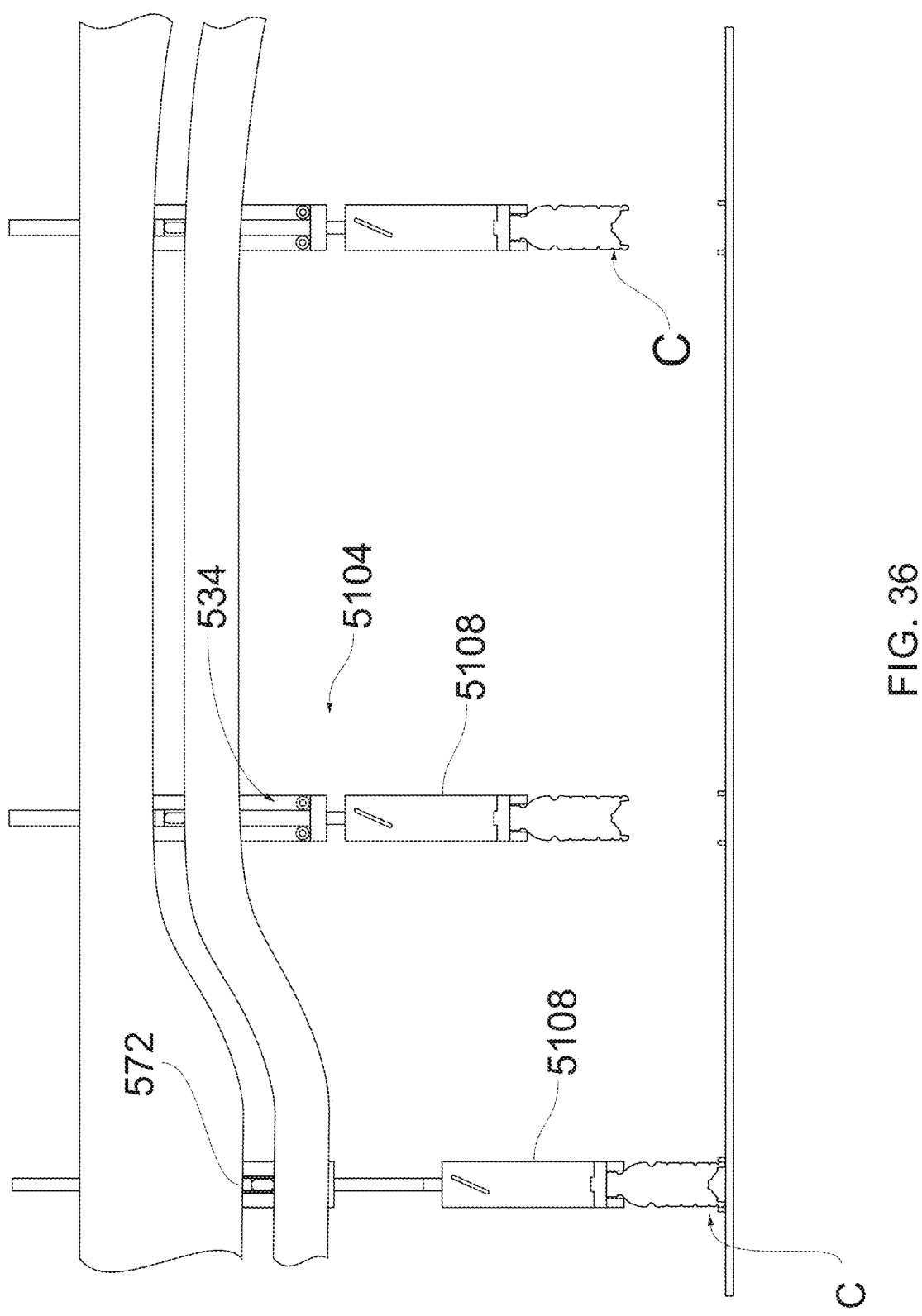
FIG. 36 is an enlarged view of the container holder removal section of FIG. 34.
Figure 37:
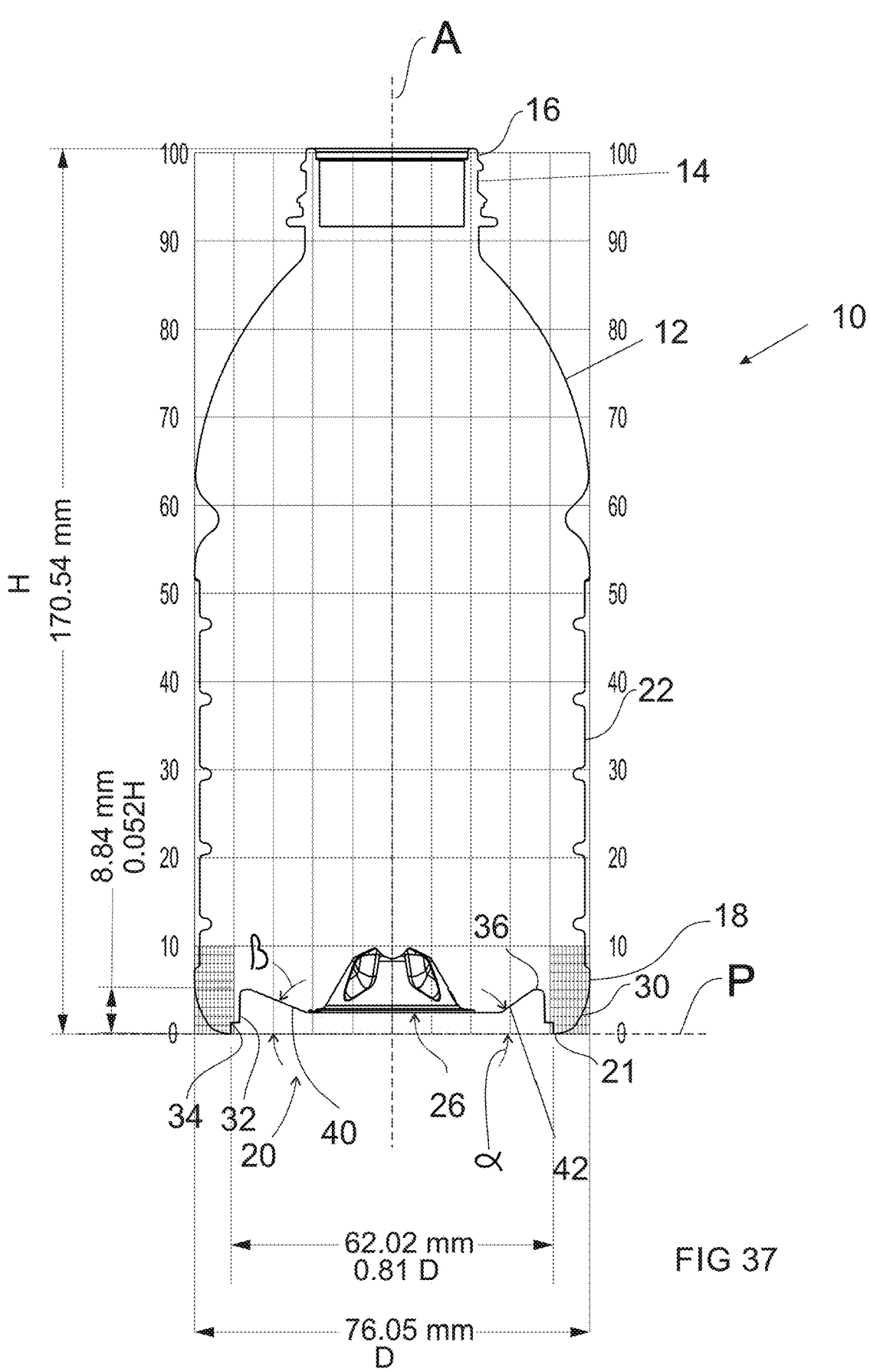
FIG. 37 is the container of FIG. 2 with an overlay grid and measures.
Figures 38A, 38B:
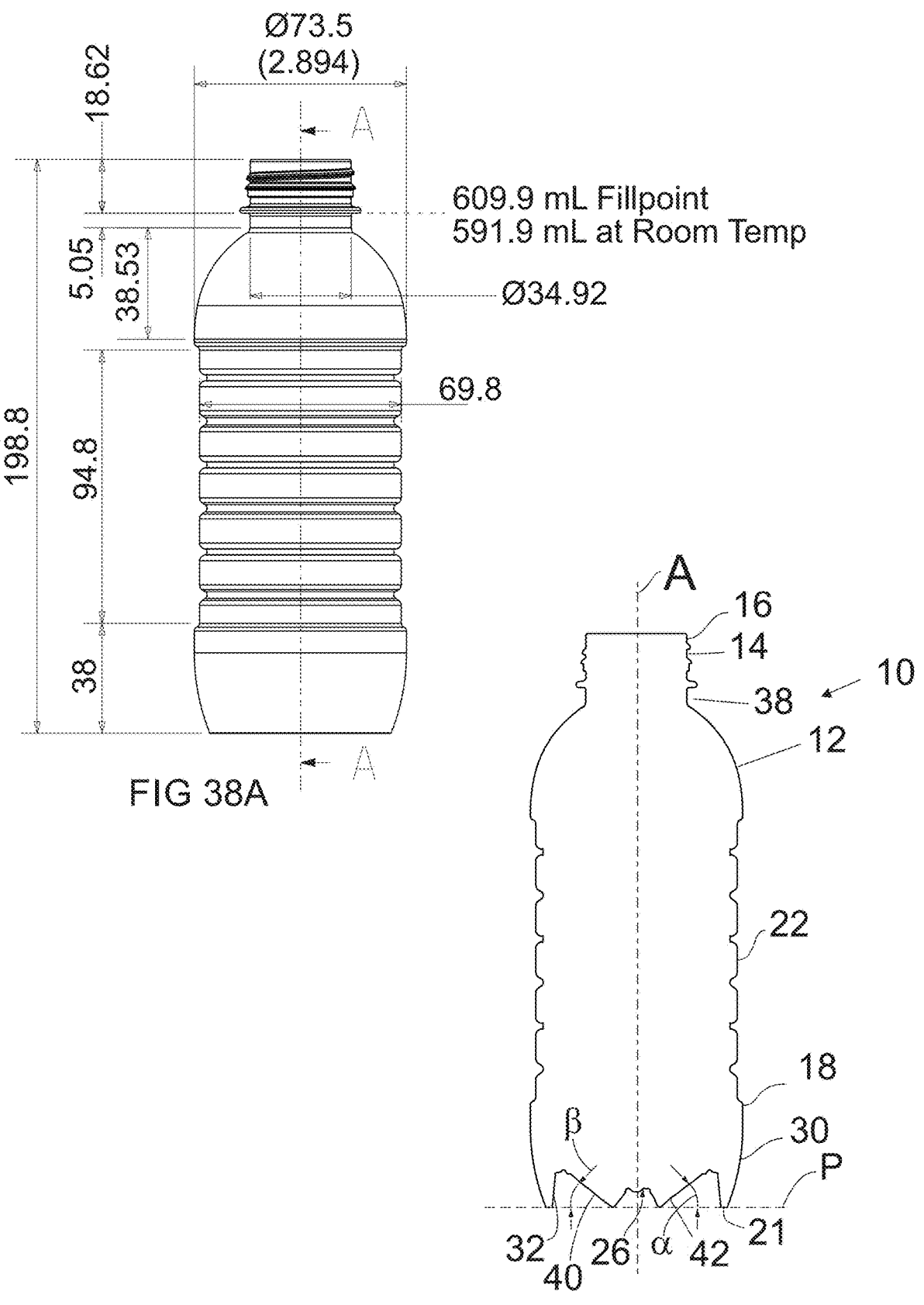
FIGS. 38A-38G show additional front and side sectional views of a container according to another embodiment of the invention.
Figures 38C, 38D, 38E, 38F, 38G:
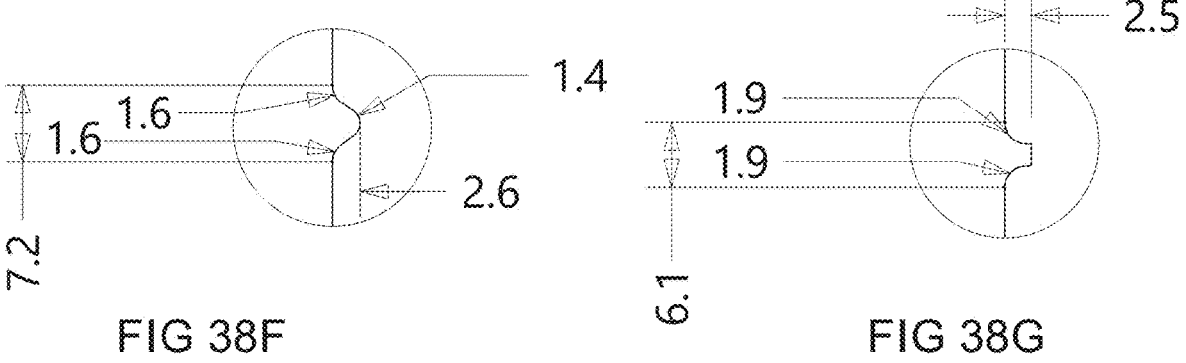

Looking at FIGS. 34-36, actuator assemblies 5104 and 5106 are similarly controlled by upper and lower cam assemblies 5100 and 5102, to remove the containers C from the container holding devices H and activate the respective containers so that the containers are generally subjected to a forced volume reduction and a generally stable configuration wherein the containers can be supported from their bottom surfaces and be conveyed on a conventional conveyor. Referring to FIG. 34, each actuator assembly 5104 includes actuator assembly 534 and a container gripper 5108 that is mounted to the extendable rod 538 of actuator assembly 534. As would be understood, grippers 5108 are, therefore, extended or retracted with the extension or retraction of extendable rods 538, which is controlled by upper cam assembly 5100.

Similar to upper cam assembly 550, upper cam assembly 5100 includes an upper plate 5110 and a lower plate 5112, which define therebetween a cam surface or recess 5114, which guides guide members 572 of actuator assemblies 5104 to thereby extend and retract extendable rods 538 and in turn to extend and retract container grippers 5108. As the containers are conveyed through turret assembly 588, a respective gripper 5108 is lowered onto a respective container by its respective extendable rod 538. Once the gripper is positioned on the respective container, actuator assemblies 5106 are then actuated to extend their respective extendable rods 5116, which extend through plate 5107 and holders H, to apply a compressive force onto the invertible projections of the containers to move the projections to their recessed or retracted positions to thereby activate the containers. As would be understood, the upward force generated by extendable rod 5116 is counteracted by the resistance or opposite downward force of a gripper 5108 on container C. After the activation of each container is complete, the container then can be removed from the holder by its respective gripper 5108 or by way of releasing the containers from the holding devices and transferring the containers back to the conveyor for transfer to the labeller. Additionally and alternatively, a label may be applied as soon as the base has been forced upwardly and could therefore be applied through integration within the forced volume reduction apparatus.

Referring to FIGS. 34-35, each actuator assembly 5106 is of similar construction to actuator assemblies 534 and 536 and includes a housing 5120, which supports extendable rod 5116. Similar to the extendable rods of actuator assemblies 534 and 536, extendable rod 5116 includes mounted thereto a guide 5122, which engages the cam surface or recess 5124 of lower cam assembly 5102. In this manner, guide member 5122 extends and retracts extendable rod 5116 as it follows cam surface 5124 through turret assembly 588. As noted previously, when extendable rod 5116 is extended, it passes through the base of container holding device H to extend and contact the lower surface of container C and, further, to apply a force sufficient to compress or move the invertible projection its retracted position so that container C can again resume its geometrically stable configuration for normal handling or processing.

The physics of manipulating the activation panel P or extendable rod 5116 is a calculated science recognizing 1) Headspace in a container; 2) Product density in a hot-filled container; 3) Thermal differences from the fill temperature through the cooler temperature through the ambient storage temperature and finally the refrigerated temperature; and 4) Water vapor transmission. By recognizing all of these factors, the size and travel of the activation panel P or extendable rod 5116 is calculated so as to achieve predictable and repeatable results. With the vacuum removed from the hot-filled container, the container can be light-weighted because the need to add weight to resist a vacuum or to build vacuum panels is no longer necessary. Weight reduction of a container can be anticipated to be approximately 20%.

Figure 28:
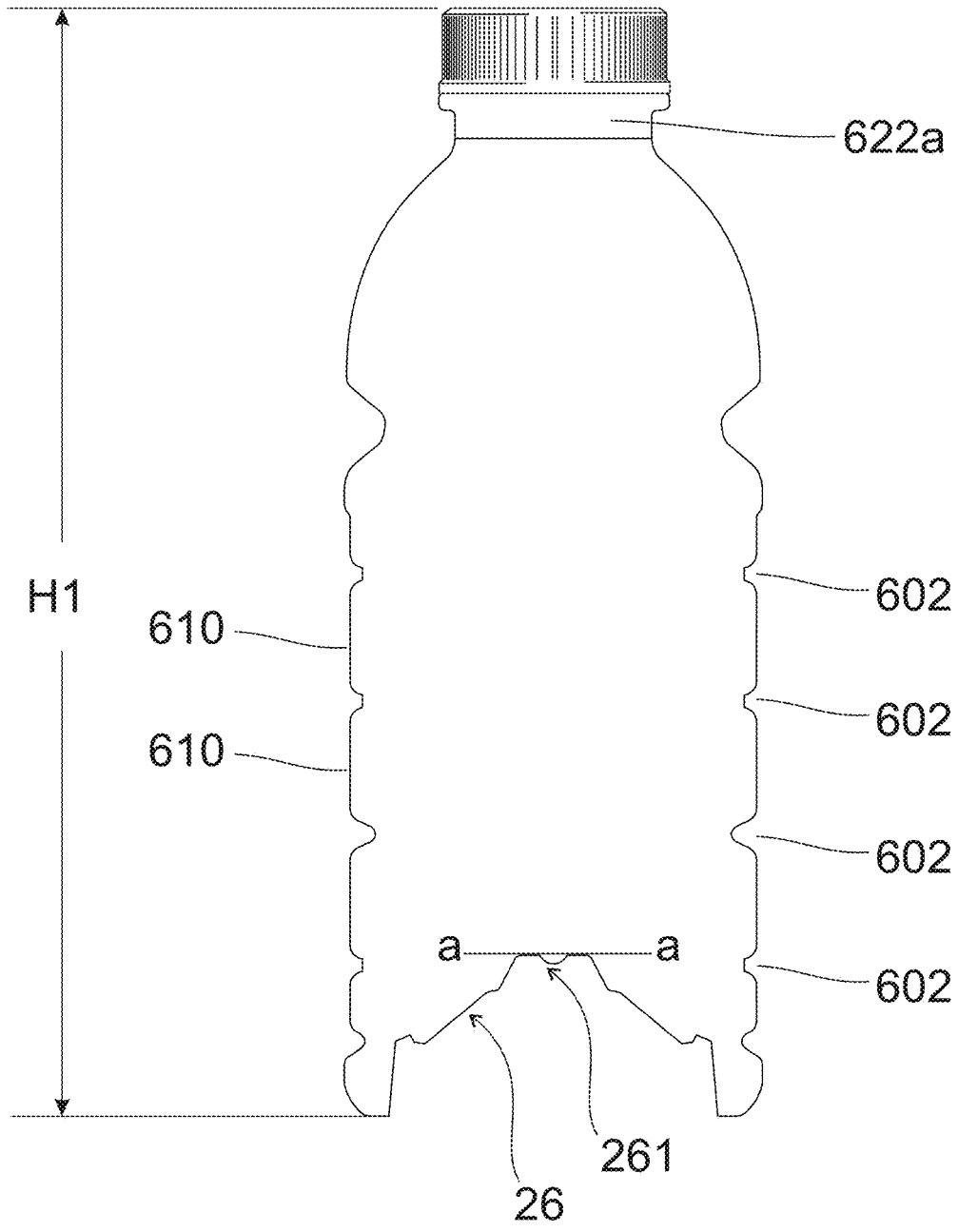
FIG. 28 is a side sectional view of a container according to one embodiment of the invention prior to bulk pallet stacking.
Figure 29:
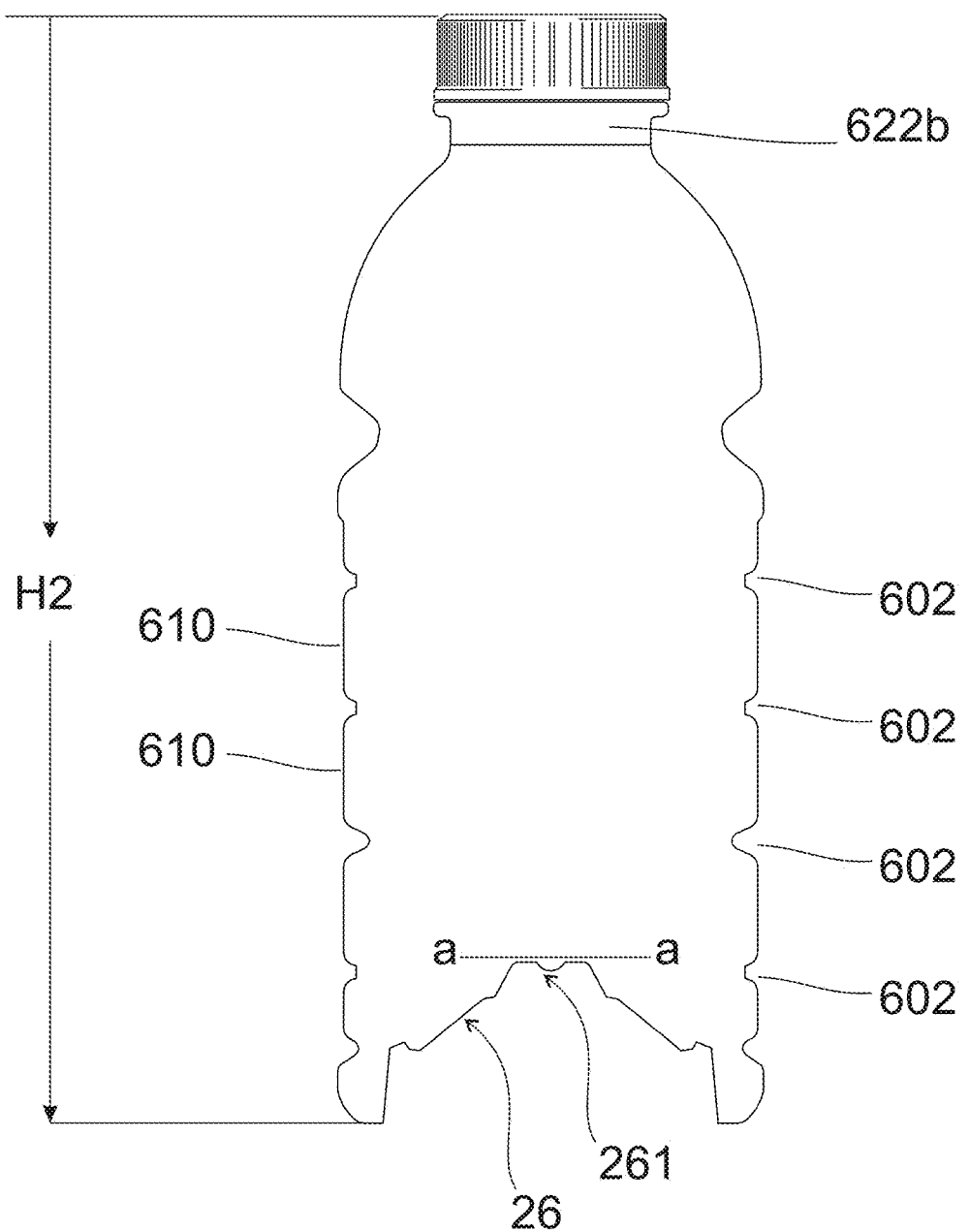
FIG. 29 is a side sectional view of the container of FIG. 28 during bulk pallet stacking.

Referring to FIG. 28, after filling and sealing the container according to the present invention, wherein most vacuum is removed through a mechanical volume reduction involving an inversion and locking in place of the pressure panel in the base, the container is further cooled upon exit of the filling line, generally after being labeled. In accordance with the present invention, and referring to FIG. 29, the plastic container 10 is then bulk packed on pallets fairly soon after labeling and there is further cooling of the contents during palletization. Horizontal ribs 602 are designed to achieve optimal performance with regard to vacuum absorption, top load strength and dent resistance. Horizontal ribs 602 are designed to compress slightly in a vertical direction to accommodate for and absorb vacuum forces resulting from hot-filling, capping and cooling of the container contents, and in the present invention to also provide for absorption of any remaining vacuum forces following a mechanical volume reduction and for an increase in pressure. The base panel is configured to resist moving outwardly or downwardly under the increasing internal pressure from the application of the top load, and movement away from the imaginary horizontal plane a-a is only slight as opposed to prior art wherein the base panel may revert more significantly. This leads to a more efficient build up in internal pressure and ensuring a positive pressure is obtained in pallet loads of containers.

Figures 41A, 41B, 41C:
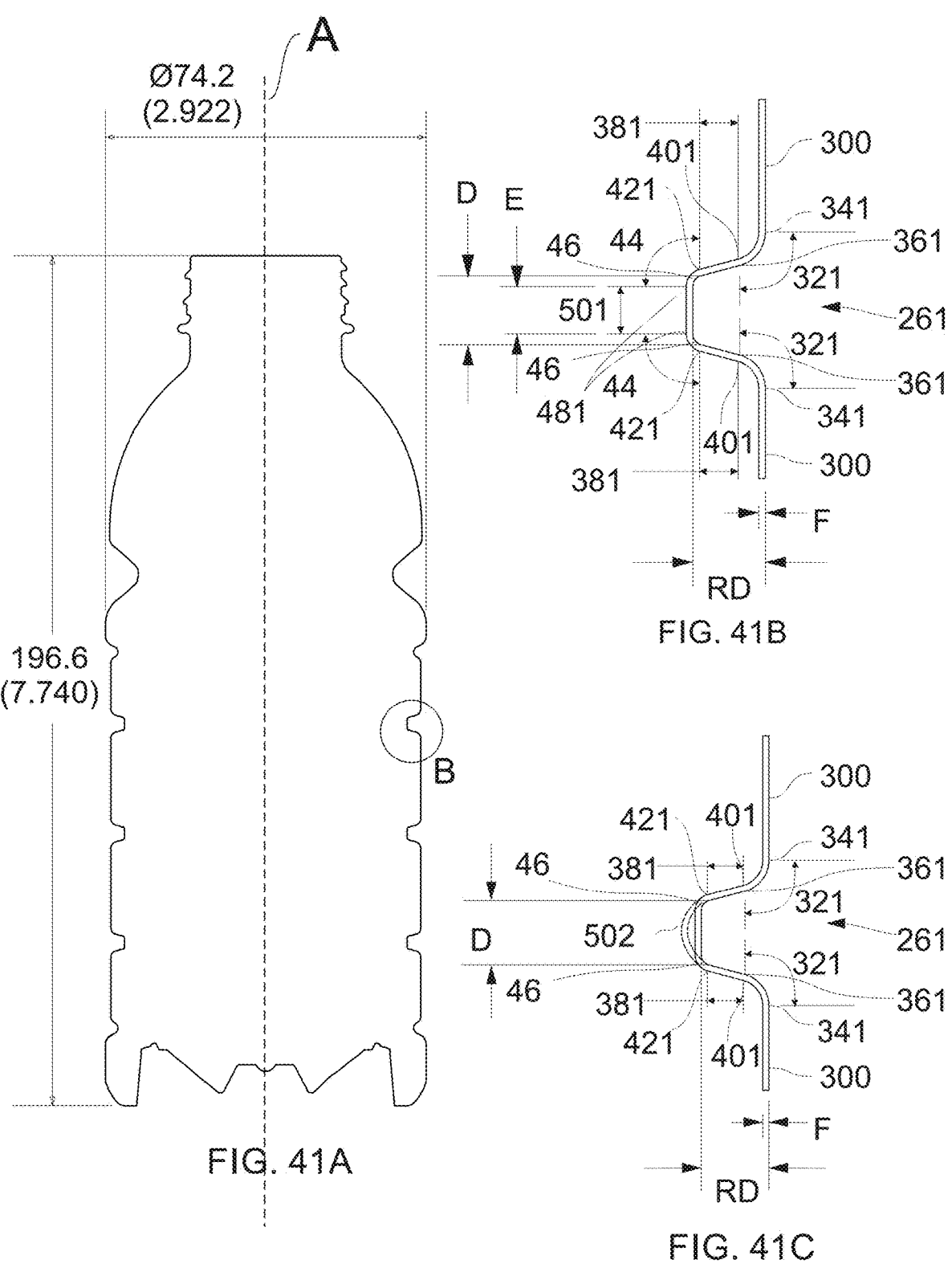
FIGS. 41A-41C show additional side sectional views of a container according to another embodiment of the invention; and, FIGS. 42A-42B show additional side sectional views of a container according to another embodiment of the invention.

With reference to FIGS. 41A-41C, one example of the above-described horizontal rib 602 may also incorporate the disclosure of Rashid. As depicted in FIGS. 41A-41B, the plurality of annular ribs 261 are each separated one from another by an annular land 300. Each annular rib 261, as depicted in FIG. 41B, comprises a pair of opposing outer radii 321, each of which comprises an outer end 341 and an inner end 361. The outer end 341 of each outer radius 321 is contiguous with an adjacent annular land 300 and each outer radius 321 extends inward of the annular land 300. Each annular rib 261 further comprises a pair of opposing straight walls 38 each having an outer end 401 and an inner end 421. The outer end 401 of each straight wall 38 is contiguous with an adjacent one of the outer radius inner ends 361 as depicted in FIG. 41B. Each annular rib 261 further comprises a pair of opposing inner radii 44 each having an outer end 46 and an inner end 481 wherein each straight wall inner end 421 is contiguous with an adjacent inner radii outer end 46 as depicted in FIG. 41B. Each annular rib 261 further comprises a root wall 501 extending contiguously between the opposing inner radii inner ends 481 to close off the rib 261. Each rib 261 extends annularly about the cylindrical wall 22 and is oriented substantially perpendicular to a central longitudinal axis A of the bottle 10. Furthermore, each land 300 and each root wall 501 are oriented substantially parallel to the bottle central longitudinal axis A. As disclosed by Rashid it has been found that the strength of the label panel section sidewall 22 may be optimized by providing the ribs with an average depth to width ratio in the approximate range of 1.0:1.0-1.1:1.0. The rib depth RD can be measured from the exterior of the land 300 to the exterior of the root wall 501. The rib width D is measured between the opposing inner radius outer ends 46. Rashid also discloses a "total rib width" being measured between the outer radii outer ends 341 of a single rib 261. In the exemplary example provided by Rashid example measures are provided wherein a rib depth RD is measured of 0.120 inches, a rib width D of 0.112 inches, a root wall 501 having a length E of 0.050 inches, the inner radii 44 having a radius of curvature of 0.031 inches and running for ninety degrees) (90)°, the outer radii 321 having a radius of curvature of 0.060 inches and running for ninety degrees) (90) ° with the straight wall 38 extending at an angle of fifteen degrees) (15) ° from perpendicular to the central longitudinal axis A. In this configuration, the depth to width ratio is 1.071:1. The lands 300 are 0.27 inches long, the total rib width is 0.2475 inches and the ribs 261 have a thickness F of 0.015-0.019 inches. Thus, a total rib width to rib depth ratio that is preferential for Rashid may be calculated of about 2.

Where Rashid discloses a root wall preferentially having an orientation substantially parallel to the bottle central longitudinal axis A, it is an object of the present invention to include the teachings of Patcheak wherein the root wall may alternatively comprise a radius 500, and for an increase to the depth of the rib and a decrease in the total rib width to rib depth ratio as shown in FIG. 41C. It is an object of the present invention to provide a total rib width to rib depth ratio of about 1.6 to about 2, and for the root wall to comprise a radius or to alternatively be substantially parallel to the bottle central longitudinal axis.

Figures 42A, 42B:
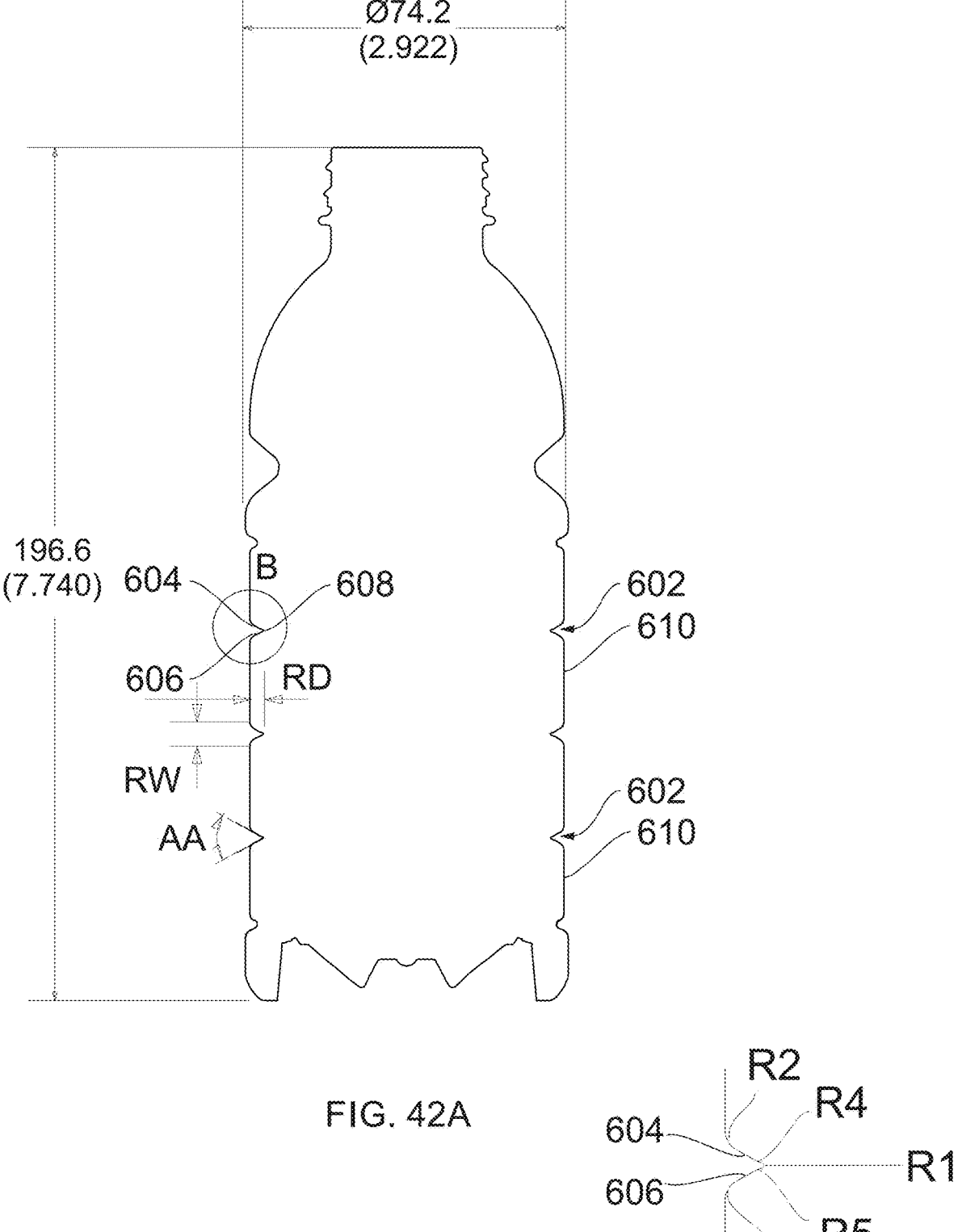

As shown in FIGS. 42A-42B, one example of the above-described horizontal rib 602 radii, walls, depth and width in combination form a rib angle AA. The rib angle AA of an unfilled plastic container 10 may be about 58 degrees. After hot-filling, capping and cooling of the container contents, the resultant vacuum forces cause the rib angle AA to reduce to about 55 degrees. This represents a reduction of the rib angle AA of about 3 degrees as a result of vacuum forces present within the plastic container 10 representing a reduction in the rib angle AA of about 5%. Preferably, the rib angle AA will be reduced by at least about 3% and no more than about 8% as a result of vacuum forces.

Horizontal ribs 602 are designed to compress further when the filled container is exposed to increased and/or excessive top load forces. By way of example only, and not intending to be limiting, one or more horizontal circumferential ribs as disclosed in Patcheak may also be included with the base panel configured according to the present invention instead of the more mobile base panel disclosed in Patcheak.

As shown in FIGS. 42A-42B, horizontal ribs 602 further include an upper wall 604 and a lower wall 606 separated by an inner curved wall 608. Inner curved wall 608 is in part defined by a relatively sharp innermost radius r1. In some embodiments, sharp innermost radius r1 lies within the range of about 0.01 inches to about 0.03 inches. The relatively sharp innermost radius r1 of inner curved wall 608 facilitates improved material flow during blow molding of the plastic container 10 thus enabling the formation of relatively deep horizontal ribs 602.

Horizontal ribs 602 each further include an upper outer radius r2 and a lower outer radius r3. Preferably both the upper outer radius r2 and the lower outer radius r3 each lie within the range of about 0.07 inches to about 0.14 inches. The upper outer radius r2 and the lower outer radius r3 may be equal to each other or differ from one another. Preferably the sum of the upper outer radius r2 and the lower outer radius r3 will be equal to or greater than about 0.14 inches and less than about 0.28 inches.

As shown in FIGS. 42A-42B, horizontal ribs 602 further include an upper inner radius r4 and a lower inner radius r5. The upper inner radius r4 and the lower inner radius r5 each lie within the range of about 0.08 inches to about 0.11 inches. The upper inner radius r4 and the lower inner radius r5 may be equal to each other or differ from one another. Preferably the sum of the upper inner radius r4 and the lower inner radius r5 will be equal to or greater than about 0.16 inches and less than about 0.22 inches.

Horizontal ribs 602 have a rib depth RD of about 0.12 inches and a rib width RW of about 0.22 inches as measured from the upper extent of the upper outer radius r2 and the lower extent of the lower outer radius r3. As such, horizontal ribs 602 each have a rib width RW to rib depth RD ratio. The rib width RW to rib depth RD ratio is, in some embodiments, in the range of about 1.6 to about 2.0.

As shown in FIGS. 42A-42B, the above-described horizontal rib 602 radii, walls, depth and width in combination form a rib angle AA. The rib angle AA of an unfilled plastic container 10 may be about 58 degrees. After hot-filling, capping and cooling of the container contents, the resultant vacuum forces cause the rib angle AA to reduce to about 55 degrees. This represents a reduction of the rib angle AA of about 3 degrees as a result of vacuum forces present within the plastic container 10 representing a reduction in the rib angle AA of about 5%. Preferably, the rib angle AA will be reduced by at least about 3% and no more than about 8% as a result of vacuum forces.

As stated above, an embodiment of the present invention includes stacking containers atop one another in pallet formation. Pallets are then stacked atop one another resulting in increased top load forces being applied to the plastic container 10 during storage and distribution. Thus, horizontal ribs 602 are designed to further reduce in height and to absorb top load forces. However, horizontal ribs 602 are preferably designed so that the upper wall 604 and the lower wall 606 never come into contact with each other as a result of vacuum or top load forces causing a reduction in height of the container. Instead, horizontal ribs 602 are designed to allow the plastic container 10 to reach a state wherein the plastic container 10 is supported in part by the liquid product inside, which is incompressible, and more particularly supported by the gas pressure within the headspace 622 above the liquid when exposed to excessive top load forces thereby preventing permanent distortion of the plastic container 10. This increase in gas pressure may be referred to as a "pneumatic charge up" that results in an increase in resistance within the container to downward or top load forces. In addition, this enables horizontal ribs 602 to rebound and return substantially to the same shape as before the top load forces were applied, once such top load forces are removed.

Horizontal lands 610 are generally flat in vertical cross-section as molded. When the plastic container 10 is subjected to vacuum and/or top load forces, horizontal lands 610 are designed to bulge slightly outward in vertical cross-section to aid the plastic container 10 in absorbing these forces in a uniform way.

In a preferred embodiment of the present invention, the container may even have minimal, or no, significant horizontal ribs contributing to "accommodation" of vacuum or height reduction under top load forces. In this embodiment, the mechanical volume reduction ensures a positive pressure within the container exists prior to entry for bulk pallet stacking. The increased top load forces applied during pallet stacking further increases the pneumatic charge up within the containers, wherein a positive pressure within the vertical load is assured and the requirement for additional ribbing is minimized.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

The invention claimed is:

1. A method of processing a hot-filled plastic container having a longitudinal axis, the container comprising:
   a finish;
   a sidewall portion extending from the finish;
   a base portion extending from the sidewall portion having a contact surface for supporting the container, the base portion including an inner annular wall having a downwardly inclined portion exceeding 10 degrees relative to the longitudinal axis and a central push-up portion configured to engage with a mechanical device and be moveable upwardly under a mechanical force after the container is filled with a liquid and sealed;
   the method comprising:
   (1) blow-molding the plastic container in a mold apparatus having a mold cavity, wherein the mold cavity comprises a first side mold portion and a second side mold portion closed around a preform, the preform comprising a heated and softened polymer material, wherein the blow-molding comprises the steps:
   a. inserting the preform into the mold cavity and closing the side molds around the preform, wherein the mold cavity includes an open or elongated bottom portion during inflation of the preform and the side mold portions are closed, and a base mold portion in a retracted position;

b. inserting into a neck portion of the preform a stretch rod;

c. providing air or another blowing medium at a first pressure P1 during a phase of elongating the preform through insertion of the stretch rod from a retracted position to an extended position and clamping the closed end of the preform between the stretch rod and the retracted base mold;

d. providing the blowing medium under a second pressure P2 and at least partially inflating the preform into conformity with the mold cavity under a pre-blow step, wherein the length of the container is overstretched below the contact surface;

e. moving the base mold portion from the retracted position to an extended position;

f. providing the blowing medium under a third pressure P3 and inflating the preform into substantially complete conformity with the mold cavity under an increased pressure during a final blowing step; and, g. reducing or removing the blowing medium pressure and releasing the formed container from the mold cavity by retracting the base mold portion and separating the side mold portions;

(2) providing the blow-molded plastic container for hot-filling by transferring, conveying or transporting the container after blow-molding to a filling line apparatus;

(3) hot-filling the plastic container with the downwardly inclined portion and the push-up portion in a first position, wherein, in the first position, the downwardly inclined portion extends inward from and above the contact surface of the base portion of the plastic container;

(4) sealing or capping the hot-filled plastic container with the downwardly inclined portion and push-up portion in the first position;

(5) conveying the sealed hot-filled container for further processing, wherein a bottom surface of the container is in direct contact with the conveyor and the container is supported by the contact surface and is vertically stable, and the downwardly inclined portion and the push-up portion is in the first position; and, (6) providing the sealed hot-filled plastic container for a forced volume reduction by transferring, conveying or transporting the container in a rotary or linear direction, and:

a. positioning the container within an in-feed apparatus configured to create space between adjacent multiple filled and sealed containers;

b. transferring the container to a position within a volume reduction apparatus wherein the container is stabilized by a holding device in at least an upper position or a lower position;

c. placing the container longitudinally above a mechanical rod, pusher or punch-like device driven by an actuator apparatus;

d. engaging in a retracted position a surface of the mechanical rod, pusher or punch-like device against a contact surface on the underside of the push-up portion and above the contact surface of the container;

e. activating the actuator apparatus and moving the mechanical rod, pusher or punch-like device to an extended position, wherein the downwardly inclined portion and the push-up portion of the hot-filled and sealed plastic container are forced from the first position to a second position; wherein the push-up portion is positioned longitudinally away from the finish in the first position, and longitudinally toward the finish in the second position and the internal volume of the sealed hot filled container is reduced and the pressure is increased; and, f. conveying the sealed hot-filled container and arranging for bulk packing with multiple other containers on pallets and applying a top load to force a further volume and height reduction and further increase in pressure within the container, wherein the pressure is a positive pressure.

2. The method of claim 1, including cooling the container and wherein a top load force is applied to multiple pallets during storage, transportation and distribution.

3. The method of claim 1, wherein the container comprises multiple horizontal ribs in the sidewall designed to compress in height under the applied top load force and cause an increase in internal pressure, the increase in internal pressure reducing any remaining vacuum pressure and/or providing for an increased positive internal pressure, the increased pressure providing for the container to reach a state wherein the container is supported in part by the product inside.

4. The method of claim 3, wherein the container has an internal vacuum pressure prior to the bulk packing.

5. The method of claim 4, wherein the container has a positive pressure during the bulk packing.

6. The method of claim 3, wherein the container has a positive pressure prior to the bulk packing and an increased positive pressure during the bulk packing.

7. The method of claim 1, including moving the container directly between a blow molding operation and the filling operation.

8. The method of claim 1, including stabilizing the container by supporting the neck of the container.

9. The method of claim 1, wherein the step of moving the base mold portion from the retracted position to an extended position begins under the pre-blow pressure P2 and before a step of increasing the blowing medium from P2 to P3 begins.

10. The method of claim 9, wherein the base mold portion is moved in an upward vertical direction during the step of increasing the blowing medium from P2 to P3.

11. The method of claim 10, including a step of turning a supply of air or other medium off after the preform is inflated into substantially complete conformity with the mold cavity.

12. The method of claim 10, wherein the base mold portion is moved from the retracted to the extended position while the polymer material is in a softened state.

13. The method of claim 10, wherein air is expelled at a blowing pressure into the stretch rod in the blow mold cavity during movement of the base mold portion to the extended position.

14. The method of claim 1, wherein the step of moving the base mold portion from the retracted position to an extended position begins after a step of increasing the blowing medium from P2 to P3 begins.

15. The method of claim 14, wherein the base mold portion is moved in an upward vertical direction during the step of increasing the blowing medium from P2 to P3.

16. The method of claim 15, including a step of turning a supply of air or other medium off after the preform is inflated into substantially complete conformity with the mold cavity.

17. The method of claim 15, wherein the container comprises a polymer material, and the base mold portion is moved from the retracted to the extended position while the polymer material is in a softened state.

18. The method of claim 15, wherein air is expelled at a blowing pressure into the stretch rod in the blow mold cavity during movement of the base mold portion to the extended position.

19. The method of claim 1, wherein the base mold portion is moved in a longitudinal or vertical direction by mechanical, pneumatic, or hydraulic means.

* * * * *